US 7,900,139 B2

(12) United States Patent
Hosotsubo

(10) Patent No.: US 7,900,139 B2
(45) Date of Patent: Mar. 1, 2011

(54) LAYOUT CONTROL APPARATUS, LAYOUT CONTROL METHOD, AND LAYOUT CONTROL PROGRAM

(75) Inventor: Toshihiko Hosotsubo, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 1409 days.

(21) Appl. No.: 11/359,959

(22) Filed: Feb. 22, 2006

(65) Prior Publication Data
US 2006/0198555 A1 Sep. 7, 2006

(30) Foreign Application Priority Data
Mar. 4, 2005 (JP) ................................ 2005-061064

(51) Int. Cl.
G06F 17/00 (2006.01)
G06F 3/048 (2006.01)

(52) U.S. Cl. ......................................... 715/247; 715/790
(58) Field of Classification Search .................. 715/243, 715/244, 246, 247, 790; 345/635
See application file for complete search history.

(56) References Cited

U.S. PATENT DOCUMENTS

| 5,060,170 A * | 10/1991 | Bourgeois et al. ............ 715/788 |
| 5,337,406 A | 8/1994 | Takakura |
| 5,367,565 A | 11/1994 | Mastsui |
| 5,459,825 A * | 10/1995 | Anderson et al. ............. 715/815 |
| 5,848,430 A | 12/1998 | Takakura |
| 5,873,106 A * | 2/1999 | Joseph .......................... 715/203 |
| 5,963,203 A * | 10/1999 | Goldberg et al. ............. 715/723 |
| 6,271,852 B1 * | 8/2001 | Kamiyama et al. ........... 345/423 |
| 6,380,954 B1 * | 4/2002 | Gunther ......................... 715/764 |
| 6,573,907 B1 * | 6/2003 | Madrane ........................ 715/719 |
| 7,028,255 B1 * | 4/2006 | Ayers ............................. 715/202 |
| 2003/0063064 A1 * | 4/2003 | Braun et al. ................... 345/156 |
| 2005/0034068 A1 * | 2/2005 | Jaeger ........................... 715/517 |
| 2005/0172226 A1 * | 8/2005 | Kobashi et al. ............... 715/518 |

FOREIGN PATENT DOCUMENTS

| JP | 01-130274 A | 5/1989 |
| JP | 05-110708 A | 4/1993 |
| JP | 09-146948 A | 6/1997 |
| JP | 09-311857 A | 12/1997 |
| JP | 11-232474 A | 8/1999 |
| JP | 11-316792 A | 11/1999 |
| JP | 2000-048216 A | 2/2000 |

OTHER PUBLICATIONS

Yin, Xinyi, et al, "Using Link Analysis to Improve Layout on Mobile Devices", ACM 1-58113-844-X/04/0005, May 17-22, 2004, pp. 338-343.*

* cited by examiner

Primary Examiner — Laurie Ries
(74) Attorney, Agent, or Firm — Canon U.S.A. Inc., I.P. Division

(57) ABSTRACT

In a case where a link associating a plurality of partial display areas with one another is not set, the partial display areas overlap with one another. There is a fear that appearance is deteriorated. In a case where a link for preventing overlap is set in the partial display areas that do not need to be associated with one another, the number of factors of dynamic change of layout increases. Thus, there is a fear that processing is complicated. A layout control apparatus determines whether partial display areas disposed on a document template overlap with each other. In a case where the layout control apparatus determines that there is possibility of overlap therebetween, the layout control apparatus creates a link for preventing the overlap.

21 Claims, 57 Drawing Sheets

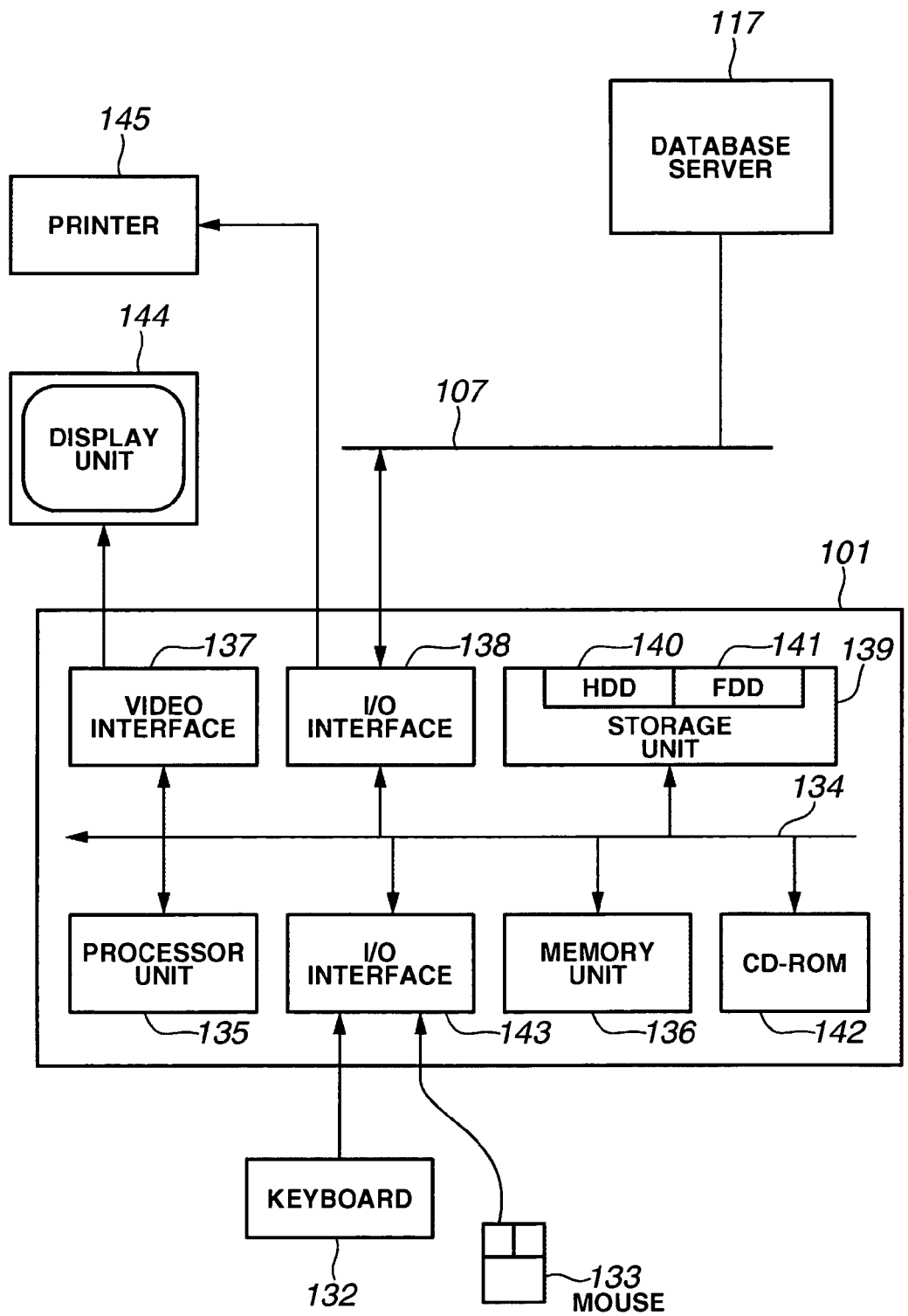

FIG.29
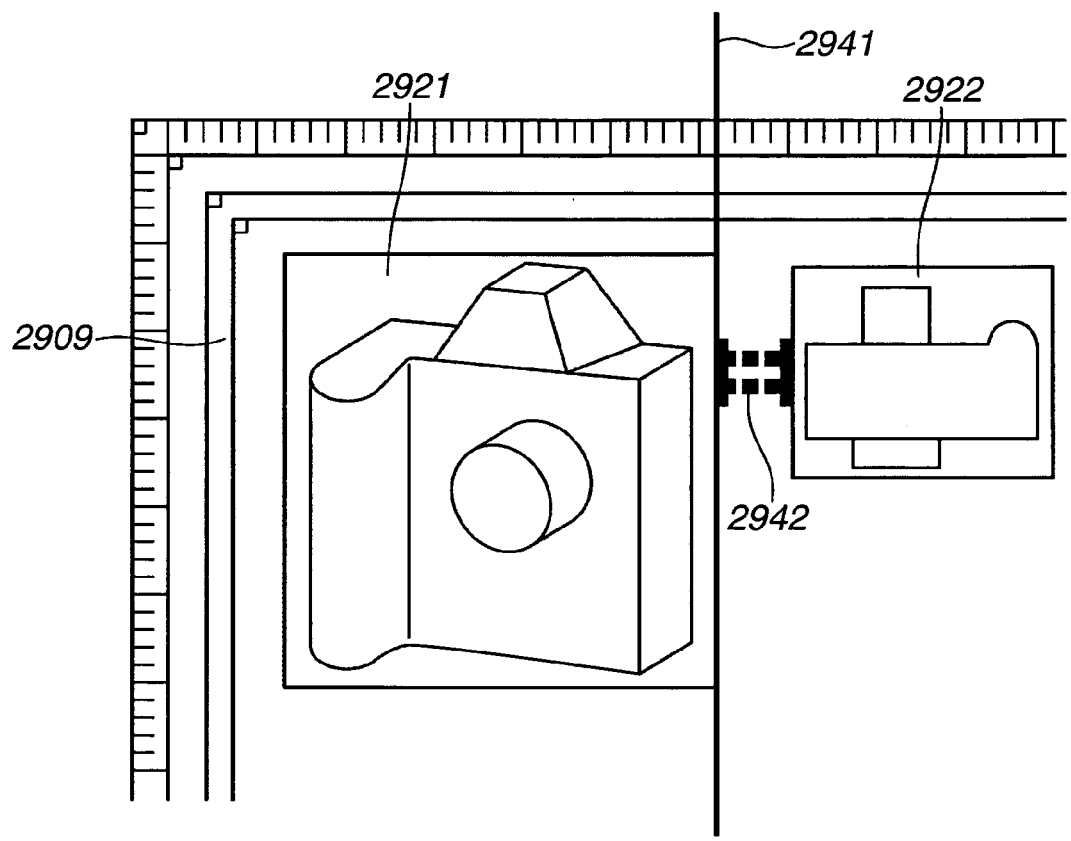
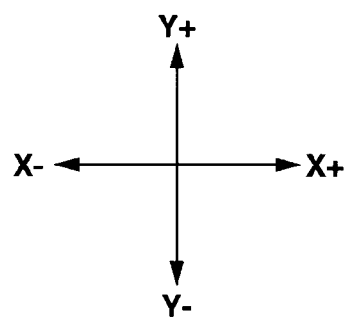

FIG.35
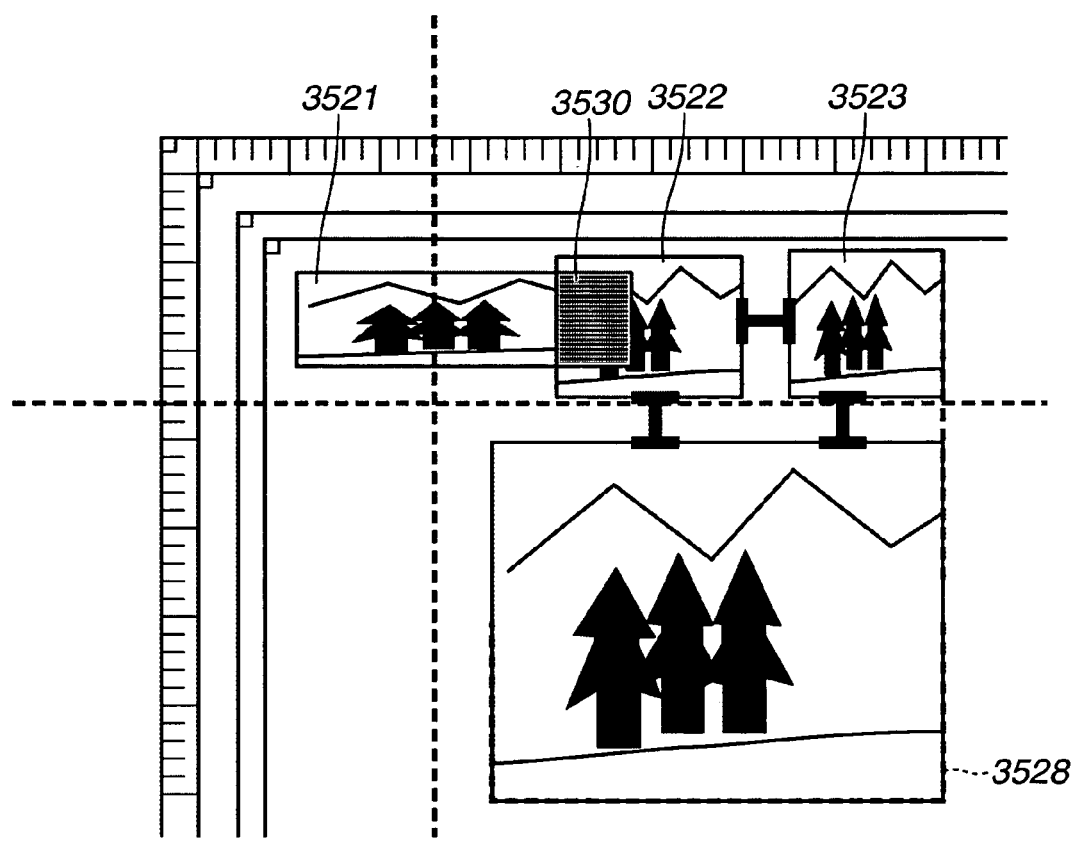
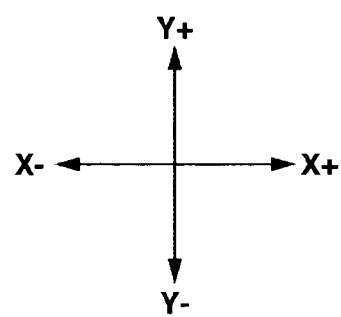

FIG.37
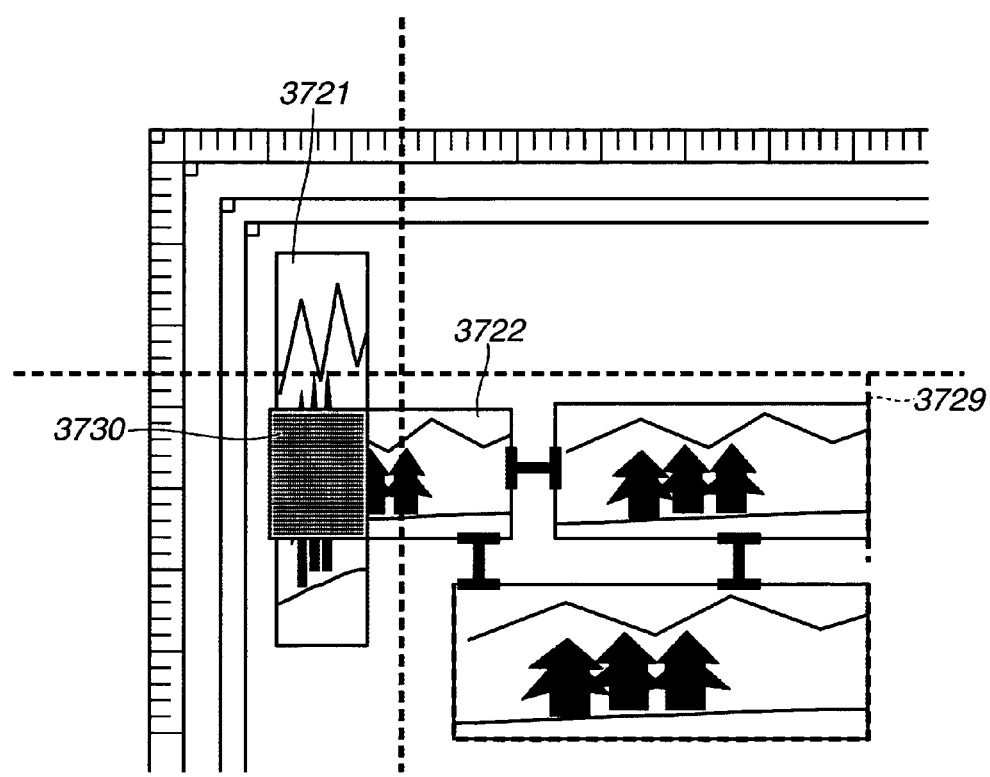
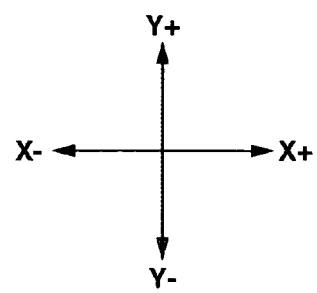

FIG.49

|  | HORIZONTAL DIRECTION | MAXIMUM WIDTH VALUE | MINIMUM WIDTH VALUE | VERTICAL DIRECTION | MAXIMUM HEIGHT VALUE | MINIMUM HEIGHT VALUE | LINK |
|---|---|---|---|---|---|---|---|
| CONTAINER 1921 | VARIABLE | 100 | 20 | VARIABLE | 70 | 40 | NONE |
| CONTAINER 1922 | FIXED | 30 | 30 | FIXED | 40 | 40 | NONE |

FIG.50

| | HORIZONTAL DIRECTION | MAXIMUM WIDTH VALUE | MINIMUM WIDTH VALUE | VERTICAL DIRECTION | MAXIMUM HEIGHT VALUE | MINIMUM HEIGHT VALUE | LINK |
|---|---|---|---|---|---|---|---|
| CONTAINER 2021 | VARIABLE | 80 | 20 | VARIABLE | 100 | 30 | NONE |
| CONTAINER 2022 | VARIABLE | 100 | 30 | VARIABLE | 100 | 40 | NONE |

|  | HORIZONTAL DIRECTION | VERTICAL DIRECTION |
|---|---|---|
| CONTAINER 2121 | 20 ~ 80 | 0 ~ -100 |
| CONTAINER 2122 | 40 ~ 100 | 0 ~ -70 |

FIG.52

| | HORIZONTAL DIRECTION | MAXIMUM WIDTH VALUE | MINIMUM WIDTH VALUE | VERTICAL DIRECTION | MAXIMUM HEIGHT VALUE | MINIMUM HEIGHT VALUE | LINK | DYNAMIC GUIDE | OVERLAP PREVENTING LINK |
|---|---|---|---|---|---|---|---|---|---|
| CONTAINER 2421 | VARIABLE | 80 | 20 | VARIABLE | 100 | 30 | NONE | PRESENT | CONTAINER 2421-CONTAINER 2422 |
| CONTAINER 2422 | VARIABLE | 100 | 40 | VARIABLE | 100 | 40 | NONE | ABSENT | CONTAINER 2421-CONTAINER 2422 |

LAYOUT CONTROL APPARATUS, LAYOUT CONTROL METHOD, AND LAYOUT CONTROL PROGRAM

BACKGROUND OF THE INVENTION

1. Field of the Invention

The present invention relates to a technique of dynamically controlling a layout for generating, editing, and printing a document including a text and an image and, more particularly, to a technique suitable for generating, editing, and printing a variable data document.

2. Description of the Related Art

Recently, diversification of commodities has shortened the life cycles of commodities. Also, the wide use of the Internet has strengthened the orientation of customization service for consumers utilizing the Internet. Thus, the necessity for CRM (Customer Relationship Management) and One-to-One Marketing attracts attention. These techniques raise the degree of satisfaction of customers and aim at acquiring and capturing customers.

The One-to-One Marketing is a kind of a database marketing technique to make a database of individual attribute information, such as age, gender, hobby, preference, and purchase history, to analyze the information, and to make proposals that meet the needs of customers. Variable printing technique is a typical marketing technique of this type. Along with the recent progress in DTP (DeskTop Publishing) technology and the recent wide use of digital printers, variable print systems have been developed, which customize documents for each customer and output the customized documents. The variable print systems are required to optimally lay out and display contents that vary in amount of information with customers.

Associated variable print systems have achieved the display of a layout by laying out containers (referred to also as field areas in a document form) on each document as areas on each of which information is displayed, and also associating the containers with the database.

However, the size of each container serving as a partial display area, to which text and images are pasted, is fixed. Thus, in a case where an amount of data contained in the database is larger than the size of a container when this data is inserted into the container, text overlap or image clipping occurs. Conversely, in a case where the amount of the data is smaller than the size of the container, a blank space is formed in the container. In either case, it is impossible to realize an optimum layout display for amounts of information representing text and images.

To solve this problem, automatic layout systems have been proposed, which can change the size of each container according to the amount of information. This automatic layout system can variably set the sizes of containers for text and images. Thus, this automatic layout system can change the size of each container to increase according to an amount of data to be inserted thereinto. Also, when data whose amount is larger than a fixed size of a container, is inserted thereinto, there is a technique of reducing the font size of text to display the entire text in the container.

However, the above-described system has a problem that when the size of the container is increased, this container may overlap another container provided on a document. The system has another problem that in a case where the amount of text is large when the font size is adjusted, the font size may become too small. To solve these problems, another automatic layout technique of reducing, when the size of a container is increased, the size of an adjacent container is employed by a layout design apparatus, which is disclosed in Japanese Patent Application Laid-Open No. 11-316792.

Japanese Patent Application Laid-Open No. 11-316792 describes that the container size of a container is increased according to a text input thereto, and the size of an adjacent container is reduced to maintain the distance therebetween. Thus, this related automatic layout technique has a problem that as the amount of input text increases, the reduction in size of the adjacent container is continued.

Also, the technique described in Japanese Patent Application Laid-Open No. 11-316792 does not take into consideration the variable print system adapted to create a document customized for each customer by associating each container with a database and then flowing content data into each container.

An example of a related layout method of taking into consideration variable-data printing is a method of creating a container having a fixed size and then flowing content data thereinto. However, in the case of using a container having a fixed size, this layout method has a problem that when content data, whose size is larger than that of the container, is flowed thereinto, an overflow occurs, and that when such content data is forcibly flowed thereinto with a font size reduced, the font size becomes extremely small. Also, the size of the container may be increased or decreased according to the size of the content data. However, in a state in which a plurality of containers is associated with one another, when the size of one of the plurality of containers is increased, the sizes of the associated containers have to decrease with increase in the size of the one of the plurality of containers. Thus, layout processing cannot be performed in consideration of the balance among the sizes of the containers.

Consequently, a related layout processing method of performing, in a case where the size of each container is changed according to the size of content data flowed thereinto, layout processing by controlling an amount in change of the size of each container is employed as a related layout method taking into consideration the balance among the sizes of a plurality of containers associated with one another. Thus, layout processing can be performed in consideration of the balance among the sizes of the associated containers. However, although the layout of the associated containers can be adjusted by this layout processing method, the layout of the containers, which are not associated with one another, are not adjusted by this layout processing method. For example, it is assumed that two containers A and B are disposed on a template and are not associated with each other. When large-size content data is flowed into each of the containers A and B in this situation, the sizes of both of the containers A and B are increased without performing layout adjustment on the containers A and B until the content data is fitted into each of the containers A and B. Consequently, this layout processing method causes a problem that the containers finally overlap each other.

Also, the related method causes another problem that even when a user associates the containers with each other to maintain the distance therebetween to prevent the containers from overlapping each other, factors of the dynamic change of the layout increases, so that it is difficult to predict the dynamic change of the layout. Additionally, the adjustment of the layout of containers, into which completely unassociated content data are respectively flowed, may cause a user to misinterpret that the content data are associated with one another. Further, with an increase in the number of factors associating the containers with one another, the layout adjustment should be performed in consideration of many factors.

This causes a problem that optimal layout adjustment is not performed, so that a desired layout is not obtained.

SUMMARY OF THE INVENTION

An aspect of the present invention is to provide a layout control technique efficiently realizing a user's desired layout by determining during layout editing whether containers (partial display areas), in each of which data is fit, overlap each other, and setting during layout editing a partial display area, which is inhibited from overlapping with another partial display area, and a partial display area, which is allowed to overlap with another partial display area.

According to one aspect of the present invention, a layout control apparatus, configured to control layout of a plurality of partial display areas, in each of which data assigned thereto is fit, and to lay out the data on a page, includes a prediction unit configured to calculate a movable area of each of the partial display areas, in each of which the data assigned thereto is fit, and to predict from the movable area whether each of the partial display areas overlaps with another object arranged on the page, and also includes an overlap preventing link display unit configured to set an overlap preventing link between the partial display area and the object, which are predicted to overlap with each other, and to display the set overlap preventing link.

According to another aspect of the present invention, a layout control apparatus configured to control layout of a plurality of partial display areas, in each of which data assigned thereto is fit, and to lay out the data on a page, includes a prediction unit configured to calculate a movable area of each of the partial display areas, in each of which the data assigned thereto is fit, and to predict from the movable area whether each of the partial display areas overlaps with another object arranged on the page, a setting-information input unit configured to set and input, in a case where each of the partial display areas is predicted by the prediction unit to overlap with another object, setting-information indicating whether to allow each of the partial display areas to overlap with the another object, a display order setting unit configured to set, in a case where information indicating allowance of overlap is input by the setting-information input unit, a display order of displaying the partial display areas, and a display control unit configured to display, in a case where each of the partial display areas overlaps with another object when data is fit in each of the partial display areas, the partial display areas according to the display order.

According to still another aspect of the present invention, a layout control method of controlling layout of a plurality of partial display areas, in each of which data assigned thereto is fit, and laying out the data on a page, includes a movable area calculation step of calculating a movable area of each of the partial display areas, in each of which the data assigned thereto is fit, a predicting step of predicting from the movable area whether each of the partial display areas overlaps with another object arranged on the page, a preventing link setting step of setting an overlap preventing link between the partial display area and the object which are predicted to overlap with each other, and a preventing link display step of displaying the overlap preventing link.

According to yet another aspect of the present invention, a layout control method of controlling layout of a plurality of partial display areas, in each of which data assigned thereto is fit, and laying out the data on a page, includes a calculating step of calculating a movable area of each of the partial display areas in each of which the data assigned thereto is fit, a predicting step of predicting from the movable area whether each of the partial display areas overlaps with another object arranged on the page, a setting-information input step of setting and inputting, in a case where each of the partial display areas is predicted to overlap with another object, setting-information indicating whether to allow each of the partial display areas to overlap with the another object, a display order setting step of setting, in a case where information indicating allowance of overlap is input by the setting-information input step, a display order of displaying the partial display areas, and a display control step of displaying, in a case where each of the partial display areas overlaps with another object when data is fit in each of the partial display areas, the partial display areas according to the display order.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the present invention and, together with the description, serve to explain the principles of the present invention.

FIG. 1B illustrates an exemplary configuration of the host computer shown in FIG. 1A.

FIG. 29 illustrates a preview window indicating a state in which data to be fitted in each of variable containers shown in FIG. 24 is flowed thereinto.

FIG. 35 illustrates a preview window indicating change in the layout of variable containers, to which the overlap preventing corresponding-angle variable link is not applied, in a case where image data is flowed to such containers.

FIG. 37 illustrates a preview window indicating change in the layout of variable containers shown in FIG. 33, to which the overlap preventing corresponding-angle variable link is not applied, in a case where image data is flowed into such containers.

FIG. 49 is a table illustrating information that is held in a memory unit and is set by using a property dialog window.

FIG. 50 is a table illustrating information that is held in the memory unit and is set by using the property dialog window.

FIG. 52 is a table illustrating overlap preventing link information held in the memory unit.

DETAILED DESCRIPTION OF THE EMBODIMENTS

Exemplary embodiments of the invention will be described in detail below with reference to the accompanying drawings.

First Embodiment

System Configuration

Figure 1A:
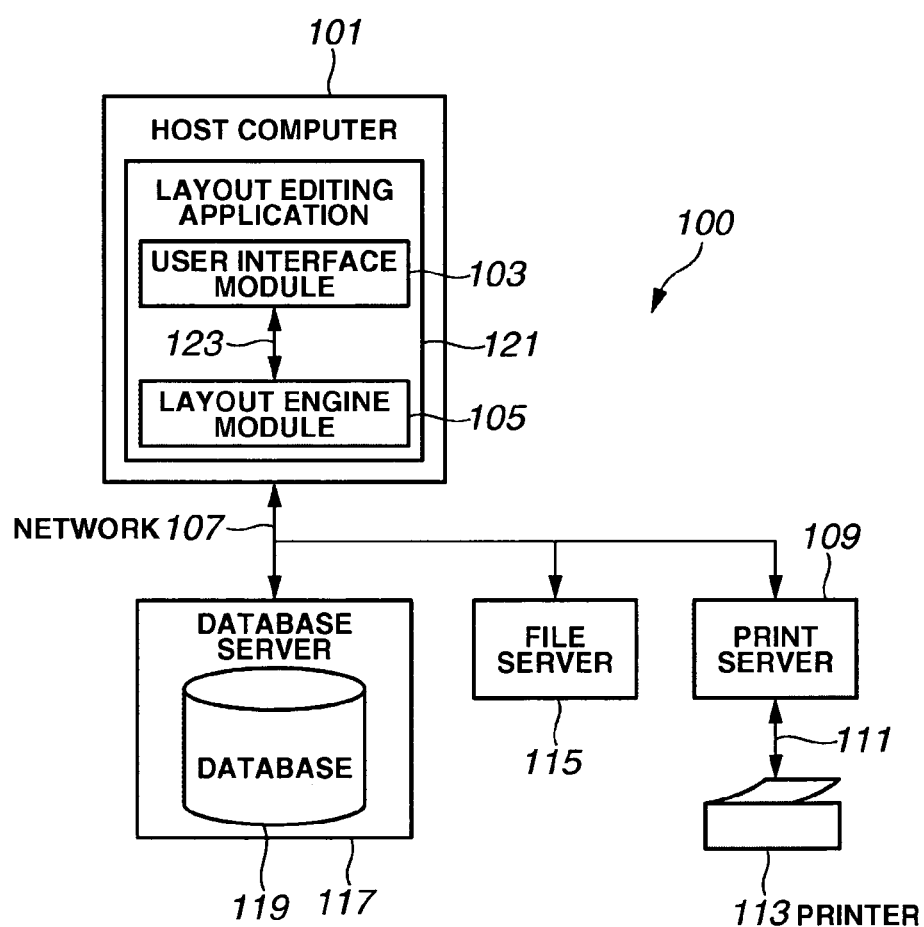
FIG. 1A illustrates the configuration of a computer system according to an exemplary embodiment of the present invention.
Figure 6:
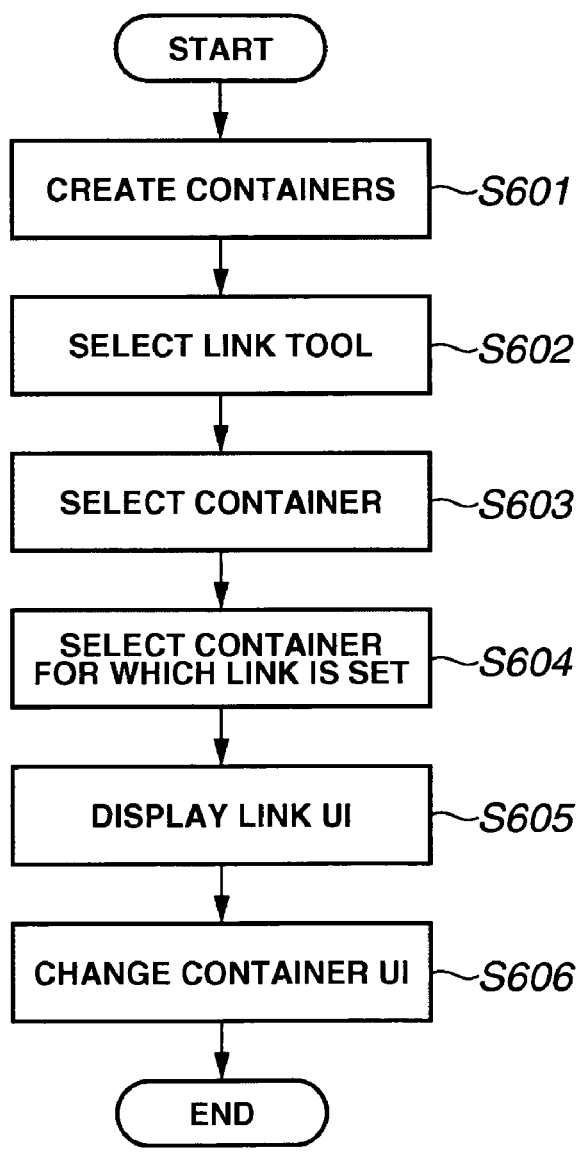
FIG. 6 is a flowchart illustrating a link setting method.

FIG. 1A illustrates a system 100 configured to print a document (a variable data document) by variably setting a container size. Operations of controlling a container size, setting a link between the containers, and editing the layout of the containers are performed in this system under the control of a host computer 101 that will be described below in detail with reference to FIG. 1B. A process illustrated in FIG. 6 is performed by executing the entirety or a part of a layout editing application program 121 (a layout control program according to the present invention) in the host computer 101 serving as a layout control apparatus. A layout editing step and a printing step are performed by executing software in the host computer 101.

The software is stored in a computer-readable medium including a storage unit described below. The software is loaded from the computer-readable medium to the host computer 101. Such software, a computer program recorded on the media, or a computer-readable medium storing the program specifies the functions of the computer which is configured to perform computation, display control, layout control, and information processing concerning contents that are needed for document layout editing and variable data printing in cooperation between the computer and each peripheral unit.

As shown in FIG. 1B, the host computer 101 is connected to an input device, such as a keyboard 132 or a pointing device such as a mouse 133, and an output unit including a display unit 144 and a local printer 145 depending upon a situation. An input/output (I/O) interface 138 connects the host computer 101 to a network 107 to connect the system 100 to another computer (for instance, a database server 117). Typical examples of the network 107 are a local area network (LAN) and wide area network (WAN).

The host computer 101 typically includes at least one processor unit 135, a memory unit 136 including, for example, a semiconductor random access memory (RAM) and/or read-only memory (ROM), an input/output (I/O) interface 138 for connecting to a network 107, a video interface 137, and an I/O interface 143 for connecting to the input device(s), e.g., the keyboard 132 and the mouse 133. A storage unit 139 includes a hard disk drive 140 and floppy disk drive (FDD) 141. Although not shown in FIG. 1B, a magnetic tape drive may be used as a storage unit.

A layout control apparatus is implemented by a combination of the hardware configuration elements and the software configuration elements.

The layout control apparatus is configured to control the layout of a plurality of partial display areas, in each of which data assigned thereto is fitted, and is also configured to lay out the data on a page and includes a prediction unit configured to calculate a movable area of each of the partial display areas, in each of which the data assigned thereto is fitted, and to predict from the movable area whether each of the partial display areas overlaps with another object arranged on the page. The layout control apparatus also includes an overlap preventing link display unit configured to set an overlap preventing link between the partial display area and the object, which are predicted by the prediction unit to overlap with each other, and to display the set overlap preventing link.

A compact disk-ROM (CD-ROM) drive 142 is provided as a nonvolatile data source. The host computer 101 performs operations according to an operating system, such as GNU/Linux or Microsoft Windows®, or operations of a computer system typically constructed according to the operating system. Thus, the input/output interface 143 can be utilized by the processor unit 135 of the host computer 101, which establishes communication therewith through an interconnection bus 134. Examples of a system including the host computer 101 shown in FIG. 1A are IBM-compatible PCs (Personal Computers), Sun Sparcstation computers, or a computer system including such computers.

The layout editing application program 121 is typically resident in the hard disk drive 140 and is read therefrom and is executed by the processor unit 135. When data is fetched from the storage unit 139, which stores the program 121, or through the network 107, the hard disk drive 140 and the like are used. Alternatively, the memory unit 136 is used in response thereto. The application program 121 is encoded on a CD-ROM or a floppy disk and is read through the corresponding CD-ROM drive 142 or the corresponding FDD 141 and is provided to users.

Alternatively, the application program 121 may be installed by a user from the network 107. The software can be loaded into the host computer 101 from another computer-readable medium which has an appropriate size and includes magnetic tape, a ROM, an integrated circuit, a magneto optical disk, a computer-readable card, such as a PCMCIA card, and media read through wireless communication or infrared communication between the host computer 101 and another device, E-mail communication, or the Internet, or an intranet having recorded information on a WEB site. Incidentally, these computer-readable media are merely related standard media. The medium type is not limited thereto. Any other computer-readable media can also be used.

The application 121 called a "layout editing program" is a program module to perform Variable Data Printing (VDP), and includes two software components: a layout engine module 105; and a user interface module 103. The layout engine module 105 is a software module that reads variable data stored in a database 119 record by record according to the limitations imposed on the sizes and the positions of containers (rectangular ranges) serving as partial display areas in each of which data is fitted, and that calculates the sizes and the positions of containers, in each of which the read data is fitted, according to the limitations imposed on the containers. In a case where the layout engine module 105 operates as an application to determine the size and the position of each of the partial display areas (containers) and outputs rendering information to a printer driver (not shown), the printer driver performs image rendering processing on a variable data document and generates print data.

The user interface module 103 provides a mechanism which causes a user to create a document template and associates a data source with a container in the document template. The user interface module 103 and the layout engine module 105 can communicate with each other through a communication channel 123. A data source adapted to create a document is stored in the database 119 on a database server 117 on another computer which executes a database application. The host computer 101 can communicate with the database server 117 through a connection to the network 107. In the case of performing variable data printing, the layout editing application 121 generates a document template to be stored in the host computer 101 or a file server 115 which is another computer. The layout editing application 121 also generates a document created by a document template merged with data. The document is stored in the storage unit 139 of the host computer 101 or in the file server 115, or is directly printed by a printer 113.

A print server 109 provides a network function to the printer 113, which is not connected directly to the network 107. The print server 109 and the printer 113 are connected to each other through a typical communication channel 111.

Figure 2:
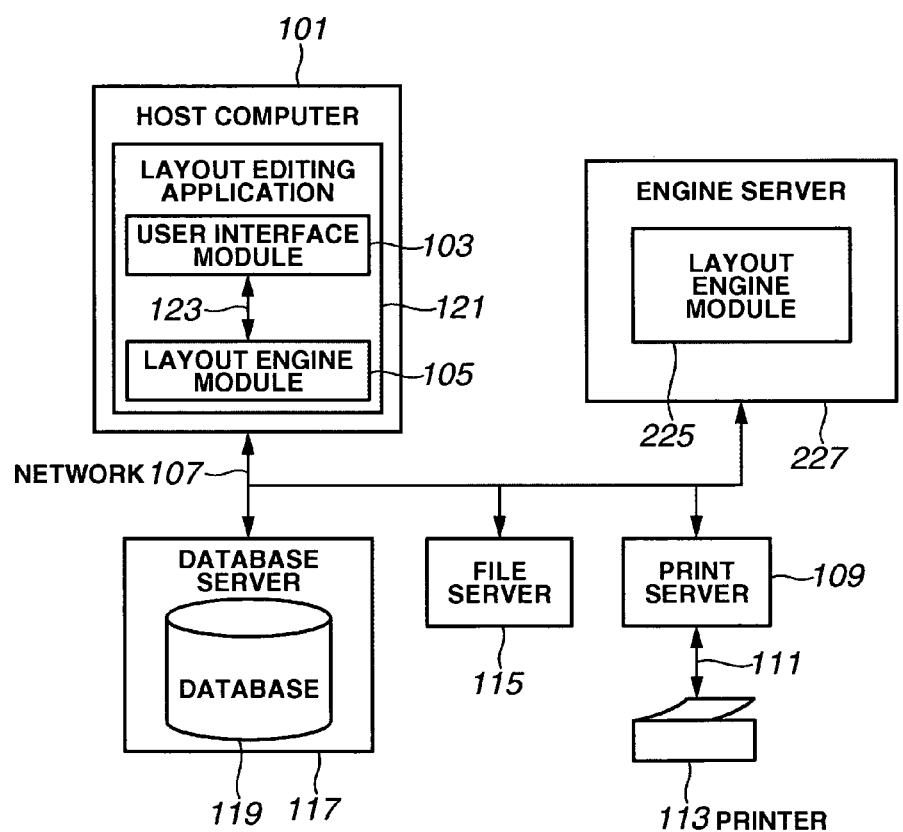
FIG. 2 illustrates a configuration in which a layout engine module is provided in a host computer and in which a layout engine module is also provided in an engine server.

FIG. 2 illustrates the configuration in which a layout engine 225 is provided in an engine server 227 in addition to the layout engine module 105 of the host computer 101. The engine server 227 is a typical computer. A document template stored in the file server 115 can be merged with data stored in the database 119 to cause the layout engine 225 to create a document for printing or for another purpose. Data representing this operation is input through a user interface (UI) window under the control of the user interface module 103 and can be set to print only a specific record.

Application Configuration
Main Window

Figure 3:
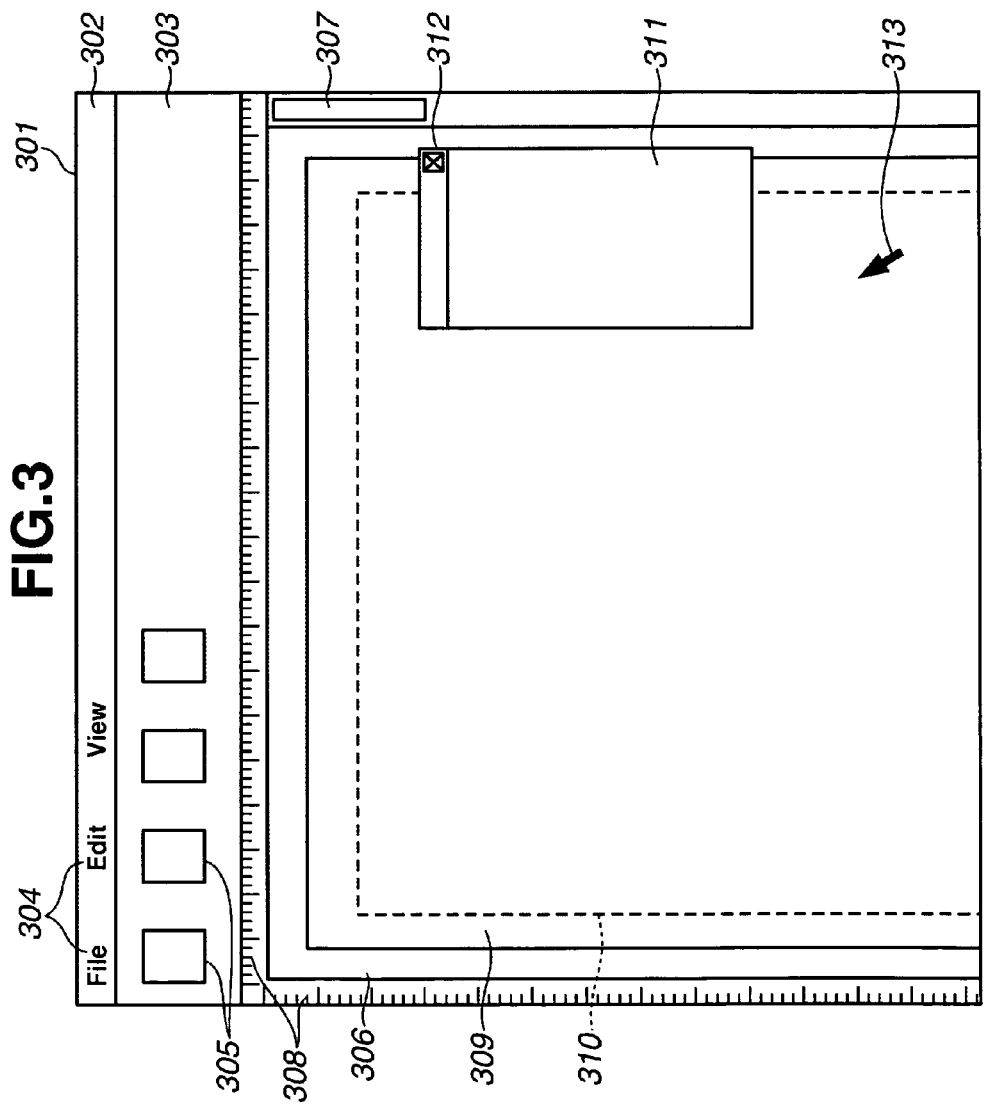
FIG. 3 illustrates a user interface window including a menu bar, a tool bar, a work area, and a floating palette.

An application window 301 illustrated in FIG. 3 is displayed on the display unit 144 by the user interface module 103 (FIG. 1A) during an operation. The application window 301 includes a menu bar 302 and a tool bar 303, which can be put into a non-display state and can be moved to various positions on the screen, and also includes a work area 306 whose position can be moved according to the position and the operation of the mouse 133, an optional palette 311, and a cursor/pointer device 313. These components characterize the application window 301.

The menu bar 302 according to a known technique has many menu items 304 to be extended under the layer of menu options. The tool bar 303 has many tool buttons 305 which can be brought into a non-display state or into a display state depending on a mode of the application. An optional ruler 308 is used to indicate the positions of a pointer, a page, a line, a margin guide, and containers or objects in the work area 306. The palette 311 is used to access an additional function, such as a variable data library. The palette 311 has a button 312 that provides a window control function to move, resize, or close the window. The display of the palette 311 is optional. The palette 311 can be displayed on the foreground of the work area 306 or can be hidden behind an object. The display of the palette 311 can be controlled so that the palette 311 is displayed only within the application window 301 or is partially or entirely displayed outside the application window 301.

The tool bar 303 has at least user selectable "buttons" 403 to 406 (see, for example, FIG. 4) which are described next.

The select tool button 403 is used to select, move, resize a side of a container, and to lock (fix) or unlock the container. A plurality of containers can be selected by dragging around the plurality of containers or keeping a CTRL key depressed while the containers are selected.

A text container tool button 404 is used to create a container having static or variable text.

An image container tool button 405 is used to create a container having a static or variable image.

A link tool button 406 is used to create a link to associate containers with each other, and is also used to control the distance of the link.

These buttons are displayed as icons adapted to change to fit to an operation situation according to a known technique.

The application window 301 is used by the layout editing application 121 illustrated in FIG. 3 to determine a basic layout by laying out containers and links on a page. The basic layout serves as a basis of the variable data printing. In a case where all containers in the basic layout are fixed ones, all results of printing records have the same layout. In a case where containers in the basic layout are variable containers (described later), the size or the position of each container varies within the range of the limitation (described later) according to the amount or the size of data read in units of records. The document template created by the layout editing application 121 is used only for determining the basic layout. In a case where a variable container is included, the layout of printed matter is controlled according to the read data.

Document Template

The work area 306 shown in FIG. 3 is used to display and edit the design of a document template. This enables users to understand the design of an outline of a printed document as preparation and also understand how a merged document changes according to the amount and the size of variable data. In a case where an external database is linked to the template, variable text or a variable image can be displayed in each container so that a currently processed document can be previewed. The document structure and variable data containers can be displayed at all times in a case where a cursor is moved onto a container, or where the container is selected.

The work area 306 is characterized by a scroll bar 307, the optional ruler 308, and a document template 309. The document template 309 can indicate the presence of a plurality of pages. The page size of a given document template is designated by a user by performing a known technique. For example, "Page Setup" is selected from "File" of the menu to display a dialog for setting the page size. Then, the page size designated by the user is reflected. The actual number of pages of each document may change according to the variable data. In a case where the variable data cannot be fit into one page, and where the basic layout imposes no limitations enabling the containers to be fit into a page having a predetermined size, an additional page is automatically created. In a case where a constraint (the limitation can be set by using an anchor icon or the like, which will be described later) to fit the containers in a page having a predetermined size is set in the basic layout, the size and the position of each container are determined while the sizes of the containers are changed in the page. Variable data to be fit is reduced as circumstances demand. Thus, the layout is dynamically determined corresponding to each record.

A border line 310 indicated by a dashed line in the page shown in FIG. 3 is a page margin that can optionally set and represents the maximum width of a printable object on the page.

Figure 4:
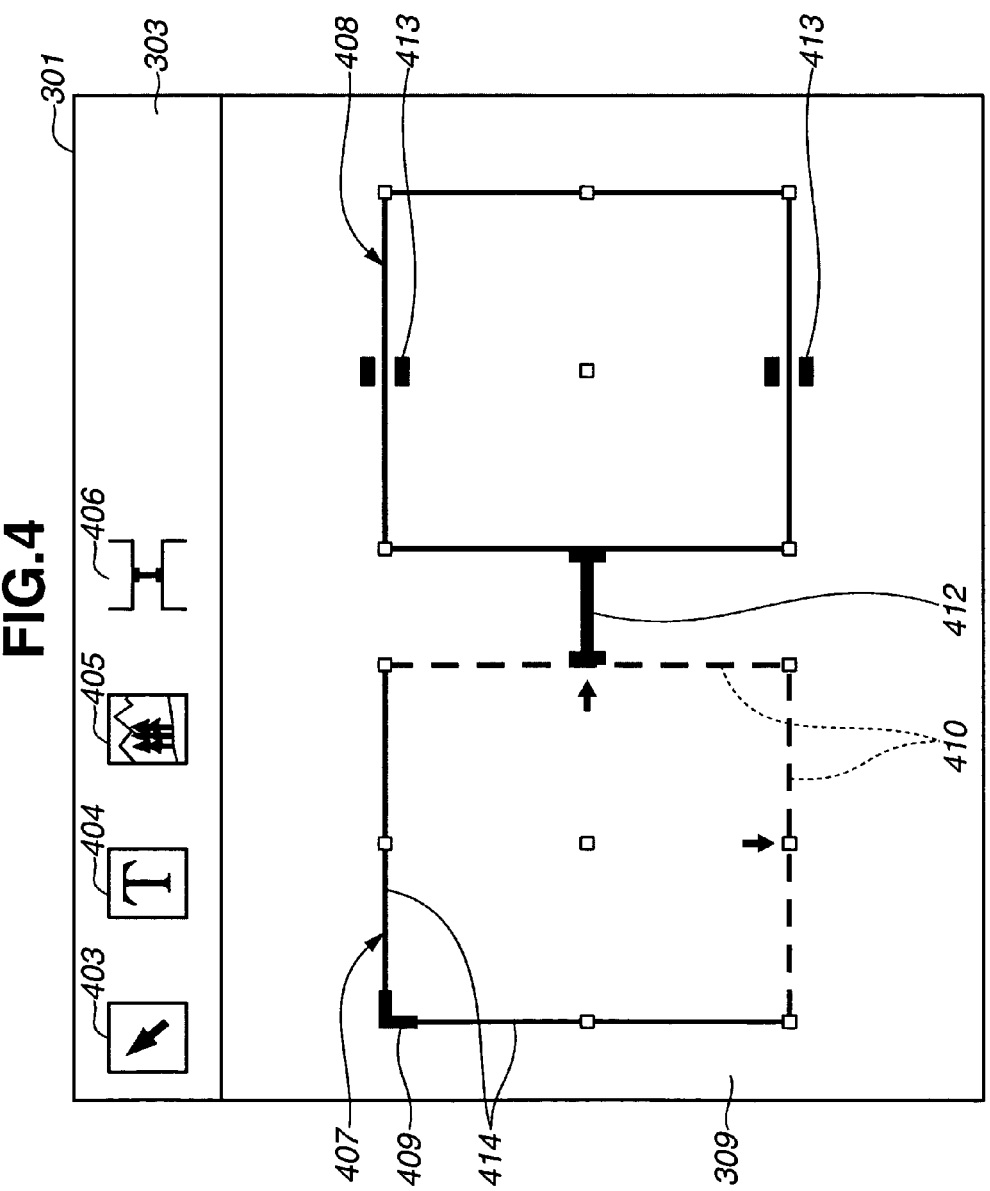
FIG. 4 illustrates typical containers having a link provided therebetween, an anchor, and sliders.

FIG. 4 illustrates examples of objects that can be displayed on the document template 309 of one page. FIG. 4 shows a plurality of containers 407 and 408. The relationship between the containers 407 and 408 is determined by an anchor icon 409 that fixes the positions of sides 414, unfixed sides 410, a link 412, and sliders 413. The anchor icon 409 can be set at a corner or on a side of the rectangular container or at the center of the container. In a case where the anchor icon 409 is set, the position of the place, at which the anchor icon 409 is set, is fixed. That is, in the example shown in FIG. 4, the anchor icon 409 is set at the upper left corner of the container 407, as viewed in this figure. In a case where variable data is flowed into the container 407, and the image size or the text amount corresponding to the variable data is large, the container 407 can be expanded rightward and downward. In a case where the anchor icon 409 is set on a side, this side is fixed. The container can be expanded in the directions of the three remaining sides.

In a case where the anchor icon 409 is set at the center of a container, the position of the center of the container is fixed. The container can be expanded in four directions without changing the position of the center of the rectangular container. The link 412, which will be described later in detail, indicates that the containers 407 and 408 are associated with each other. The link 412 also indicates that the container 408 can be moved to the right while the length set corresponding to the link 412 is maintained (the range of the length of the link can be designated in a case where the link is a variable one that will be described later). The sliders 413 indicate that the container can horizontally be moved in parallel to sides on which the sliders 413 are respectively set.

Container

Hereinafter, a container is described. A container is a space called a "partial display area", in which a fixed (static) or variable text or image is flowed from a variable data file into the document template in the units of records and is drawn. As shown in FIG. 4, the system lays out the container together with other containers or objects. The movement, the adjustment of the size, and the re-creating of the container are performed by operating the mouse 133 according to an operation performed by or an instruction issued from a user through the user interface window. Herein, a container serving as a region, into which content data, such as text data or image data, is flowed, is sometimes referred to as a "partial display area."

Limitations concerning the deformation of a container are prescribed by the anchor icon 409, the link 412, and the sliders 413. A container space is deformed in directions in which the deformation is allowed according to an amount of information on text or image data, and the layout of text or image data is performed in the container. If it is necessary that two associated (linked) containers are deformed, the shapes of the containers are controlled so that the two containers can deform in a well-balanced manner (without stress on the containers) according to the amount of text or image data to be fit in the containers.

The position of each container in the work area 306 is specified by an operation performed by the mouse 133 as a pointing device (313 in FIG. 3). The container can be moved or can be adjusted in size in the window (FIG. 3) serving as the user interface. Also, a new container can be added. Various conditions concerning deformation, such as the mutual relationship between the containers, are set by an anchor icon, link, and sliders. Each container has the function of visually representing contents, and of performing the interaction between the containers, and of editing information in the containers. The container is defined as follows.

(1) In a container, fixed (static) or variable content is input. Content is dynamic in a sense that data is obtained from a data source, and the size of the container is changed according to different data in different documents. Animated contents and contents which vary with time by another method are not included in the variable content because such contents are unsuitable for printing. Fixed contents are displayed in a similar manner in all documents created by using containers. However, in a case where a link is set between fixed content and variable content, the display of the fixed content is controlled so that the display position changes between the documents in response to the operation of the variable container.

(2) A container has decoration functions, for example, text settings such as a background color, a border, and a font style applied to content. Such a feature to be set is called a container attribute. The container attribute can be set corresponding to each container. The attribute of the container can also be set so that a container has the same container attribute as another container.

(3) When a document is created, a container is merged with data received from a data source. The decoration function is reflected on an output product as a typical printed product for all fixed contents. The result reflecting the decoration is visualized. Variable content provides display of specific data received from the data source. Particularly, the size of the container is variably set according to conditions set for the container with respect to the specific data. For example, the layout of the variably set container and specific data representation in the container can be printed by the printer 113, or can be displayed on the display device 144, or can undergo both printing and display.

(4) Regarding the setting of a container, the system has the user interface module 103, for example, an interactive graphical user interface (GUI) used to edit the container or to set display. Each element of the user interface is displayed on the screen of the display unit 144 and is not printed in the document. The user interface module 103 can display some of the decoration functions of a container, such as the background color and the font, on the interface screen and can add the decoration functions to the functions of setting, editing, and displaying a container.

(5) Additionally, the user interface module 103 sets a border between containers, an icon at a corner, which is set on a container to interactively change or display the size and the position of the container, and conditions for an operation of a container (for example, information on the number of times of overwrite, and the setting of lines and icons, and the editing of text) when the container is merged with data received from a data source.

Limitations of Containers

A container has limitations to associate a container with content and to control the display and the layout thereof to display the contents of the container in each document. These limitations (due to the association of fixed or variable content with a container) are used as a principal method of causing the user to control many documents from one document template. An example limitation is that the maximum value of height of content in a container is 4 inches. Another example limitation is that the left edge of content in a container should be displayed at the same horizontal position in each document. The above-described conditions can be set to display and edit those for the limitations by using the GUI.

Similarly to the fact that an image has a defined position on a page, the position of content is specified. A container has a position and a size. The content can be displayed and edited in variable data printing under the conditions for setting the layout of containers according to the content to be inserted in the container. In a case where a container is used, a user can designate the sizes and the positions of the contents of a document. Some documents are created by using one document template. Thus, the user can designate the limitation to the container by using the user interface module 103.

The sides of one container define the virtual border of an associated container of content displayed in the document. For example, the left side of a rectangular container determines the left-side position of the layout of an associated container of content. Similarly, the height of the container imposes the limitation to the height of the content associated with the created document.

In the following description, the term "fixed", which defines a certain value used to constrain the display of content, applies to all documents in the same manner.

(1) In a case where the width of a container is fixed, the same width is assigned to associated content in all documents.

(2) In a case where the height of a container is fixed, the same height is assigned to associated content in all the documents.

(3) In a case where the limitation imposed to a distance is that the distance is fixed, the designated distance is the limitation to all the documents.

(4) In a case where the left and right sides of a container are fixed, the height and the position in the Y-direction thereof can be changed in the direction of height or the Y-direction in which deformation is allowed to completely fit the content into the container.

(5) In a case where the upper side and the lower side of a container are fixed, the container size can be changed in the direction of width or in the horizontal direction in which deformation is allowed to completely fit the content into the container.

(6) The ordinate-axis of a container is an imaginary vertical line which is parallel to the right side and the left side of the container and extends through an intermediate position therebetween. In a case where the ordinate-axis of the container is fixed, the same mean position of the horizontal positions of the left side and the right side of the container is set in all documents. According to this limitation, the width of the container may change. The left side and the right side may be closest to or farthest from the ordinate-axis in different documents. However, the axis is put in the same horizontal position in all documents. Thus, this limitation does not affect the height and the horizontal position of the container.

(7) Similarly, in a case where the horizontal axis is fixed, a limitation is imposed on the container so that the vertical positions of the upper side and the lower side are defined. However, this limitation does not affect the height of the container.

(8) In a case where both the horizontal axis and the ordinate axis are fixed, this means that the central position of the container is fixed. However, this limitation does not affect the width and the height of the container.

(9) In a case where a corner of a container, the intermediate position of a side of the container, or the central position of the container is fixed, the container is displayed at the same position in each of all the documents, which is associated with the container. This means that, for example, in a case where the upper left corner of a container is fixed, the upper left position of the laid-out container is located at the same place in all documents.

(10) The ordinate sides or ordinate-axis can be fixed by being associated with the left side or the right side of the page, the left page margin or the right page margin, or another horizontal position. Similarly, the horizontal sides or the horizontal axis can be fixed by being associated with the upper side or the lower side of the page, the upper page margin or the lower page margin, or another ordinate position.

A term opposite to the term "fixed" is "variable" which indicates that a side, an axis, a corner, or an intermediate position of a container or limitations to a document may change between documents (or between records). For example, in a page, the layout is expected to dynamically change according to the size or the amount of variable data. However, a user may wish that the size or the position of a specific container is fixed, or the four corners of a container placed at a corner of the page are fixed. Thus, the layout editing application 121 is adapted to be able to appropriately set corresponding to each container (each partial display area) whether a side, an axis, a corner, or an intermediate position is fixed or is variable. Thus, a user can create a desired basic layout for determining the basic layout of a document template.

Display/Editing of Containers

Method of Newly Creating Container

Containers are classified into two types, that is, text containers and image containers. Each text container has text or text and an embedded image. Each image container has only an image. As shown in FIG. 4, a new text or image container is created on the document template 309 by clicking the mouse 133 on the text container tool 404 or the image container tool 405 and dragging a rectangle onto the template 309. A container is created by activating the appropriate text container tool 404 or 405 and by clicking the mouse 133 on the document template 309. In this case, a container having a default size is inserted. Alternatively, a dialog box or a prompt is provided to input the size of the new container. The container size can be set by various methods. The container is automatically preliminarily defined, and is created and is laid out on the document template 309 by a calculated schema. In a case where the generated container is selected by an input unit, such as a mouse, and the properties of the containers are designated by clicking on the right button of the mouse, the container property dialog is displayed so that limitations imposed on the container can be set. In the container property dialog UI (corresponding to a partial display area setting unit), the above-described various limitations can be set. In the container property dialog, the size (that is, the width and the height) and the position of the container can be set. To set a variable size, the basic pattern (basic size and reference position) of the container is set. Additionally, the maximum container size (width and height) and the minimum container size (width and height) can be set.

Method of Displaying Containers

FIGS. 5A to 5D illustrate rules for the sides of a container. To express the state of a side, the layout editing application 121 draws a side by a filling line (a solid line) 503 or a dotted line 504. The layout editing application 121 has anchors (lines, shapes, and icons indicated by 506, 507, and 509 drawn near to sides), handles (control points 502 drawn on or near the sides or shapes for movement and correction), sliders (short parallel lines drawn on both sides of a side, 413 in FIG. 4), expansion/reduction icons (505), and colors as features.

The rules of the container display method shown in FIGS. 5A to 5D are as follows.

1. To fix a side, the side is drawn by a filling line.
2. In a case where the width is fixed, the left and right sides are drawn by the filling line.
3. In a case where the height is fixed, the upper and lower sides are drawn by the filling lines.
4. The axes are not drawn.
5. Expansion/reduction icons are drawn near to each of all sides which are not drawn yet, and the sides are drawn by dotted lines.
6. In a case where a pair of an ordinate side or axis and a horizontal side or axis are fixed, an anchor is drawn at the intersection therebetween.
7. In a case where no anchor is drawn on each fixed side, a slider is drawn at the center of two edges. Further, in a case where both of a pair of an ordinate side and a horizontal side, or a pair of an ordinate axis and a horizontal axis, are fixed, it is considered to draw an anchor at the intersection therebetween as an example of drawing an anchor.
8. In a case where neither an anchor nor a slider is drawn corresponding to a pair of an ordinate side or axis and a horizontal side or axis, a handle is drawn at the intersection therebetween.

The lines defined by the above-described rules 1, 2, and 3 are fixed or restricted, as described above. Thus, the lines defined by the above-described rules 1, 2, and 3 are drawn by solid lines. Variable sides defined by the rule 5 are drawn by dotted lines. Fixed points defined by the rules 6, 7, and 8 represent anchors. Some fixed sides represent sliders. The other points represent handles.

A limitation set later by a user has higher priority over the above-described rules. That is, in a case where another limitation is set later, and where the rules affect sides which should be drawn according to the rules, the drawing conditions for drawing solid lines or dotted lines are changed.

A position, at which a variable side is drawn, depends upon the content of the container. As will be described later, "dynamic calibration processing" is used. This means that the content is merged with a document template and is made to be visible by using the user interface. An alternative execution function can be used for determining the layout position of a variable side in the user interface or the content area of the container, which is averaged in all documents. The layout editing application 121 can perform container display control, layout control and layout editing according to the above-described rules.

The expression of content is visualized by inserting the content into a container whose size can be changed according to an anchor icon or a slider icon set on each side of the container. Icons, which are set, corresponding to a container and the sides of the container, function in the following manner.

An anchor indicates that the position, at which sides or axes cross, is fixed. The icon 409 in FIG. 4 is an example of an anchor icon indicating that the intersecting sides 414 are fixed.

A slider means that although the associated side is fixed in a direction perpendicular to this side, the associated side can be translated. The values of the width and the height thereof are displayed in a secondary dialog window under the control of the layout editing application 121, so that the basic pattern of a basic value, a minimum value, and a maximum value permitted as a container size can be set.

Figure 5A:
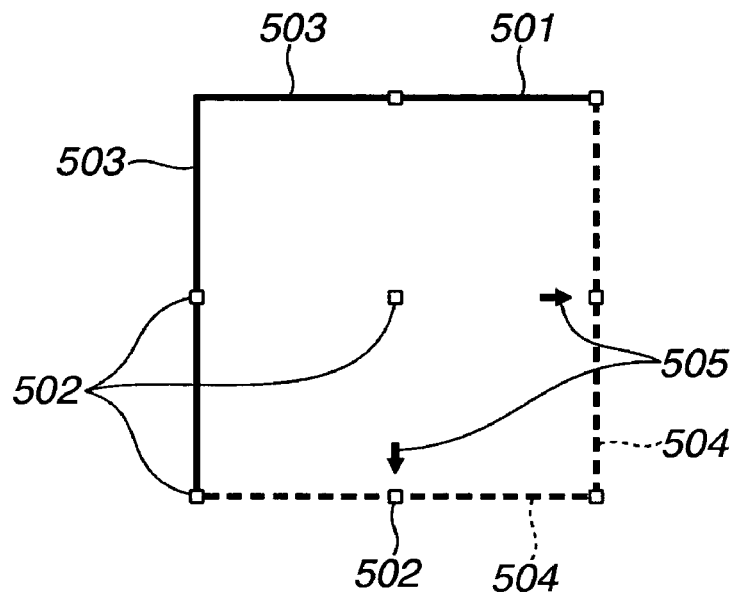
FIGS. 5A to 5D illustrate container rules.
Figure 5B:
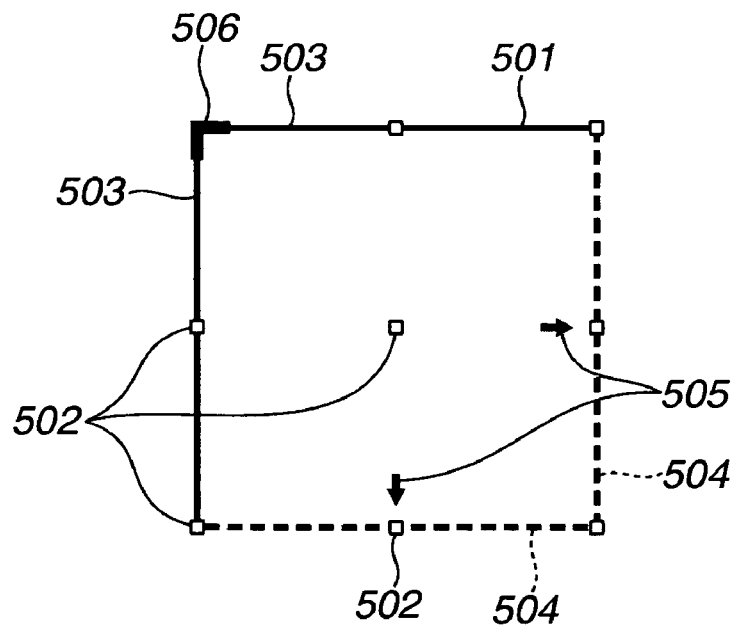

As shown in FIG. 5A, both of the width and the height of a container 501 are not fixed. The sides 503 indicated by solid lines are fixed ones. The sides 504 indicated by dotted lines are configured so that both of the width and the height thereof are variable. The expansion/reduction icons 505 indicate that adjacent sides 504 are variable. Referring to FIG. 5B, the sides 503 of the container 501, which are indicated by solid lines, are fixed ones.

Referring to FIG. 5B, an anchor icon 506 indicates that displacement is restricted in the directions of height and width in which the sides 503 intersect with each other.

Figure 5C:
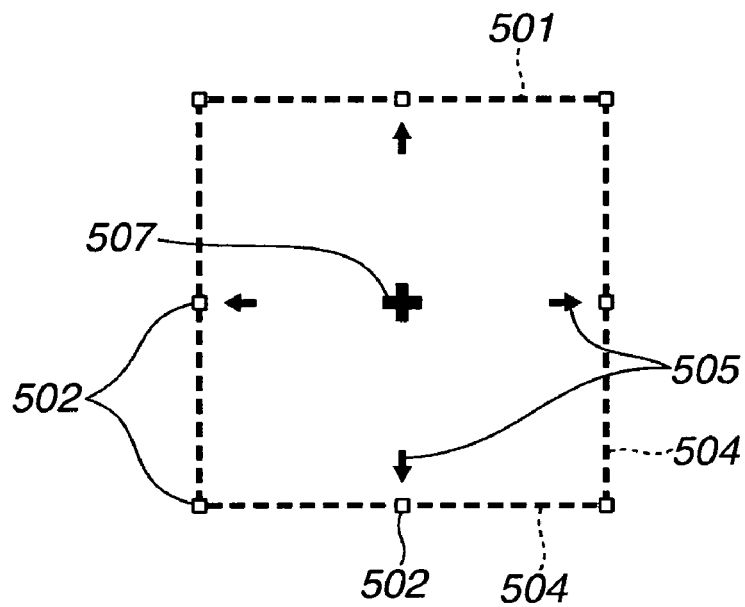
Figure 5D:
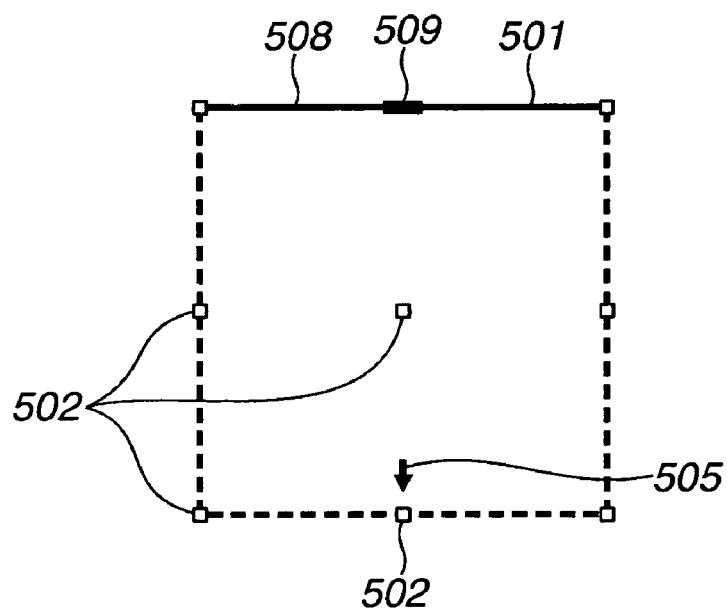

Referring to FIG. 5C, the container 501 is set to be in a state in which the container 501 can be equally expanded in the directions of width and height around the center point indicated by an anchor icon 507, so that the width and the height of each side thereof are variable. In this case, the container 501 can be displaced in the lateral direction and the ordinate direction of each side with respect to the central axis (the ordinate axis) passing through the anchor icon 507. Accordingly, the container size thereof can be changed. In the expansion/reduction, the layout is adjusted so that the position of the anchor icon 507 is always set at the center of the container 501. Referring to FIG. 5D, in the container 501, the anchor icon 509 is set corresponding to a top side 508 to be fixed. Both of the width and height of sides indicated by dotted lines can be changed.

Method of Setting Link

Figure 7A:
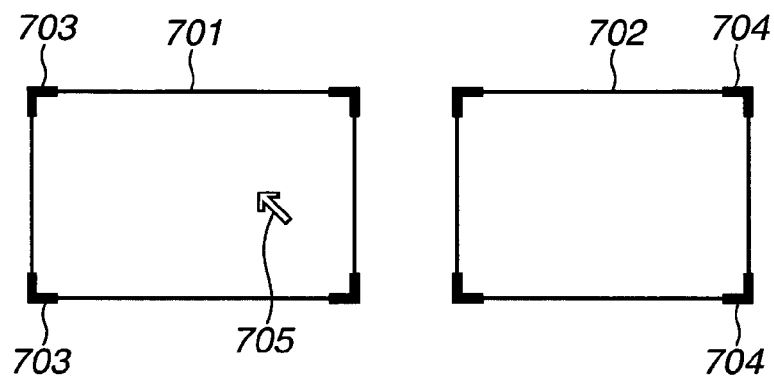
FIGS. 7A to 7C illustrate an example of change in a user interface window when a link is created.
Figure 7B:
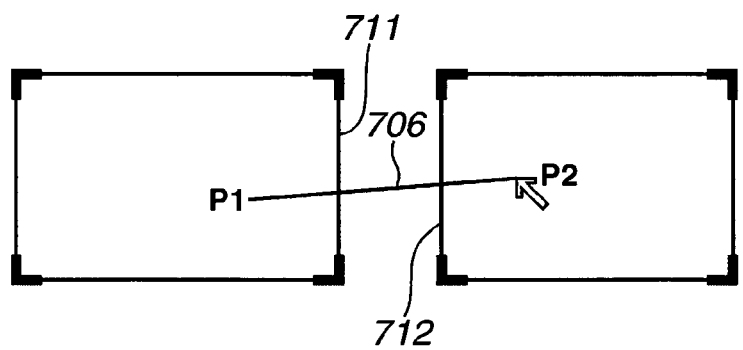
Figure 7C:
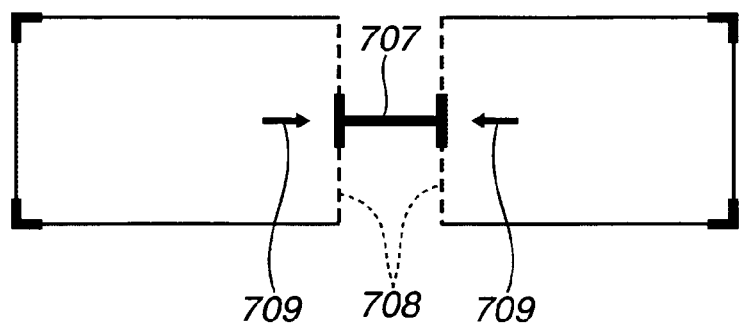

FIG. 6 is a flowchart showing a link setting method to be performed by the layout editing application 121. FIGS. 7A to 7C are diagrams illustrating display examples of a user interface window. An operation method of setting a link between the containers is described below with reference to FIGS. 6 and 7A to 7C. Processing illustrated in flowcharts described in the present application can be achieved by the processor unit 135 of an information processing apparatus (the host computer) 101.

In the link setting method shown in FIG. 6, link setting targets are created to set a link between containers (at least two containers) (step S601). FIG. 7A shows a state in which two containers 701 and 702 are created.

Subsequently, the above-described link tool button 406 (see FIG. 4) is selected in step S602. The containers 701 and 702 illustrated in FIG. 7A indicate the same contents as those of the above-described containers 407 and 408 in FIG. 4. The containers have fixed sides indicated by solid lines. Icons 703 and 704 are anchor icons which are the same as the anchor icon 409 shown in FIG. 4. A mouse pointer 705 is also shown in FIG. 7A.

Upon completion of selecting the link tool button 406 (step S602), the containers are selected. In step S603, a user clicks the mouse 133 on one of the containers (for example, a container 701) to select this container. Subsequently, a user clicks the mouse 133 on the other container (for instance, the container 702) in step S604 to complete the selection of the other container corresponding to which a link is to be set.

In FIG. 7B, a line segment 706 indicating a schematic locus of the mouse pointer 133 that connects a point (P1), on which the mouse 133 is clicked in step S603, and a point (P2), at which the mouse 133 is clicked in step S604 is displayed (step S605). A link 707 is set between sides 711 and 712 of the containers which intersect with the line segment. Finally, the interface window is updated to a state in which the link 707 is set between the containers as shown in FIG. 7C (step S606). In a case where the link 707 is set, the window display to display the containers is also changed automatically. In the changed window (see FIG. 7C), sides 708 are indicated by dotted lines which represent variable sides, as described above. The status of the sides 708 are changed from fixed ones (corresponding to the sides 711 and 712 provided before the link is set) to variable ones. This is because the setting of the link 707 makes it necessary to change the status of the sides of the containers 701 and 702 to variable ones. If all sides are fixed even after the setting of the link 707, the relative relationship between the containers is specified by the link. The above-described processing is intended to prevent occurrence of this contradiction and is automatically performed under the control of the layout editing application 121.

Indicators 709 like the icons 505 in FIGS. 5A to 5D visually indicate directions in which the containers 701 and 702 can be respectively displaced by setting the link 707. In the example shown in FIG. 7C, the right side of the left container 701 and the left side of the right container 702 variably change. This is a single example. It can be indicated by setting the container to have the slider designated by 413 in FIG. 4 that the side 708 is variable. The above-described processing can be performed under the control of the layout editing application 121.

Layout Calculation Method (Overall Flow)

Figure 8:
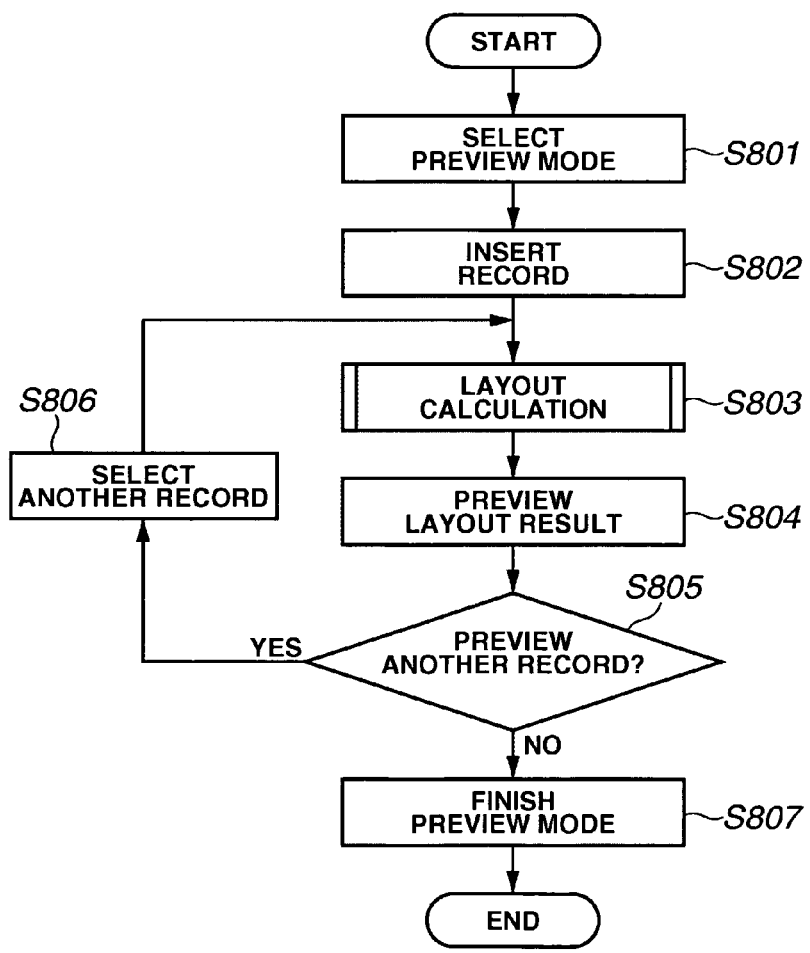
FIG. 8 is a flowchart illustrating a layout calculation process to be performed by a layout engine of the embodiment.

The layout editing application 121 according to this embodiment has a layout mode in which containers are created by using the user interface module 103, and in which a layout is created by associating the containers with each other (that is, setting a link therebetween), and also has a preview mode in which each record of a data source is inserted into the created layout by the layout engine module 105, and in which a result of the layout, which is obtained after actual insertion of records, is previewed. In the preview mode, actual records are inserted, and a layout is calculated according to the above-described priority order. However, in the preview mode, the layout for display is calculated. Even in the case of actually printing, the layout is calculated by causing the layout engine module 105 to insert data into each container. The calculation method at this time is the same as in the preview mode. FIG. 8 illustrates the flow of layout calculation.

First, the preview mode is selected in step S801. The automatic layout system has a layout mode in which containers are created and in which a layout is created by associating the containers with each other, and also has a preview mode in which data records (hereunder referred to simply as "records") to be displayed in the created layout are inserted thereinto, and in which a result of the layout, which is obtained after actual insertion of records, is previewed. In the preview mode, actual records are inserted, and the layout is calculated. However, in the preview mode, the layout for display is calculated. Even in the case of actual printing, the layout is calculated by inserting records.

The calculation method used at that time is the same as in the preview mode. In a case where the preview mode is set, a record to be previewed is selected and is inserted in step S802. In a case where the records are inserted, layout calculation is performed in step S803 to lay out the records. The layout calculated in step S803 is displayed in step S804. It is determined in step S805 whether to preview another record. If it is determined in the processing step S805 that it is unnecessary to preview another record (No in step S805), the processing advances to step S807 to terminate the preview mode. If it is determined in step S805 that another record is to be previewed, another record is selected in step S806, layout calculation is performed again in step S803, and preview of the record is performed in step S804.

In a case where the system is not in the preview mode and where the system performs printing, layout calculation is sequentially performed on all records to be printed. Therefore, the processing in step S804 is unnecessary when printing the record. In step S805, it is determined whether all records to print are processed. The result of the layout calculation performed in step S803 is drawn and is output. Then, print data is generated by using the printer driver and is output to the printer. In this case, when print data output of all records (all records designated to be printed) is completed, this processing is finished. The above-described processing can be performed under the control of the processor unit 135.

Dynamic Layout Calculation Method

Figure 9:
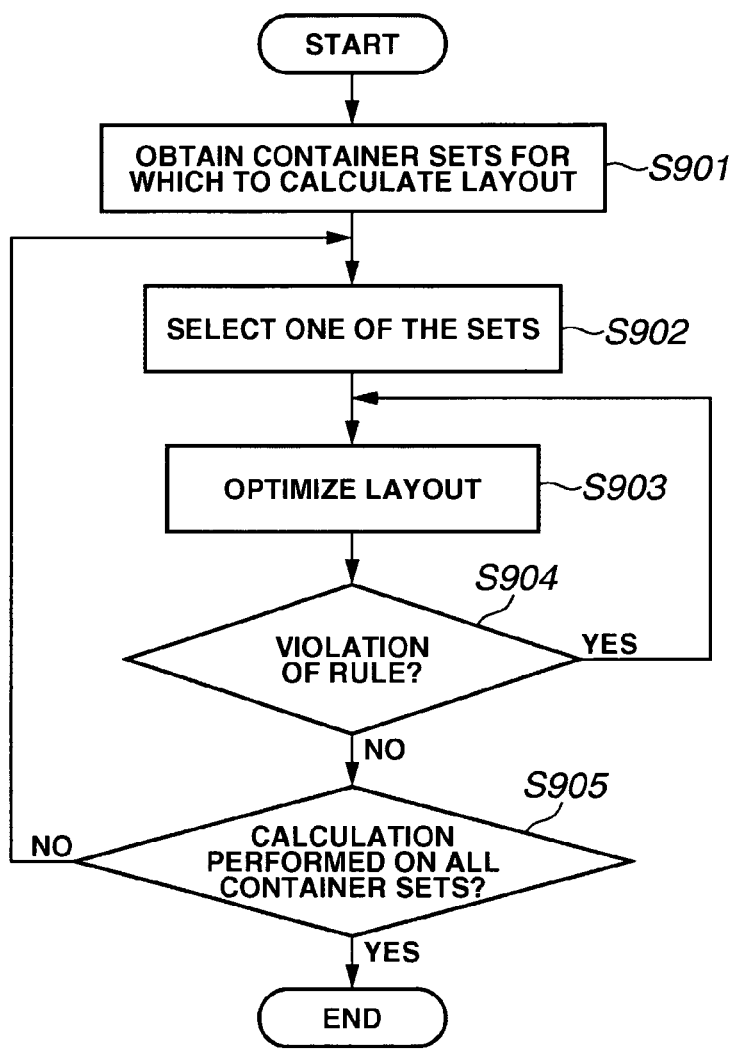
FIG. 9 is a flowchart illustrating a layout calculation process to be performed by the layout engine of the embodiment.
Figure 10A:
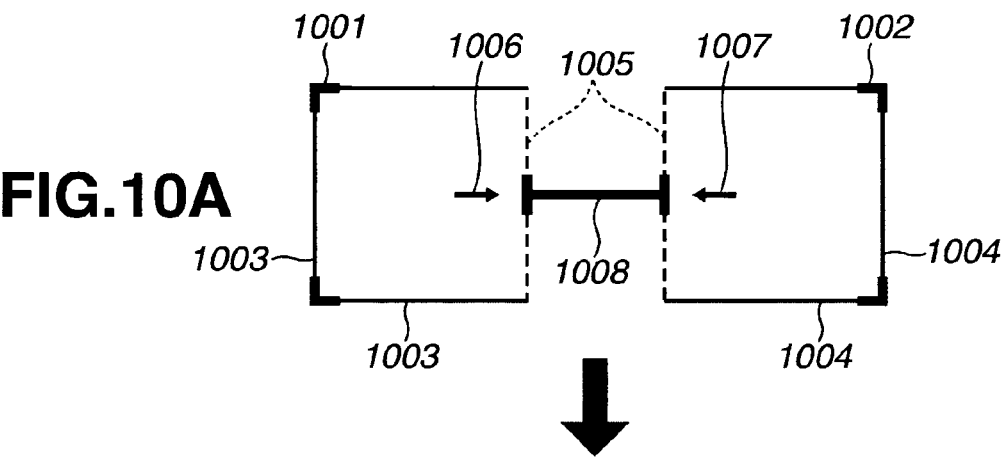
FIGS. 10A to 10C illustrate display examples of a user interface window corresponding to the flow shown in FIG. 9.
Figure 10B:
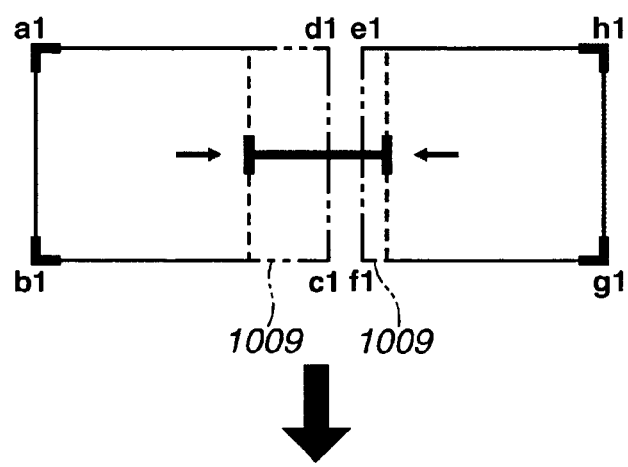
Figure 10C:
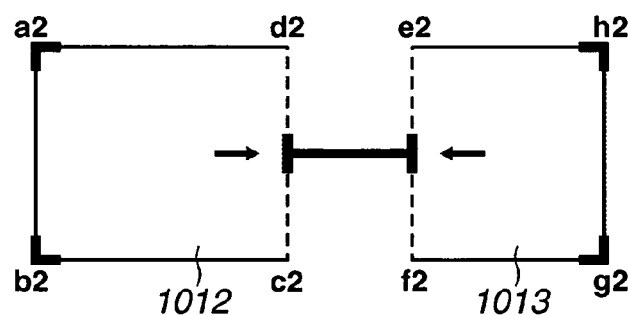

FIG. 9 is a flowchart illustrating the detailed flow of a process of layout calculation. FIGS. 10A to 10C illustrate display examples of the user interface window in this process. FIG. 9 is a flowchart illustrating a layout calculation processing method. The process illustrated in this figure corresponds to the layout calculation method in printing/previewing one record that undergoes variable data printing. In a case where a plurality of records is present, the following process is repeated.

First, in step S901, the layout editing application 121 obtains a set of containers, the layout of which is calculated. Layout calculation is performed on a set of associated containers. As shown in, for example, FIG. 11, four containers A, B, C, and D are laid out on a page and associated with one another. In this case, the containers A and B are associated with each other by a link 1106. Also, the containers C and D are associated with each other by a link. Thus, the containers A and B form a first set, while the containers C and D form a second set. Containers, such as those shown in FIG. 11, may include anchors 1101, fixed sides 1102, control points 1103, variable sides 1005, arrows 1104 indicating the direction of change of variable sides and sliders 1107. Association between containers is indicated by a link 1106.

Subsequently, in step S902, the layout editing application 121 selects a set for layout calculation from the sets of the container obtained in step S901. Layout calculation is performed on the selected set of the containers. First, the sizes of the two containers A and B serving as variable elements included in the selected set of the containers are calculated by assuming that the containers are unaffected by the size of an image or an amount of a text represented by data to be inserted. More specifically, the layout editing application 121 determines whether the container A is an image data container or a text container. This determination can be performed according to the attribute set for the container, as described above.

Subsequently, the layout editing application 121 reads data to be flowed into the container A. In a case where the container A is an image data container, the size (the number of pixels arranged in the direction of width, the number of pixels arranged in the direction of height, and the resolution) of the image data is defined as the size of the container A without constraints. In a case where the container A is a text container, the amount of data to be flowed into the container A can be calculated according to the number of characters of text data and the character attribute, such as a font type, a font size, a character pitch, and a line pitch designated by the container attribute of the container A. The aspect ratio of the container A cannot be determined without limitations. Thus, the limitations are applied thereto as follows.

Figure 11:
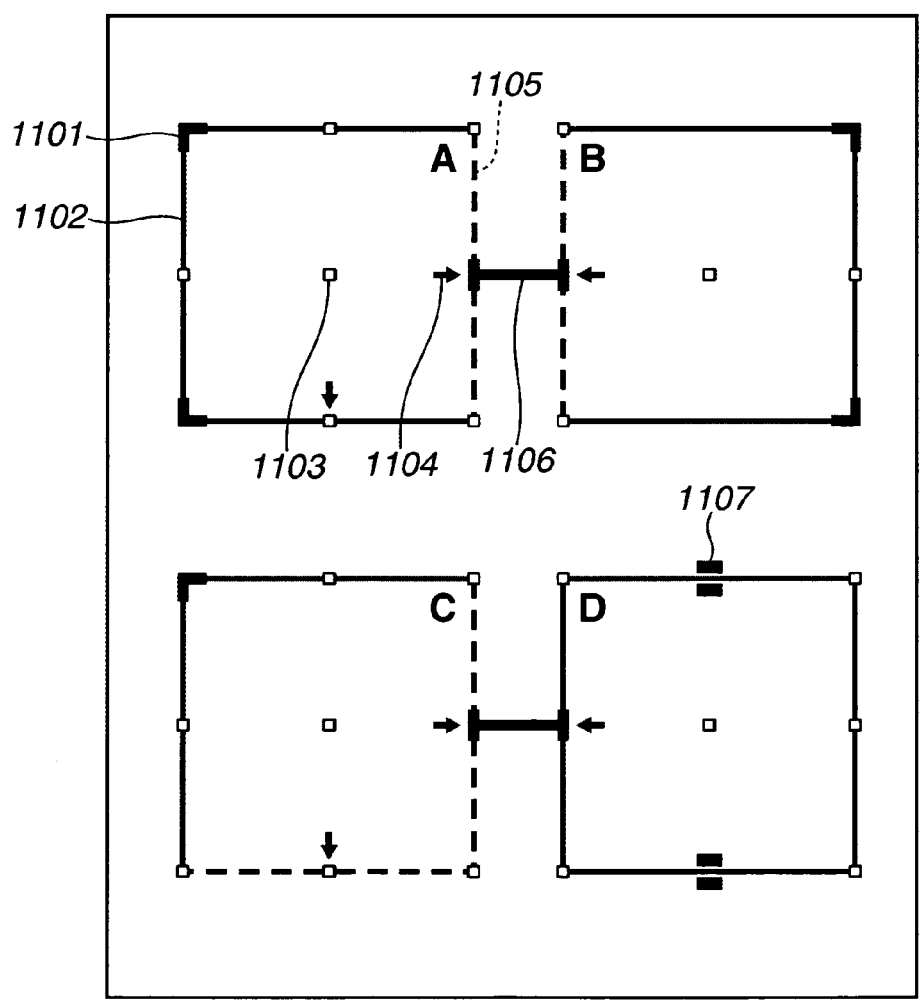
FIG. 11 illustrates a set of containers in layout calculation in the embodiment.

In an example shown in FIG. 11, anchors are set at the upper left corner and the lower left corner of the container A, so that the height (the ordinate-direction) is fixed. Therefore, the layout editing application 121 determines whether characters of an amount of the calculated data (a text amount) can be flowed into the container A having the width (a lateral direction) set to be that of the basic pattern of the container A. In a case where it is determined that all characters can be flowed thereinto, the size (the width and the height) set to be that of the basic pattern does not change. In a case where it is determined to be impossible to flow all characters thereinto, the container A expands in the lateral direction, because the height is fixed by setting the anchors. In this case, the layout editing application 121 computes the width of the container A, which allows characters of the calculated amount to be flowed thereinto, and calculates the size of the container A.

Subsequently, the layout editing application 121 optimizes the layout in step S903 so that the difference between the size of each container to be laid out and the actual content size becomes as small as possible. The optimization of the layout is performed so that the difference between the size of the content to be inserted and the size of the content to be laid out becomes as equal as possible in the containers associated with each other to dynamically change the sizes. The layout editing application 121 obtains the size of the set of the containers, which is selected in step S902, that is, a total size of the containers A and B and a link 1106 (a fixed link). Then, the layout editing application 121 calculates the difference between the total size and the size of the set of the containers in the basic layout (in the example shown in FIG. 11, the size of the set of the containers corresponds to the distance between the anchor icons of the containers A and B). In a case where a result of calculation in the preceding step reveals that the width of the container A or B is increased as a result of flowing the content into the container, a difference value is generated. The layout editing application 121 adjusts the layout by evenly distributing the difference value among the elements of the set of the containers.

The layout editing application 121 optimizes the layout. In optimizing calculation, if a violation of rules (that is, constraints imposed to the containers) has occurred, the container sizes are calculated again in step S904 to prevent occurrence of the violation of rules. The rules described herein are the constraints set by the user when creating the layout. Examples of the constraints are the size and the position of a container and the length of a variable link. In a case where the layout is calculated without violation of rules, the layout of the set selected in step S902 is completed. The processing in steps S902 to S904 is performed on all sets of the containers on the page. The layout of the entire page is calculated in step S905. If the calculation has not been performed on all container sets, processing returns to step S902 and the processing of steps S902-S904 is repeated until it is determined in step S905 that the calculation has been performed on all container sets. When processing has been performed on all container sets, the layout calculation process is finished.

FIGS. 10A to 10C are diagrams illustrating examples of the user interface window displayed at the layout calculation. FIG. 10A illustrates a state in which records are inserted, and in which the layout is determined. The containers shown in FIG. 10A include anchors 1001, 1002, fixed sides 1003, 1004, variable sides 1005, and arrows 1006 and 1007 indicating the direction of change of the variable sides 1005 of the respective containers. A link 1008 indicates an association between the containers. In this state, in a case where the records are changed, and in which contents having different sizes are inserted thereinto, the state illustrated in FIG. 10B is obtained. The displacement 1009 of each variable side in the state shown in FIG. 10A is indicated by a double-dashed-chain line. Layout calculation is performed to cause no violation of the above-described rules. FIG. 10C illustrates the result of layout calculation. The sizes of containers 1012 and 1013 are calculated to have the same difference from the size of the content to actually be inserted so that the containers are deformed in conjunction with each other, and that no violation of the above-described rules occurs. As illustrated in FIG. 10C, the sizes of the contents (a1b1c1d1 and e1f1g1h1) to be inserted shown in FIG. 10B and those of the contents (a2b2c2d2 and e2f2g2h2), which are obtained after the calculation, are calculated to have the same difference between the former content and the latter content in each of the left and right containers. The above-described process can be performed under the control of the processor unit 135 and the layout engine module 105.

Even in a case where the sizes of the containers are changed to simply have the same difference between the size obtained before the change and the size obtained after the change in each of the containers, there are no problems in the case of the layout calculation in consideration only of change in the lateral direction of the content, as illustrated in FIGS. 10A to 10C. However, in such a case, there is possibility that the sizes of the containers cannot appropriately be obtained when the layout calculation should be performed in consideration of both change in the ordinate direction and change in the lateral direction. In the case of dealing with a two-dimensional layout illustrated in FIG. 53, which has a size in the lateral direction and a size in the ordinate direction, first, adjustment in the lateral direction is performed by using the layout calculation method illustrated in FIG. 9. Subsequently, adjustment in the ordinate direction is performed by using this layout calculation method. That is, first, the layout adjustment is performed between the containers 5301 and 5302 by following the above-described procedures so that the containers 5301 and 5302 are fitted within a width of a set value D. Subsequently, the layout adjustment is performed between the containers 5302 and 5303 so that the containers 5302 and 5303 are fit within an ordinate range of a set height G. However, in the case where the layout adjustment is first performed in the lateral direction and is subsequently performed in the ordinate direction, a resultant layout may differ from the basic layout desired by a user. To prevent deviation of the resultant layout from the basic pattern (the aspect ratio) as much as possible in each container, the following method is devised and may be employed. That is, the square of the difference in width between the basic pattern and the adjusted layout is added to the square of the difference in height between the basic pattern and the adjusted layout. The sum is calculated corresponding to each of all containers. Then, the layout editing application 121 may perform layout adjustment by calculating the width and the height of each container to minimize the total of the sums of the squares respectively corresponding to the containers.

When the layout adjustment is performed by using this least square method, a wholly well-balanced final layout can be determined without largely deviating from the basic layout initially set by the user. A variable link, which will be described later, is set between the containers. Thus, the size of a link is changed according to the size of content data to be flowed thereinto, as will be described later. The layout editing application described in the present application has such a layout adjustment unit and can control the laid-out positions of a plurality of partial display area (or containers) according to the sizes of allocated data.

Setting of Variable Link

Figure 12:
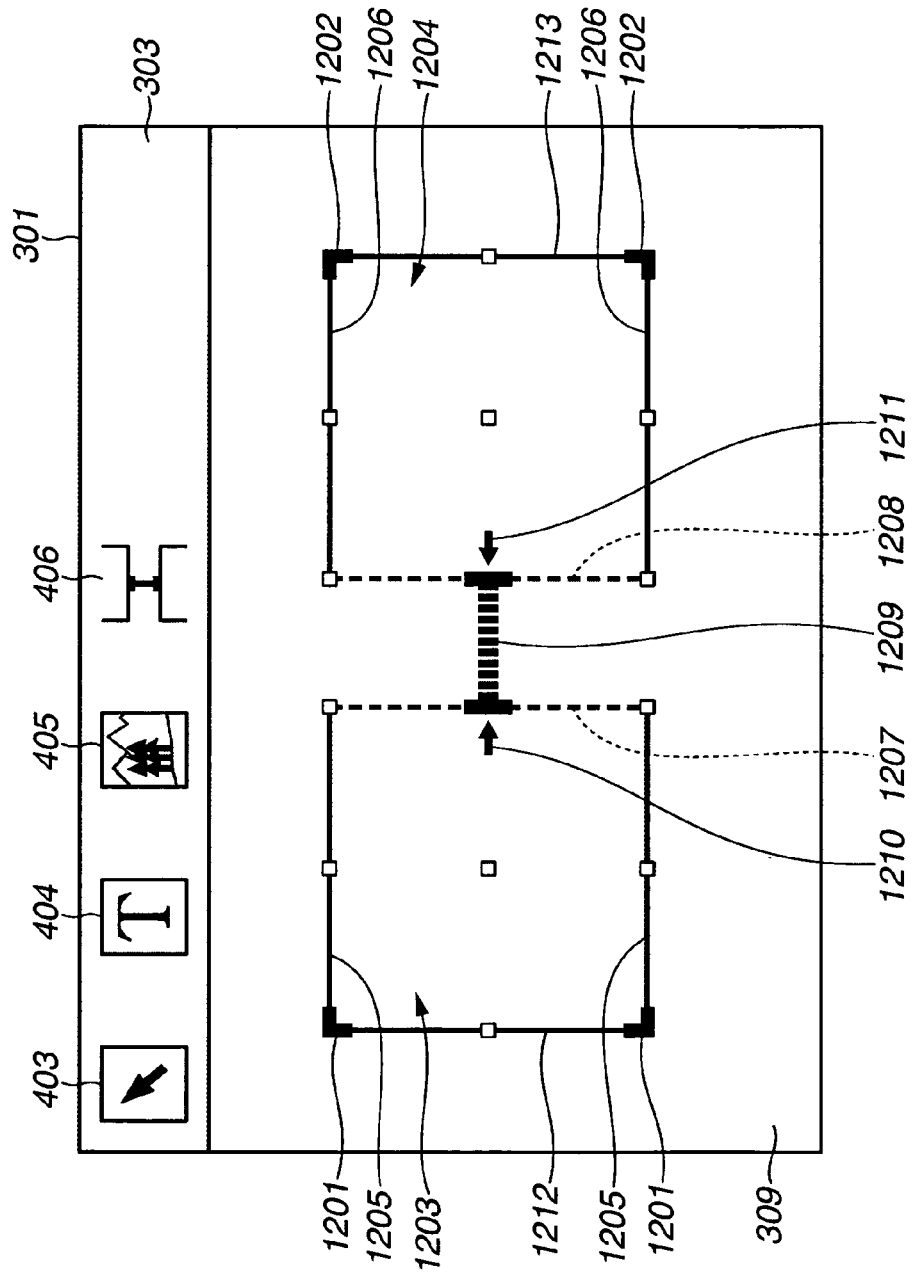
FIG. 12 illustrates the layout of containers using a variable link in the automatic layout system.

FIG. 12 illustrates a state in which a general variable link 1209 is set in an interface window. Similarly to the interface in the case shown in FIG. 4, the interface has an application window 301 and a tool bar 303. Typically, containers 1203 and 1204 are present on a document template 309. These containers 1203 and 1204 include anchor icons 1201 and 1202, and fixed sides 1205, 1206, 1212, and 1213. A link 1209 having a variable size is set between the containers 1203 and 1204 to connect therebetween. Because the link 1209 is set between the containers 1203 and 1204, a right side 1207 of the container 1203 and a left side 1208 of the container 1204 are indicated by dotted lines. Indicators 1210 and 1211 are respectively displayed in the containers 1203 and 1204 to indicate that the sides 1207 and 1208 are variable.

Figure 14:
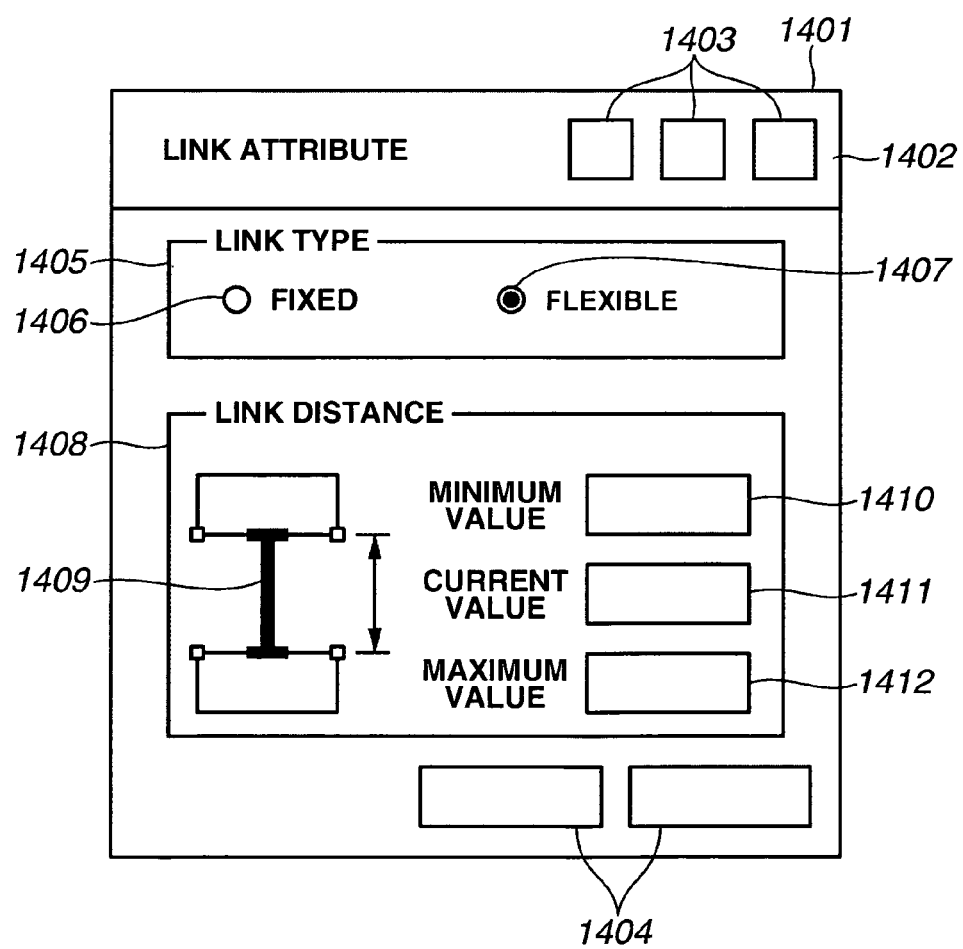
FIG. 14 illustrates an example of a dialog window in which the attribute of a link is set.

FIG. 14 illustrates an example of a dialog window 1401, in which the information on the link 1409 is set. This dialog window includes a title bar 1402, toolbar buttons 1403, buttons 1404 used to open/close the dialog window, and areas 1406, 1407, and 1410 to 1412 used to set various kinds of information. In this dialog window, a link type area 1405 allows for the alternative selection of the type of the link on a variable length type 1407 or a fixed length type 1406. In a case where the link type is of the variable length type, the maximum value 1412, the minimum value 1410, and the current value 1411 of the link length can be set in a link distance area 1408 of the dialog window. The current value 1411 between the containers is the length of the link used in a case where the size of each of the containers is not changed when data is flowed thereinto.

Figure 13:
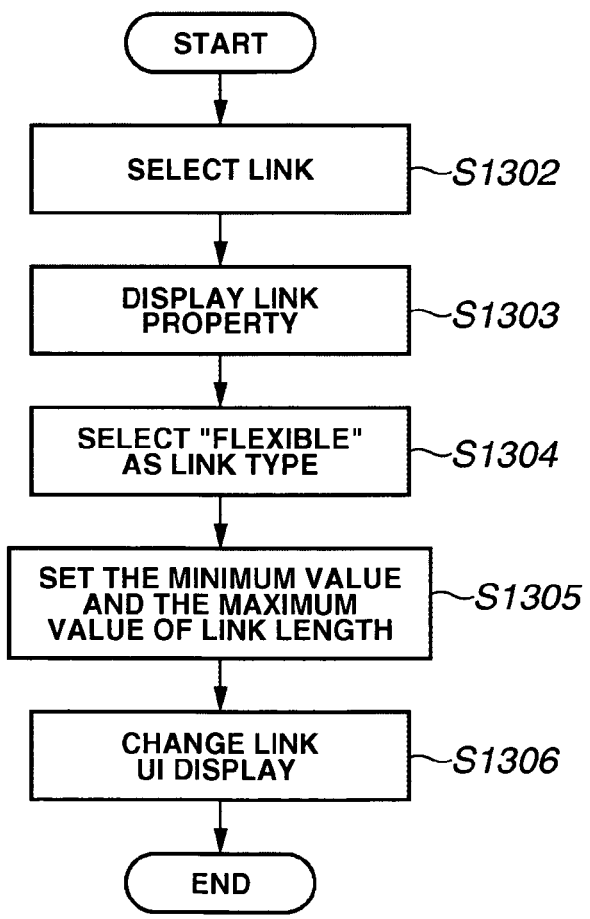
FIG. 13 is a flowchart illustrating the process of setting the variable link in the automatic layout system.

FIG. 13 is a flowchart illustrating a process of setting a variable link in the automatic layout system. In step S1302, a link to be set is selected by clicking on the link 1209 (of FIG. 12) with the mouse 133. The link 1209 shown in FIG. 12 indicates a variable link. It is assumed that this indicates a state in which the type of this link has been changed from the fixed link to the variable link. In step S1303, the layout editing application 121 displays a property dialog window 1401 such as the one shown in FIG. 14 of the link 1209, which is selected by clicking the right button of the mouse or operating a specific key of the keyboard thereon. In this state, the link size is not variable and is fixed. Therefore, the fixed type 1406 is selected as the link type 1405. To change the type of the link from the fixed size type to the variable size type, the variable type 1407 is selected in step S1304 in the link type area 1405 to set the variable type to be the variable link size type. Consequently, the maximum value 1412, minimum value 1410, and the current value 1411 arranged in the link distance area 1408 are validated, and the setting of numerical values is enabled. To set the variable size of the link, the user sets the maximum value of the link length in the area corresponding to the maximum value 1412, the minimum value in the area corresponding to the minimum value 1410, and the current value in the area corresponding to the current value 1411 in step S1305. In a case where the setting is applied by the general dialog window open/close button 1404, the UI display of the link changes to the link 1209 shown in FIG. 12 in step S1306. Setting information on the dialog window 1401 is stored in the memory unit 136.

Figure 15:
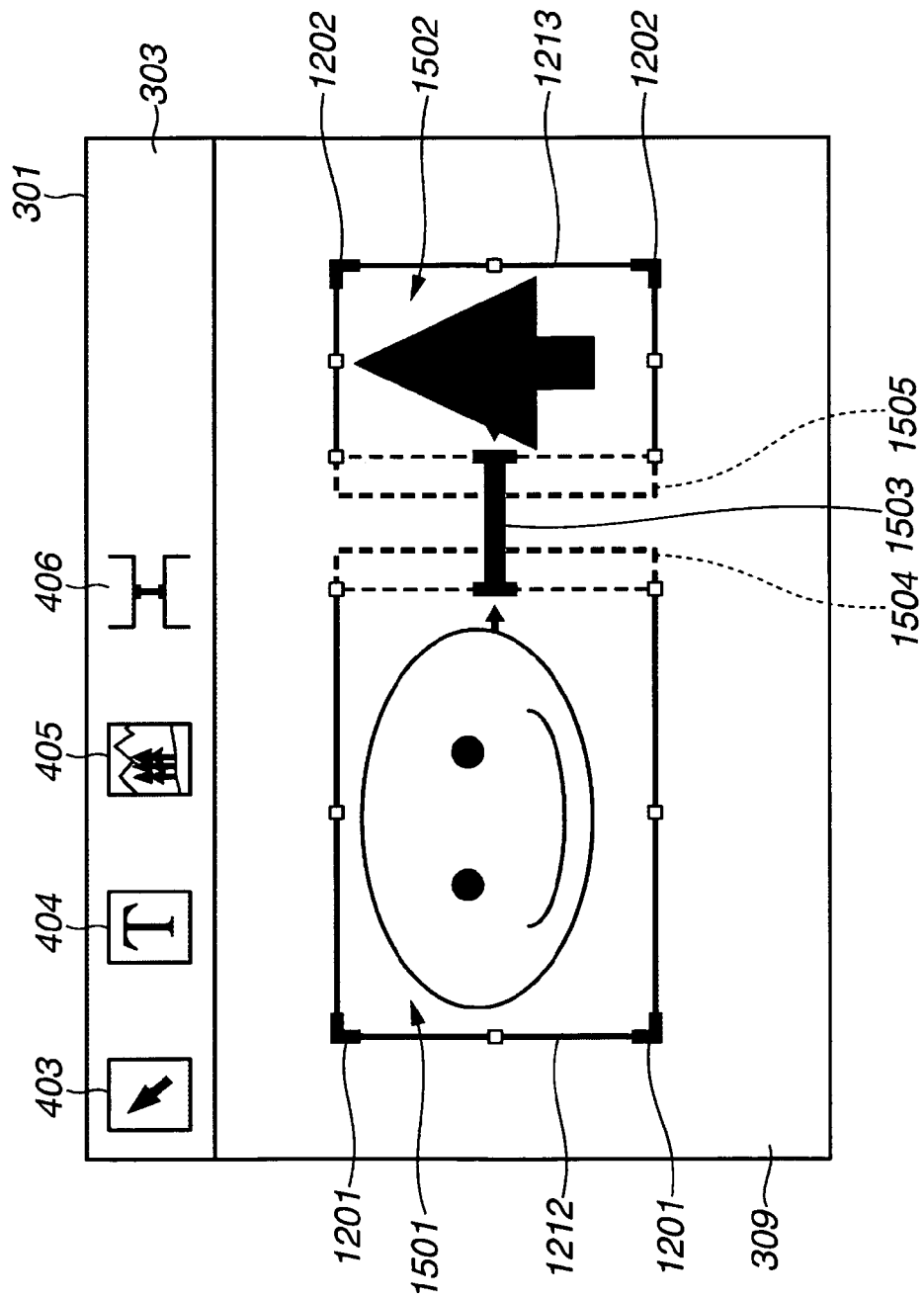
FIG. 15 illustrates a layout result obtained by a fixed link in the automatic layout system.

FIG. 15 is a diagram illustrating a resultant layout in a case where a link having a fixed size is used. Layout calculation by the layout engine module 105 of the layout editing application 121 is performed by following the above-described procedure. For example, when data having different sizes are inserted into the containers 1203 and 1204 shown in FIG. 12, respectively, each of the containers 1203 and 1204 regards the size of the data size as optimum. Thus, the container 1203 rightwardly and largely changes the size thereof to be close to a frame 1504 (an optimum container size), whose size corresponds to the size of the inserted image. Similarly, the container 1204 leftwardly changes the size thereof in a largish manner to be close to a frame 1505 (an optimum container size), whose size corresponds to the size of the inserted image.

However, assuming that a link 1503 having a fixed size is set between the containers 1203 and 1204, the left side 1212 of the container 1203 and the right side 1213 of the container 1204 cannot move, due to the anchors 1201 and 1202. Therefore, the changed sizes of the containers become larger than the link size. Because the link size is fixed and is preferentially computed at the layout calculation, the sizes of the container 1203 (see FIG. 12) and the container 1204 (see FIG. 12) are changed. Consequently, the containers 1203 and 1204 cannot ensure the optimum sizes that are fitted to the data. Finally, the container sizes of the containers like those 1501 and 1502 shown in FIG. 15 are smaller than the optimum sizes 1504 and 1505. That is, because the size of the link 1503 is fixed, the containers 1501 and 1502 cannot obtain the optimum sizes.

Figure 16:
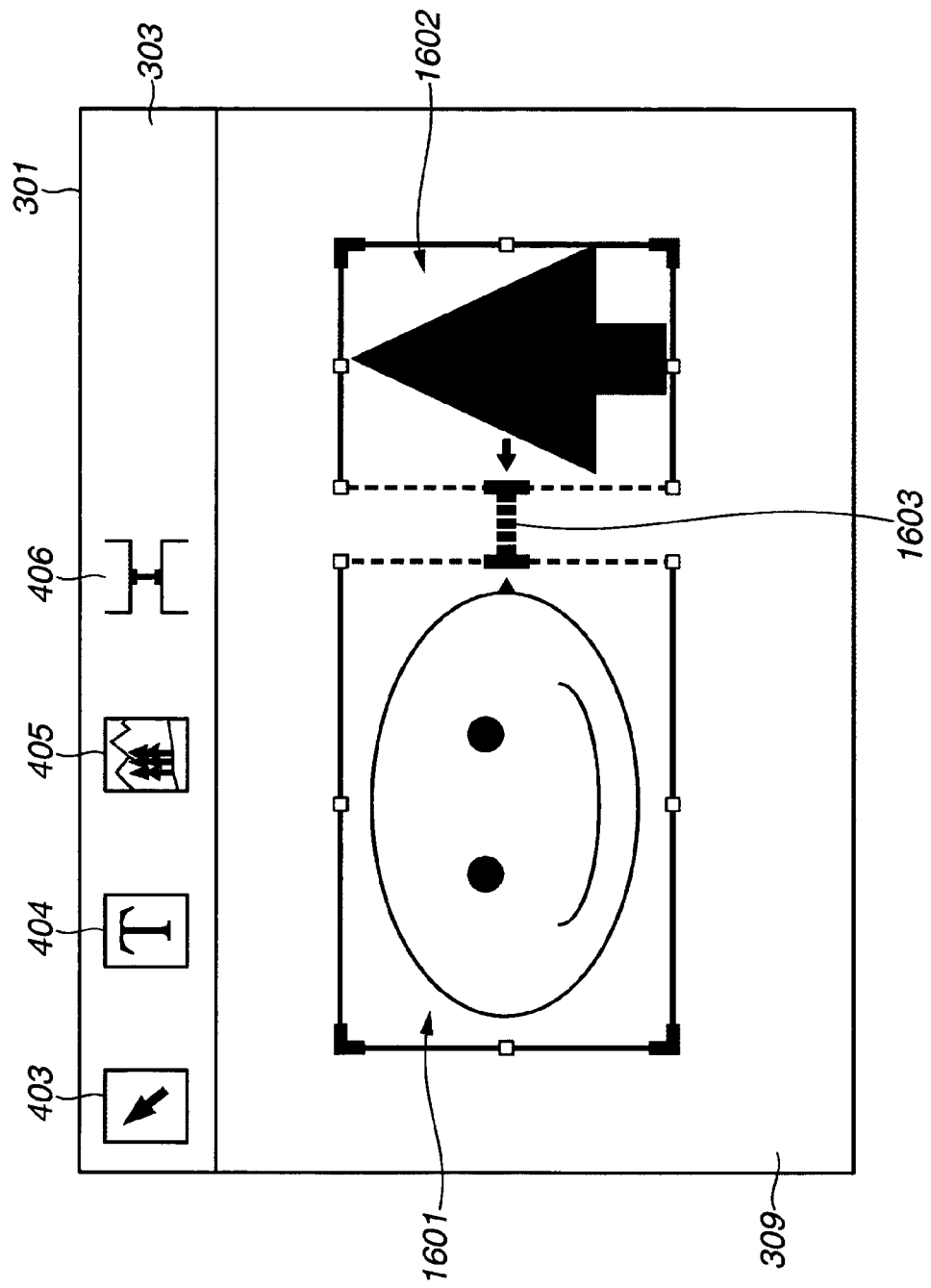
FIG. 16 illustrates a layout result obtained by a variable link in the automatic layout system.

FIG. 16 illustrates a case where the type of the size of the link is changed to a variable size. In this case, assuming that a link 1209 (see FIG. 12) having a variable size is set between the containers 1203 and 1204 (see FIG. 12) of the above-described example, when the sizes of the containers 1203 and 1204 are changed, the size of the link is reduced so that the containers 1203 and 1204 can be larger than the sizes shown in the example shown in FIG. 15. Thus, optimum sizes fit to the sizes of the inserted data can be achieved. Alternatively, the frames of the containers can be computed to be close to the sizes (optimum sizes) of the inserted data. FIG. 16 shows resultant containers 1601 and 1602. The size of the variable link 1209 changes to a size of a variable link 1603, as a result of the layout calculation. In this case, the containers 1601 and 1602 deform in conjunction with each other and have optimum sizes (sizes fitted to the sizes of the data). The above-described process can be performed under the control of the processor unit 135 and the layout editing application 121.

Setting of Container Property

Figure 17:
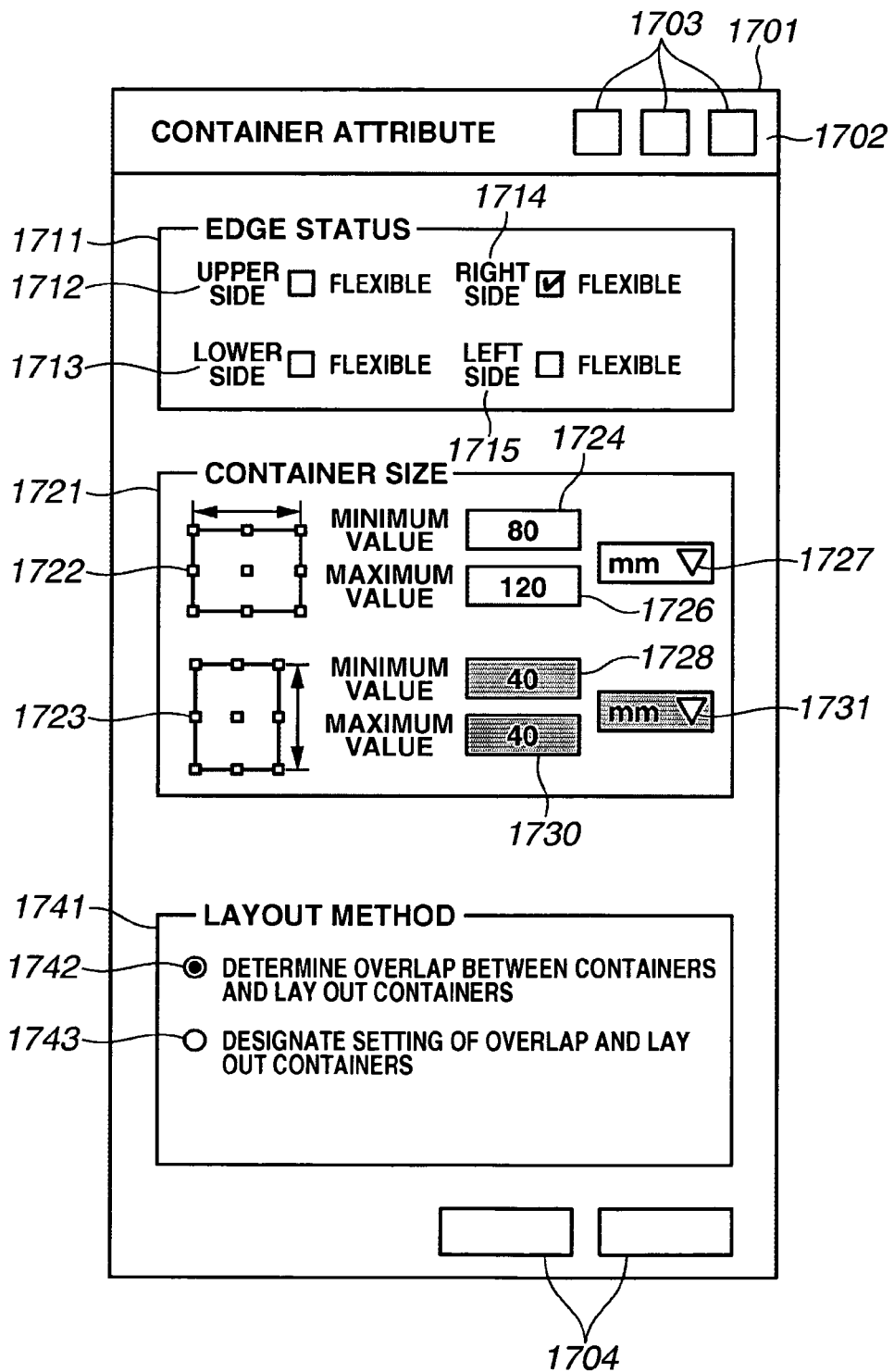
FIG. 17 illustrates an example of a property dialog window in which the attribute of a container is set.

FIG. 17 illustrates an example of a property dialog window used to set the properties (attributes) of a container. The property dialog window can be displayed, for example, by selecting a container through the use of the keyboard 132 and/or the mouse 133, e.g., by clicking the right button of the mouse on the menu to select, or by performing a predetermined operation by using an Alt key.

The exemplary property dialog window 1701 shown in FIG. 17 includes a title bar 1702, toolbar buttons 1703, buttons 1704 used to open/close the property dialog window, and areas 1711, 1721, and 1741 in which various kinds of information are set. This property dialog window 1701 has an edge status setting area 1711 adapted to set sides (edges) of a container to be variable. When check boxes 1712 to 1715 respectively corresponding to the upper side, the lower side, the right side, and the left side, which are provided in the edge status setting area 1711, are checked (that is, the edge of a container is set to be variable), the container size setting area 1721 is enabled.

FIG. 17 illustrates an example of a state in which the right side 1714 is set to be variable. Thus, this container can be changed in size only in the lateral direction (i.e., in the rightward direction). The attribute of this container is set so that the sizes of the sides (edges) (the upper side 1712, the lower side 1713, and the left side 1715 in the example illustrated in FIG. 17) respectively corresponding to unchecked boxes in the edge status setting unit 1711 are fixed.

Because the size of the right side corresponding to the checked box 1714 in the edge status setting area 1711 is set to be variable, the setting boxes 1724, 1726, and 1727, which are used to set the maximum value and the minimum value, in the lateral direction in the container size setting unit 1721 are enabled, the setting boxes 1728, 1730, and 1731 used to set the size in the direction of height remain disabled. Graphic display sections 1722 and 1723 use bitmaps to respectively visually assist the designation of the size of the width and height of the container. In the box 1724, the minimum value of the width of the container is set. In the example shown in FIG. 17, a value "80" is set as the minimum value. In the box 1726, the maximum value of the width of the container is set. In the example shown in FIG. 17, a value "120" is set as the maximum value. In a case where at least one of the upper side and the lower side is set to be variable as the edge status, similarly, the boxes 1728 and 1730 respectively corresponding to the minimum value and the maximum value of the height of the container can be enabled. Units to represent the sizes of the containers are set in list boxes 1727 and 1731. In this case, "millimeters" (mm) is indicated as an example. However, other units, e.g., "inches", "pixels" or the like can be employed. Such setting information is held by the memory unit 136.

Figure 18:
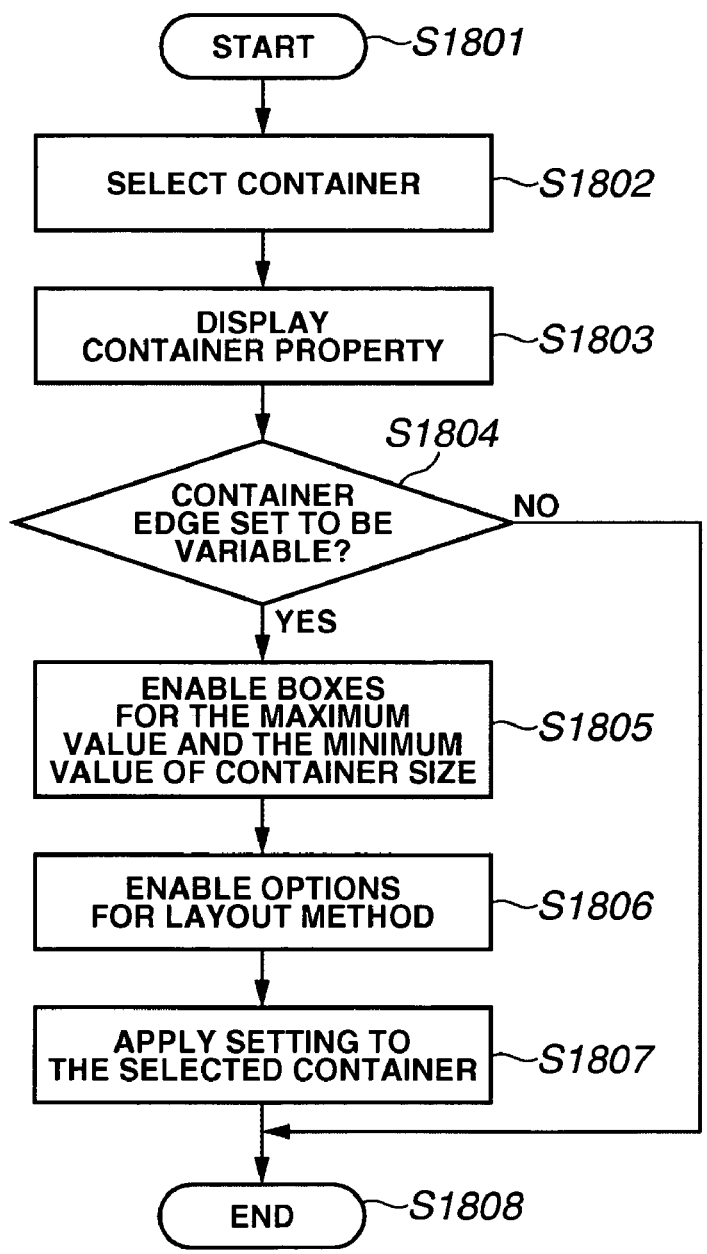
FIG. 18 is a flowchart illustrating the flow of a process performed by a layout editing application in an operation of setting the property of a container.

FIG. 18 is a flowchart illustrating a process performed by the layout editing application 121 in a container property setting operation. First, a container is selected in step S1802, e.g., by clicking the mouse 133 to select the container. The layout editing application 121 displays a property dialog window 1701 for the selected container in step S1803. Then, the layout editing application 121 determines in step S1804 whether each of the check boxes 1712 to 1715 is checked to set the respective edge of the container to be variable. If it is determined in step S1804 that no boxes to set the edges of the container are checked (no in step S1804), the process is terminated.

Conversely, if it is determined in step S1804 that the box is checked to set the corresponding edge to be variable (yes in step S1804), the boxes respectively corresponding to the maximum value and the minimum value of the size of the container are enabled in step S1805. Because the setting information is held by the memory unit 136, the determination can be performed by causing the layout editing application 121 to refer to the memory unit 136. Also, boxes corresponding to options for the layout method are enabled in step S1806.

As shown in FIG. 17, a layout method area is used to select a layout method. In a case where the layout of containers is performed by determining the overlap of containers, an entry field 1742 is checked. In a case where the entry field 1742 is checked, the layout editing application 121 performs the setting of container attributes relating to the overlap, the calculation of overlap prediction, and the setting of dynamic guides and overlap preventing variable links, which will be described in detail later. Alternatively, another entry field

1743 is used to lay out containers by setting, when the overlap between the containers occurs, the form of the overlap (for instance, a form in which one of the containers is placed on top of the other container, the rejection of the overlap, and so on). In a case where the entry field 1743 is checked, the layout editing application 121 lays out the containers according to the setting of the form of the overlap described in the following description of a second embodiment.

Then, the container property dialog window 1701 is closed by using the close button. The setting is applied to the selected container in step S1807.

Figure 19:
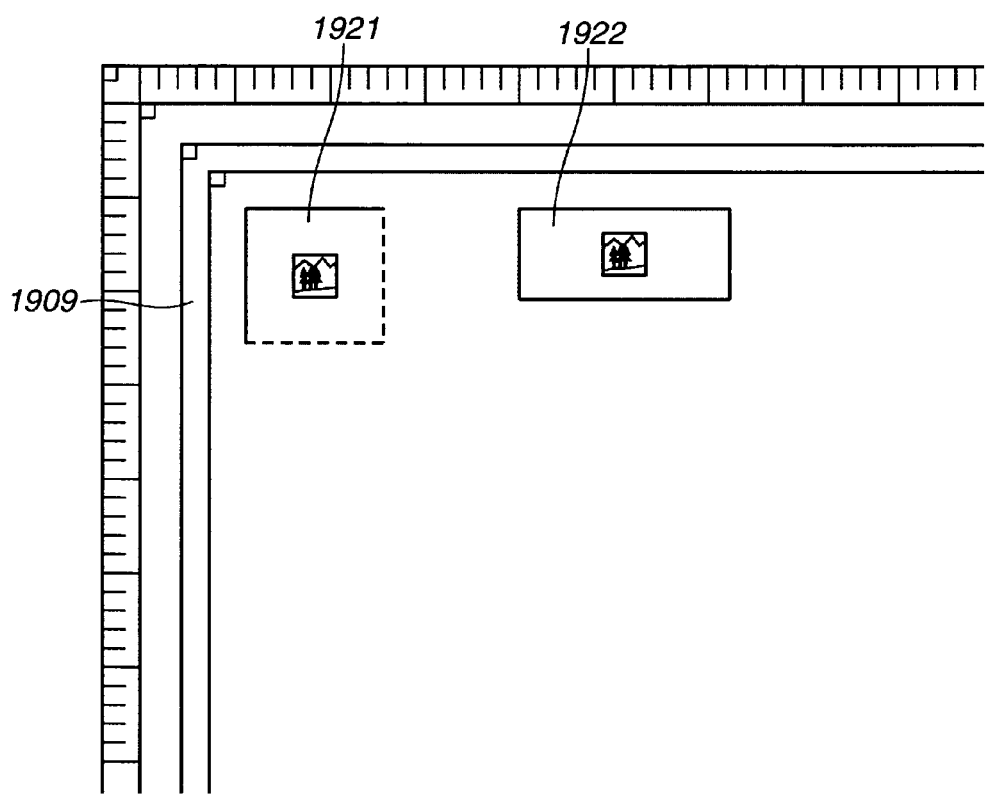
FIG. 19 illustrates an edit window used by the layout editing application before the setting of a container is variably set.

Data set by the process illustrated in a flowchart illustrated in FIG. 18 using the property dialog window 1701 illustrated in FIG. 17 is held in the memory unit 136 in the form shown in FIG. 49. For example, the setting information for the attributes of the containers 1921 and 1922 placed on a document template 1909 shown in FIG. 19 is described below. In the case shown in FIG. 19, the container 1921 is set so that the right side and the lower side are variable. Also, as shown in FIG. 49, the attribute of the container 1921 is set to be variable in the lateral direction and in the ordinate direction. Then, different values are set as the maximum value and the minimum value. Thus, the size of this container can be changed within a preset range according to the size of variable data to be flowed into the container 1921. In contrast, the container 1922 is set so that the sizes of all of the four sides thereof are fixed. Thus, as shown in FIG. 49, the attribute of the container 1922 is set to be fixed in both of the lateral direction and the ordinate direction, so that the same value is set as the maximum value and the minimum value. Thus, in case that any variable data is flowed thereinto, the size of the container 1922 is fixed at a set value.

Thus, data representing the setting of each container, which is set as illustrated in FIG. 17, is held in the memory unit 136 in the form illustrated in FIG. 49.

Overlap Preventing Variable Link Setting Flow

Figure 24:
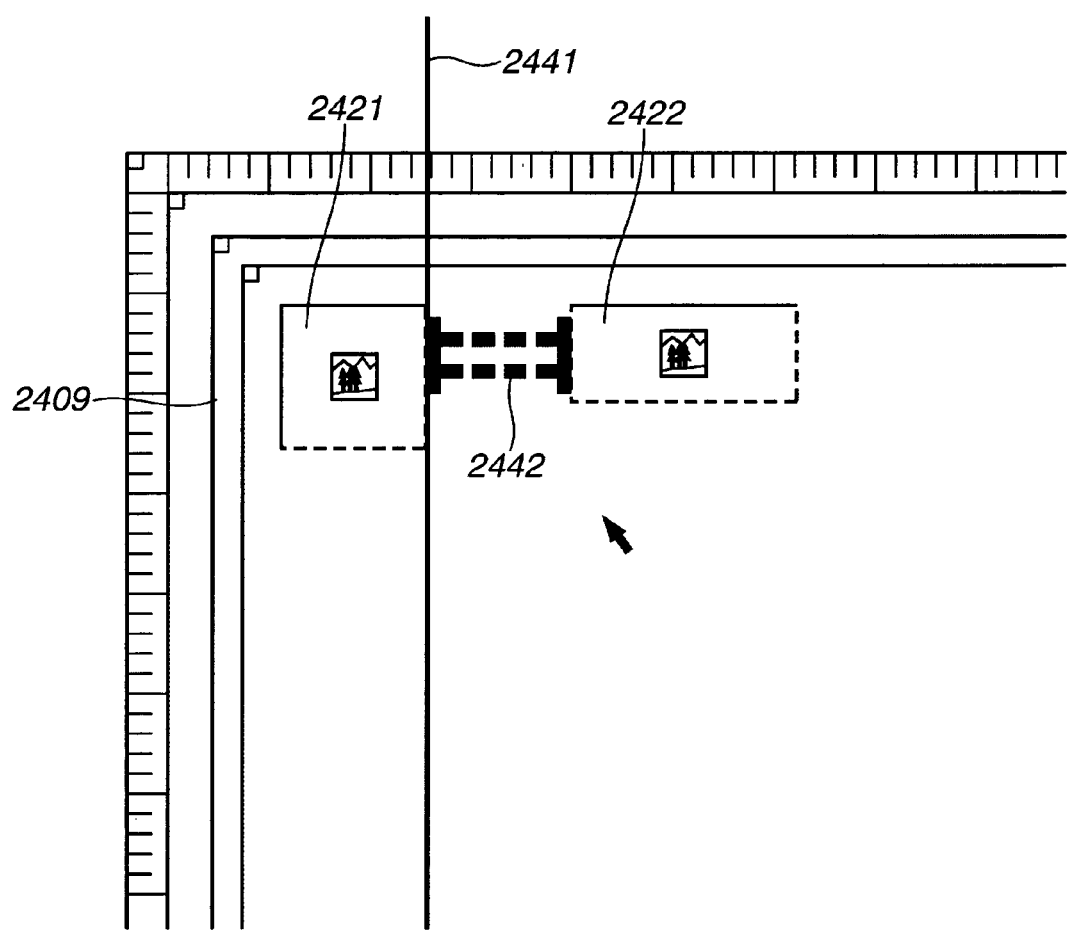
FIG. 24 illustrates an edit window in which the layout editing application displays a Y-direction dynamic guide and an X-direction overlap preventing variable link.
Figure 25A:
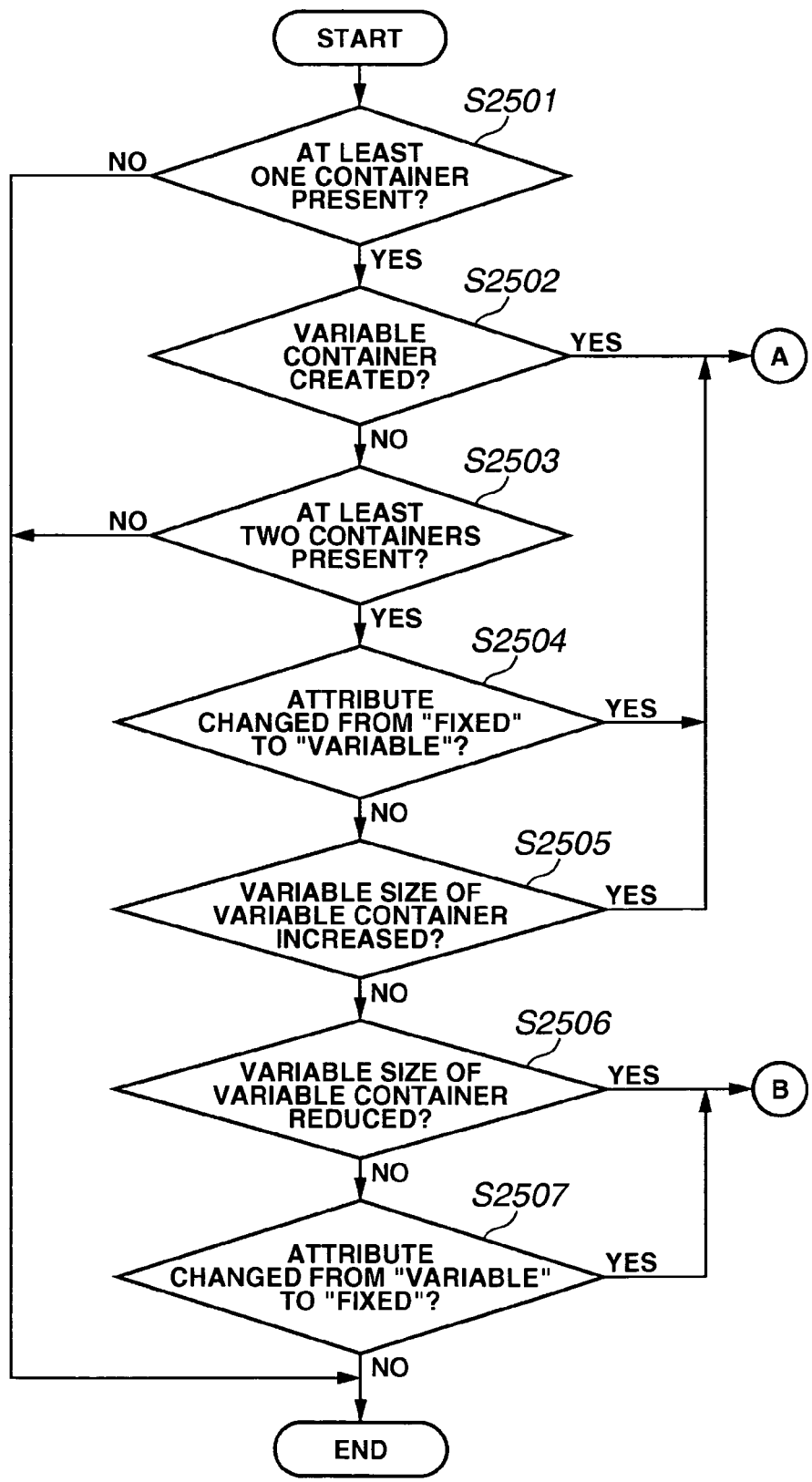
FIGS. 25A to 25C are a flowchart illustrating the flow of an overlap-preventing variable-link setting process performed by the layout editing application.
Figure 25B:
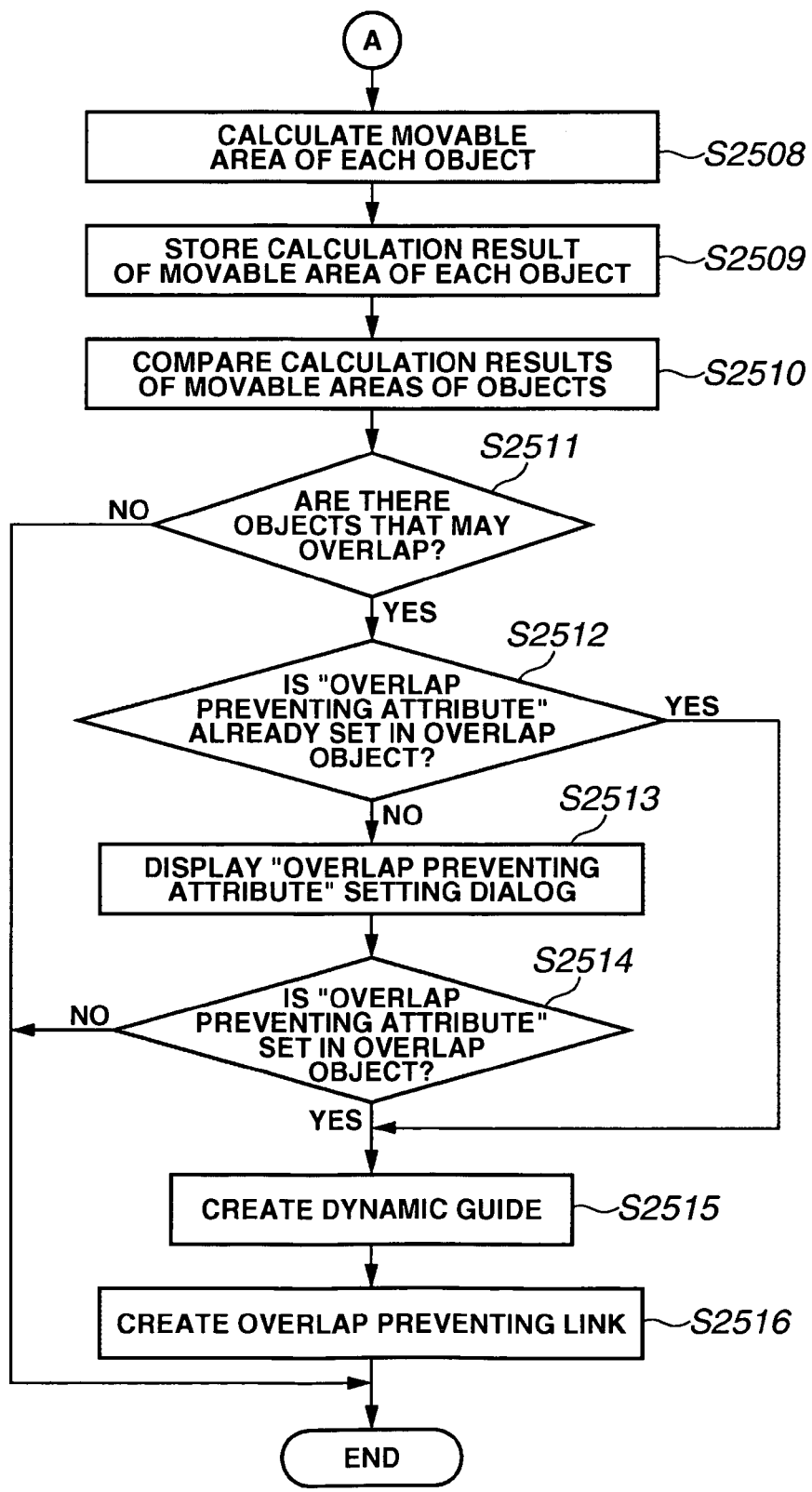
Figure 25C:
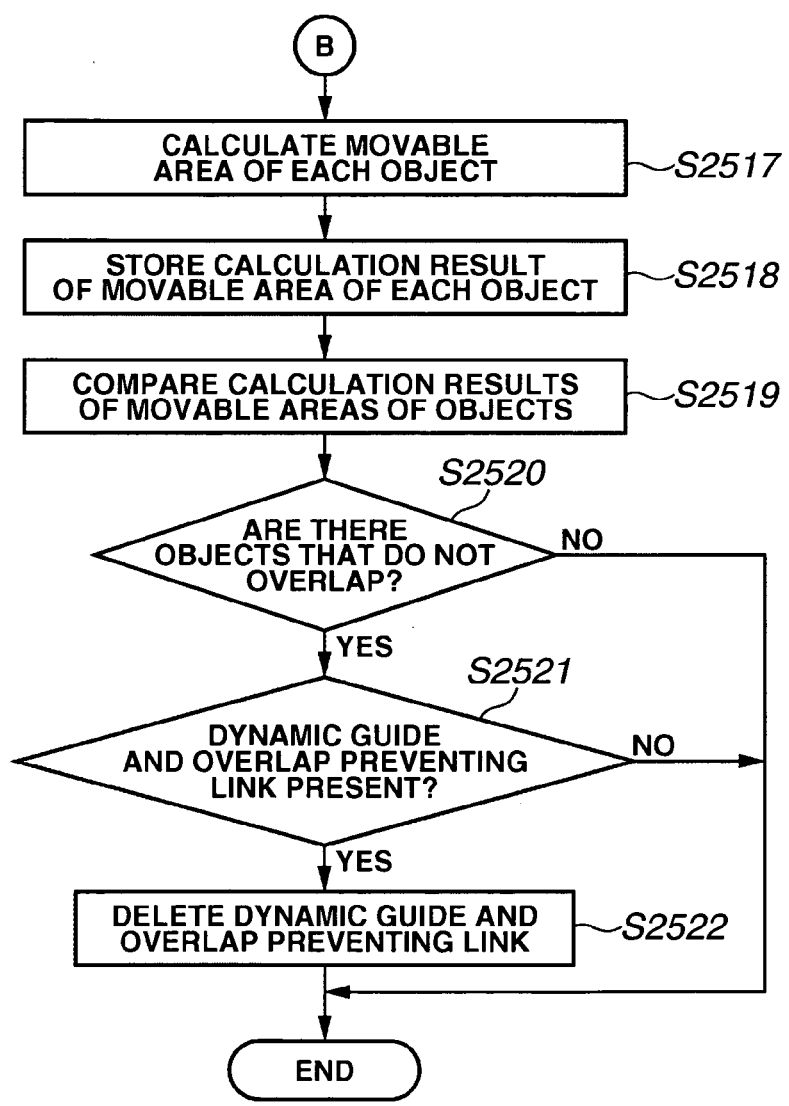

FIGS. 25A to 25C are a flowchart illustrating the flow of an overlap preventing variable link setting process performed by the layout editing application 121. The flow of this process is described below by referring to FIGS. 17, 19 to 22, and 24.

FIG. 19 is a diagram illustrating an edit window displayed by the layout editing application 121. An image container 1921 serving as a dynamic object, whose size can be changed, and an image container 1922 serving as a static object, whose size is fixed, are present on a document template 1909. In the present application, entities disposed on a page template are generically referred to as objects. Thus, a container, in which content data flowed from a database is provided, is sometimes referred to as an object. In a case where a container is discriminated from an object, the container is clearly referred to as a partial display area.

Figure 20:
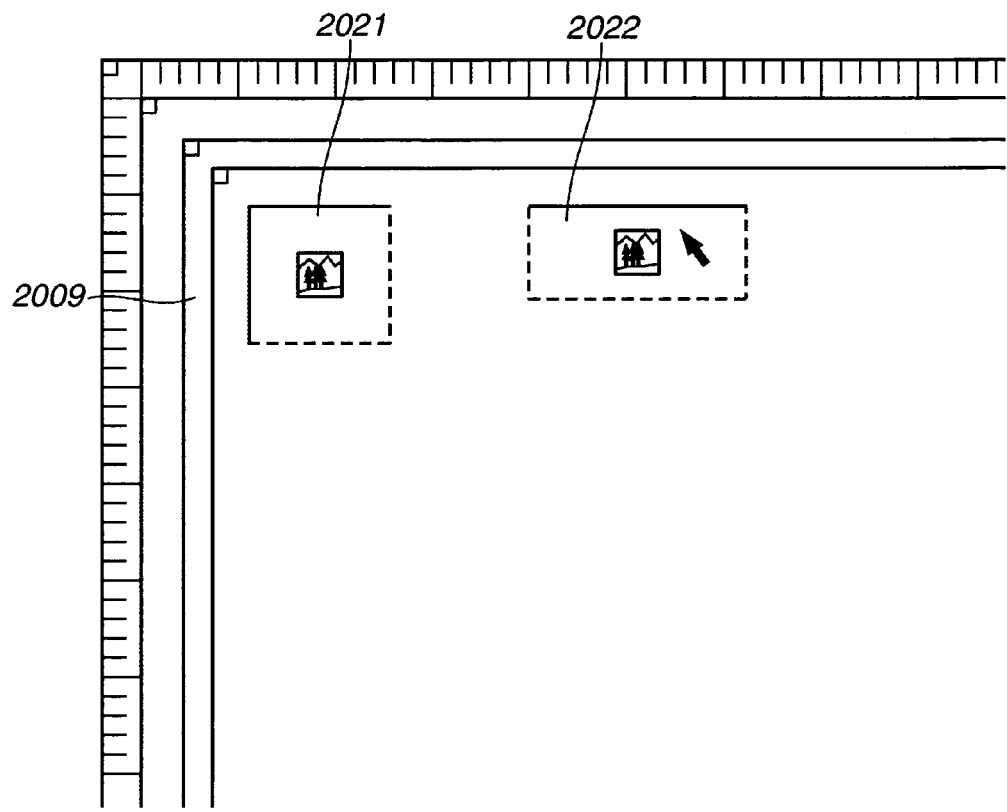
FIG. 20 illustrates the edit window used by the layout editing application in a case where an image container serving as a static object shown in FIG. 19 is selected by a mouse pointer and where the set property of the image container is variably changed.

FIG. 20 is a diagram illustrating an edit window displayed by the layout editing application 121 in a case where the image container 1922 serving as a static object shown in FIG. 19 is selected and where the attribute of the container is set to be variable. An image container 2021 serving as a dynamic object and an image container 2022 serving as a static object are present on a document template 2009. The setting of the container is changed from the fixed container 1922 to the variable container 2022, so that the setting information illustrated in FIG. 49 is changed to the setting information illustrated in FIG. 50. The size in the lateral direction and that in the ordinate direction of the container 1922 are fixed, as illustrated in FIG. 49. However, the size in the lateral direction and that in the ordinate direction of the container 2022 are variable, as illustrated in FIG. 50. In response to this change, the maximum value and the minimum values in each of the direction of width and the ordinate direction of the container 1922 (referred to as container 2022 after the change) are newly set. Information on the newly set values is held in memory unit 136.

Figure 21:
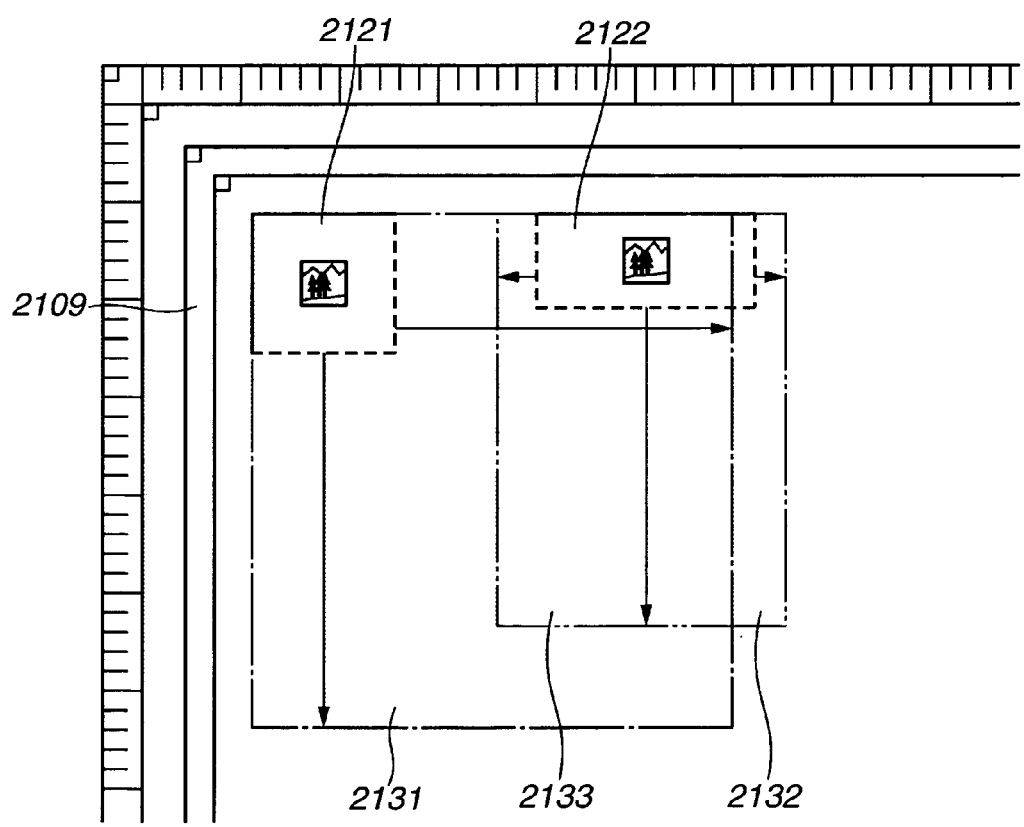
FIG. 21 illustrates maximum movable areas of the image containers and a predicted overlap area therebetween.

FIG. 21 illustrates a maximum movable area of each of the image containers 2021 and 2022 shown in FIG. 20 and a predicted overlap area therebetween, which are calculated by the layout engine module 105 (hereunder sometimes referred to simply as a layout engine 105). More specifically, a predicted maximum movable area 2131 of an image container 2121 (image container 2021 in FIG. 20) and a predicted maximum movable area 2132 of an image container 2122 (image container 2022 in FIG. 20) are displayed in the document template area 2109. A predicted overlap area 2133 between the image containers 2121 and 2122 is also shown.

A method of predicting the maximum movable area of each container by the layout engine is described below. As described above, data representing the maximum value and the minimum value corresponding to each container are held in the form illustrated in FIG. 50 in the memory unit 136. Thus, the layout engine 105 can predict the maximum movable area by taking the position, at which each container is disposed, and the maximum value set therein. The method of predicting the maximum movable area sometimes takes into account not only the maximum value corresponding to each container but the relationship between containers associated with each other through the link.

Figure 22:
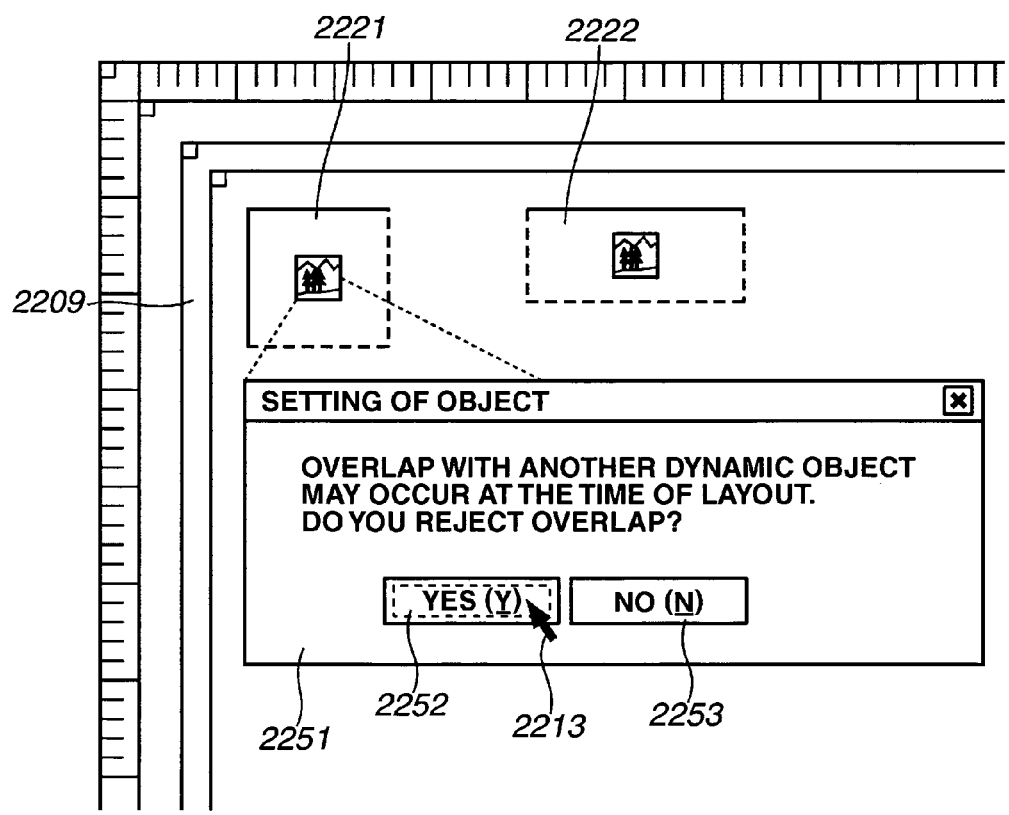
FIG. 22 illustrates an edit window in which the layout editing application displays a dialog box used to cause a user to determine whether to allow a dynamic object to be edited to overlap with another dynamic object.

FIG. 22 illustrates an edit window displayed by the layout editing application 121, which shows a dialog box 2251 in the document template. The dialog box 2251 is used to cause a user to determine whether to allow a dynamic object to be edited to overlap with another dynamic object. When "YES" 2252 in the dialog box 2251 is selected by a user, e.g., via a mouse pointer 2213, the layout editing application 121 sets this container in a condition in which the overlap between the container 2221 and another dynamic object (e.g., container 2222) is rejected. Conversely, when "NO" 2253 in the dialog box 2251 is selected, the layout editing application 121 sets this container in a condition in which the overlap between the container 2221 and another dynamic object (e.g., container 2222) is allowed. Setting information on these conditions is held by the memory unit 136.

FIG. 24 illustrates an edit window displayed in the document template 2409 by the layout editing application 121. The edit window shows an ordinate dynamic guide 2441 and a horizontal overlap preventing variable link 2442. The dynamic guide 2441 and overlap preventing variable link 2442 are set by selecting "YES" in the dialog box 2251 shown in FIG. 22 to set the container in a condition in which the overlap between this container 2421 and another dynamic object is rejected. In the present application, to discriminate the ordinary variable link from the overlap preventing variable link, the ordinary variable link is indicated by a dotted line, while the overlap preventing variable link is indicated by a double-width dotted line.

In the case of the example shown in FIG. 24, the dynamic guide 2441 is in contact with the right side of the image container 2421. The overlap preventing variable link 2442 is used to prevent overlap between the image containers 2421 and 2422.

A flowchart illustrating the flow of an overlap preventing variable link setting process performed by the layout editing application 121 is shown in FIGS. 25A to 25C and is described next.

The layout editing application 121 determines in step S2501 whether at least one object is present on the document template. Because data presenting the attributes of containers and links set on each document is stored in the memory unit 136 in the form illustrated in, for example, FIG. 50, the layout editing application 121 can perform the determination in step S2501 by referring to the memory unit 136.

If the layout editing application 121 determines in step S2501 that there is not at least one container present on the document template (no in step S2501), processing ends. However, if the layout editing application 121 determines in step S2501 that at least one container is present on the document template, it is determined in step S2502 whether a variable container is additionally and newly created. When a container is created on the document template, information on the container is temporarily stored in the memory unit 136. Thus, in a case where the layout editing application 121 updates the memory unit 136, the determination in step S2502 can be performed by comparing the information temporarily held in the memory unit 136 with the information held in the updated memory unit 136.

If it is determined in step S2502 that no variable container is newly created, the layout editing application 121 determines in step S2503 whether at least two containers are present on the document template. A determining method is similar to that performed in step S2501. Thus, the detailed description of the determining method is not repeated here.

If it is determined in step S2503 that there are not at least two containers present on the document template (no in step S2503), processing ends. However, if it is determined in step S2503 that at least two containers are present on the document template, it is determined in step S2504 whether the attribute of the container is changed from the fixed container to the variable container. A determining method is similar to that performed in step S2501. Thus, the detailed description of the determining method is not repeated here.

If it is determined in step S2504 that the attribute of the container is not changed from the fixed container to the variable container, in step S2505 the layout editing application 121 determines whether the size of the variable container disposed on the document template is changed in an expanding direction. Particularly, the range, in which the size of the variable container is changed, has been set, so that the layout editing application 121 determines whether the size of the variable container is changed to increase the maximum size thereof. Similarly to step S2502, the layout editing application 121 can make determination by performing a comparison process.

In a case where an affirmative decision (yes) is obtained in one of steps S2502, S2504, and S2505, the layout editing application 121 proceeds to a process of setting a dynamic guide and an overlap preventing link, which is performed in step S2508 (FIG. 25B) and is described later.

If a negative decision (no) is obtained in step S2505, the layout editing application 121 determines in step S2506 whether the size of the variable container disposed on the document template is changed in a reduction direction. Processing performed in step S2506 differs from the determination in step S2505 only in that the expanding direction is changed to the reduction direction. Basically, the determining method is similar to that used in step 2505.

If a negative decision (no) is obtained in step S2505, the layout editing application 121 determines in step S2507 whether the variable container disposed on the document template is changed to a fixed container.

If it is determined in step S2507 that the attribute is not changed from a variable container to a fixed container (no in step S2507), processing ends.

If an affirmative decision (Yes) is obtained in one of steps S2506 and S2507, the layout editing application 121 advances to step S2517 (FIG. 25C), and performs a process of deleting the overlap preventing link described later.

As shown in FIG. 25B, at step S2508, the layout editing application 121 enters the process of setting a dynamic guide and an overlap preventing link. The layout editing application 121 causes the layout engine 105 to calculate the movable area of each of the containers disposed on the document template, which include a newly created container and a container whose setting is changed, in step S2508 by taking into consideration the property of the container, which is set by the check boxes 1712 to 1715 of the property dialog window 1701 shown in FIG. 17 to be variable in the horizontal (or lateral) direction and in the ordinate (or up-down) direction, and also taking into consideration the setting of the maximum value of the size of the container, which is performed by using the setting boxes 1726 and 1730, and variable factors due to another container, which include the setting of the link in a case where a link is set corresponding to the container.

That is, the layout engine 105 calculates the maximum movable range of a dynamic object (for example, a container), on which an editing operation of changing the setting of the property thereof is performed, according to the following two factors: (1) the factor of setting the maximum size of the container; and (2) the variable factor due to another container linked therewith. That is, the factor (1) indicates how the container is expanded by the content data flowed thereinto according to the maximum size set corresponding to the container. The factor (2) is the variable one caused by being affected by a change in the size or the position of another container linked therewith.

Figures 51, 53:
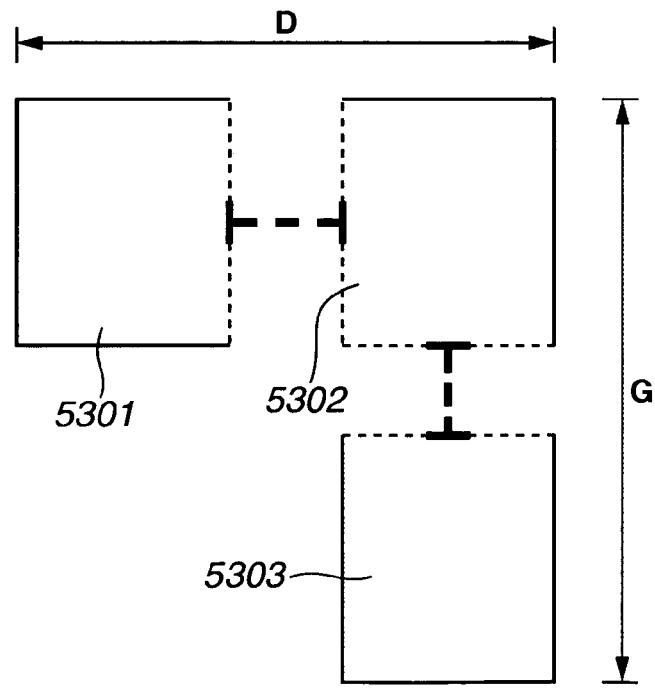
FIG. 51 is a table illustrating maximum movable range information held in the memory unit.
FIG. 53 illustrates an example of determining a layout by performing a layout calculation in consideration of a longitudinal (vertical) direction and a transverse (horizontal) direction.

The layout editing application 121 holds data representing a result of calculation of the maximum movable range, which is performed by the layout engine 105, in the memory unit 136 in step S2509 as data indicating the movable area of the image container 2022. The result of the calculation may be held as information representing the maximum movable range held in terms of coordinate values, for instance, in the form illustrated in FIG. 51. FIG. 51 illustrates the movable range represented in terms of coordinate values by employing the left upper corner point of the container 2121 as an origin. It is held by the information that the movable area in the lateral (or horizontal) direction of the container 2121 ranges from 20 to 80, and that the movable area in the longitudinal (or ordinate) direction of the container 2121 ranges from 0 to −100. Also, regarding the container 2122, it is held by the information that the movable area in the lateral (or horizontal) direction of the container 2122 ranges from 40 to 100, and that the movable area in the longitudinal (or ordinate) direction of the container 2122 ranges from 0 to −70.

In step S2510, the layout editing application 121 compares the movable areas among the objects, which are present on the document template, such as the results of the movable areas of the image containers and other variable containers and the areas occupied by other fixed containers (static objects), which are held in the memory unit 136. Subsequently, the layout editing application 121 determines in step S2511 whether objects, which may overlap with each other, are present on the document template. If it is determined in step S2511 that there are not objects that may overlap, processing ends.

The objects which may overlap with each other at this stage are not associated with each other by a link. Thus, the layout editing application 121 extracts objects that are not associated with each other by links. Then, whether objects overlap with each other is determined by taking into consideration the range of size change, which is caused by flowing the content data of each object, and also taking into consideration the movement range in which each object moves by being affected by the other objects associated with each other.

More specifically, information held as shown in FIG. 51 is described below by way of example. The layout editing application 121 can recognize the maximum movable range in the lateral direction of the container 2121 by referring to the information held as illustrated in FIG. 51 to range from 20 to 80. Also, the layout editing application 121 can recognize the maximum movable range in the lateral direction of the container 2122 to range from 40 to 100. That is, it can be determined that the containers 2121 and 2122 may overlap with each other in the lateral direction within a range of coordinate values from 40 to 80. Similar processing is performed on the maximum movable range in the ordinate direction. Thus, it can be determined that the containers 2121 and 2122 may overlap with each other in the ordinate direction within a range of coordinate values from 0 to −70.

For example, in a case where the overlapped object 2121, which may overlap with the maximum movable range 2132 newly set to be variable, is present as illustrated in FIG. 21 (yes in step S2511), the layout editing application 121 checks and determines in step S2512 whether the attribute of preventing occurrence of overlap between dynamic objects has been set in the overlapped object 2121. For example, the attribute of each object may be held in the memory unit 136 in the form shown in FIG. 52. Thus, the layout editing application 121 can make determination by referring to the information held in the memory unit 136.

If it is determined in step S2512 that the overlap preventing attribute is set (yes in step S2512), processing proceeds to step S2515 (described below). On the other hand, if it is determined in step S2512 that the overlap preventing attribute is not set (no in step S2512) in the object whose attribute is to be determined in step S2511, the layout editing application 121 displays a dialog window 2251 in step S2513 as illustrated in FIG. 22 to notify a user that the object may overlap with another object.

The layout editing application 121 determines in step S2514 by using the dialog window shown in FIG. 22 whether it is selected to prevent overlap. For example, an inquiry "do you reject overlap" is made in the dialog window shown in FIG. 22. In a case where the layout editing application 121 recognizes that a negative decision (no) is selected, the layout editing application 121 determines that the overlap preventing attribute is not set (no in step S2514) and processing ends. On the other hand, in a case where the layout editing application 121 recognizes that an affirmative decision (yes) is selected, the layout editing application 121 determines that the overlap preventing attribute is set (yes in step S2514). If the layout editing application 121 recognizes in step S2514 that the overlap preventing attribute is set, information, which indicates that the overlap preventing attribute is set, is held in the memory unit 136 and processing proceeds to step S2515.

In step S2515, the layout editing application 121 creates a dynamic guide 2441 abutting against a side into which another overlapping dynamic object 2422 is predicted to first intrude in the object 2421, in which the overlap preventing attribute is set, as illustrated in FIG. 24. This side is assumed to be, for example, the right side of the object 2421 because the right side part of the object 2421 overlaps with the maximum movable range of the dynamic object 2422.

Subsequently, in step S2516, the layout editing application 121 creates an overlap preventing variable link 2442 connecting a side of the dynamic object 2422 (this side is assumed to be the left side of the dynamic object 2422 because the left side part of the dynamic object 2422 overlaps with the maximum movable range of the dynamic object 2421) to the dynamic guide 2441 created in step S2515. Information, which indicates that the dynamic guide and the overlap preventing variable link are respectively set in steps S2515 and S2516, is held in the form illustrated in, for example, FIG. 52.

According to the above-described process, the overlap preventing link is created between objects that are disposed on the document template and are determined to be likely to overlap due to content data flowed thereinto. Consequently, even in a case where the layout is changed according to the content data flowed into the objects, the present embodiment can solve a problem that the appearance is deteriorated by occurrence of overlap.

Next, a process of deleting an unnecessary overlap preventing link and an unnecessary dynamic guide, in a case where an affirmative decision (yes) is obtained in each of steps S2506 and S2507, is described below with reference to FIG. 25C.

Steps S2517 to S2519 are similar to steps S2508 to S2510. The description of the details of steps S2517 to S2519 are not repeated here.

The layout editing application 121 determines in step S2520 according to comparisons made in step S2519 whether there is an object determined not to overlap with another object. That is, the objects to be determined in step S2520 have been considered before the determination in step S2520 to be likely to overlap. The layout editing application 121 determines whether the processing performed in step S2506 or S2507 results in denial of possibility of overlap of each the objects with another object. The above-described processing performed in step S2519 enables the extraction of objects that may overlap with each other. The layout editing application 121 can determine by again checking the attribute information set according to the objects extracted in this step whether an overlap of the objects occurs. For example, the containers 2121 and 2122 shown in FIG. 21 are variable containers and are determined to be likely to overlap with each other. However, in a case where the attributes of both of the containers 2121 and 2122 are changed to the fixed type, the possibility of overlap is eliminated.

If it is determined in step S2520 that there are objects that may overlap (no in step S2520), processing ends. On the other hand, if it is determined in step S2520 that there are objects that do not overlap (yes in step S2520), the layout editing application 121 determines in step S2521 whether a dynamic guide and an overlap preventing link are set with respect to each of such objects. Particularly, because the memory unit 136 holds the information representing whether the dynamic guide and the overlap preventing link are set with respect to each of the objects, the layout editing application 121 can determine by referring to the information held in the memory unit 136 whether the dynamic guide and the overlap preventing link are set with respect to each of the objects.

If it is determined in step S2521 that the dynamic guide and the overlap preventing link are not set with respect to each of the objects (no in step S2521), processing ends. However, if it is determined in step S2521 that the dynamic guide and the overlap preventing link are set with respect to each of the objects (yes in step S2521), in step S2522, the layout editing application 121 deletes the dynamic guide and the overlap preventing link set with respect to each of the objects, each of which is determined not to overlap with another object. Then, in step S2522, the attribute of the memory unit 136 is changed accordingly.

Figure 23:
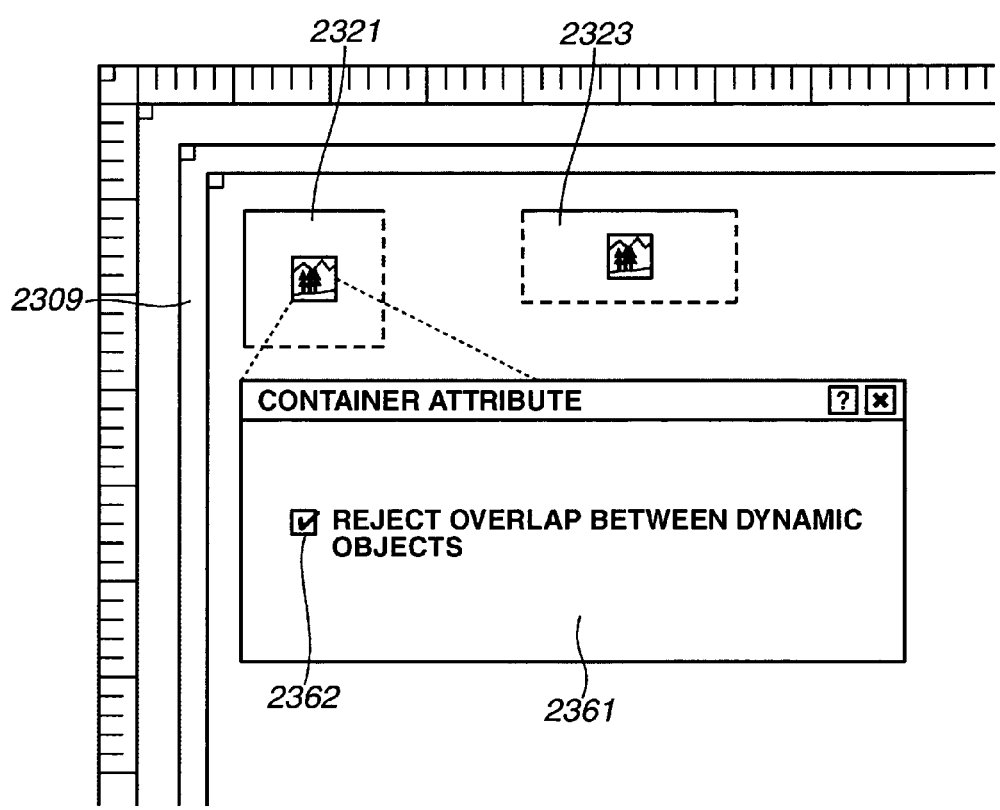
FIG. 23 illustrates an edit window in which the layout editing application displays an attribute dialog indicating "REJECT OVERLAP BETWEEN DYNAMIC OBJECTS".

FIG. 23 illustrates an edit window displayed by the layout editing application 121, which shows an attribute dialog window corresponding to the attribute used to "reject overlap between dynamic objects". A dialog window 2361 is used for setting the attribute used to "reject overlap between dynamic objects" and includes a check box 2362 for changing (ON/OFF of) the setting of the attribute.

FIG. 23 illustrates a state, in which the check box 2362 is checked, and in which the attribute to "reject overlap between dynamic objects" is set to be ON. The dialog window is used for setting the attribute to "reject overlap between dynamic objects" in step S2513 shown in FIG. 25B. The layout editing application 121 serves as the user interface (UI) and performs display control to set the attribute of the dynamic objects according to whether the check box 2362 is checked. The setting dialog window 2361 shown in FIG. 23 is displayed in a case where it is determined in step S2511 shown in FIG. 25B that the objects, each of which may overlap with another object, are present, and that the "overlap preventing attribute" is not set in each of the objects. However, the "overlap preventing attribute" may be set in response to the setting of containers and the like on the document template.

In a case where a user manually changes the state of the setting of the check box 2362 from ON to OFF, the layout editing application 121 starts performing a process from step S2520 shown in FIG. 25C. In a case where a user manually changes the state of the setting of the check box 2362 from OFF to ON, the layout editing application 121 starts performing a process from step S2511 shown in FIG. 25B.

The layout editing application 121 caches the information on the region of all objects, which are present on the document template 2309, (the movable region information on static and dynamic objects, which occupy the document template 2309) onto the memory unit 136. In a case where the information on the attribute of each container is changed by an operation performed by a user, the information on the regions of the containers affected by this change is updated by using the layout engine 105.

The layout editing application 121 sets no overlap preventing variable link in a static object even when a user's editing operation explicitly overlaps the static object with an object, the setting of the check box 2362 in the attribute dialog window 2361 of which is ON. The setting of the attribute to "reject overlap between dynamic objects" is effective only in the case of the overlap between dynamic objects. Users may set the overlap preventing variable link in a static object.

Figure 26:
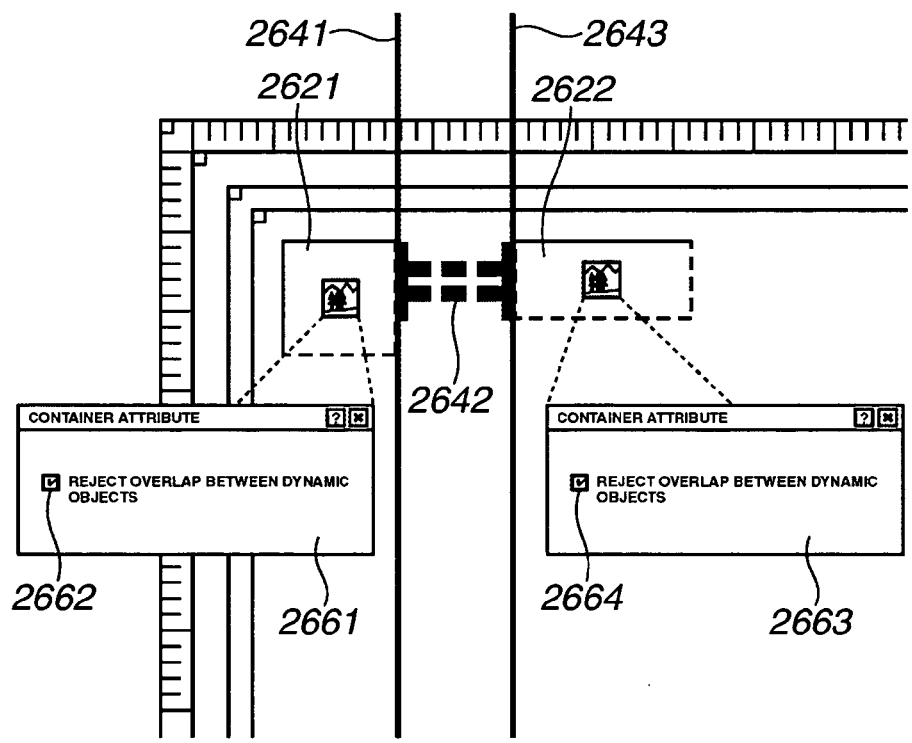
FIG. 26 illustrates attribute dialog boxes that indicate "REJECT OVERLAP BETWEEN DYNAMIC OBJECTS" and are displayed by the layout editing application in a case where the movable areas of two variable containers (dynamic objects) may overlap with each other.

FIG. 26 illustrates the dialog window 2661 and 2663 for setting the attribute to "reject overlap between dynamic objects", which is displayed by the layout editing application 121 in a case where two variable containers (dynamic objects), which are present on the document template, may overlap with each other.

As shown in FIG. 26, in a case where the setting of the check boxes 2662 and 2664 respectively provided in the dialog windows 2661 and 2663 for setting the attribute to "reject overlap between dynamic objects" in both of the dynamic objects 2621 and 2622, is ON, the layout editing application 121 creates dynamic guides 2641 and 2643 in both the variable containers (dynamic objects) and also creates an overlap preventing variable link 2642.

Figure 27:
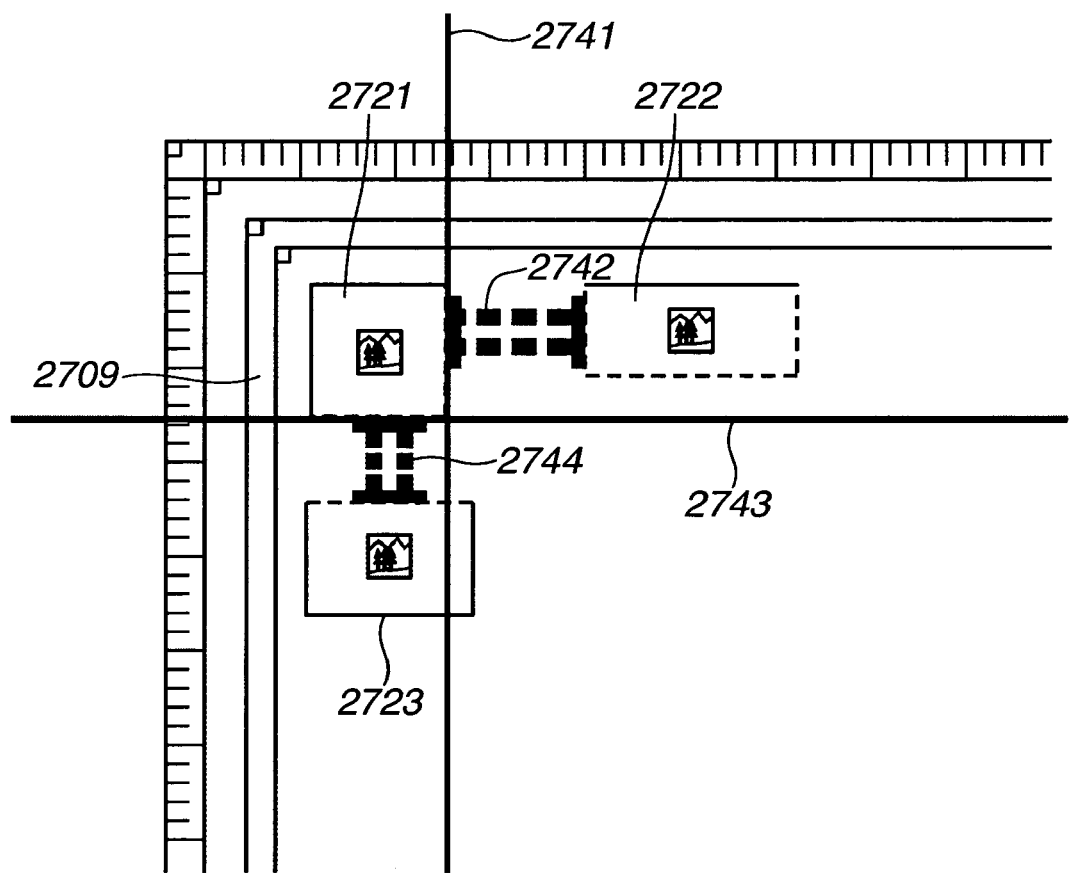
FIG. 27 illustrates an edit window in which the layout editing application sets dynamic guides and overlap preventing variable links in a case where there are three variable containers.

FIG. 27 illustrates an edit window displayed by the layout editing application 121 and used to set dynamic guides 2741 (corresponding to the dynamic guide 2441 shown in FIG. 24) and 2743 and overlap preventing links 2742 (corresponding to the link 2442 shown in FIG. 24) and 2744 corresponding to the ordinate direction (Y-direction shown in FIG. 27) and to the horizontal direction (X-direction shown in FIG. 27) in three variable containers (dynamic objects) 2721 (corresponding to the object 2421 shown in FIG. 24), 2722 (corresponding to the object 2422 shown in FIG. 24), and 2723, which are present on a document template 2709.

FIG. 27 shows a case where a variable container (a dynamic object) 2723 serving as an image container is added to the variable containers (dynamic objects) 2421 and 2422 that are present on the document templates 2409 shown in FIG. 24.

In a case where an image container 2723 is newly disposed on a document template 2709 (corresponding to the document template 2409 shown in FIG. 24) by a user using the image tool button 405, and where the property of an upper edge (an upper side) of the image container 2723 is changed from the fixed type to the variable type by the user's operation using the property setting dialog window 1701, the layout editing application 121 performs a process, the flow of which is illustrated in FIGS. 25A to 25C, for setting the overlap preventing variable link. At that time, the attribute to "reject overlap between dynamic objects" has already been set in the dynamic object 2721. Thus, a horizontal-direction (X-direction in FIG. 27) dynamic guide 2743 abutting against the lower edge (the lower side) of the dynamic object (overlapped object) 2721, and an overlap preventing variable link 2744 in an ordinate direction (Y-direction in FIG. 27) to prevent the overlap between the object 2721 and the newly added overlapping object 2723 are created.

Dialog for Setting Property of Overlap Preventing Variable Link

The overlap preventing variable link is different in nature from variable size links 1209, 1409, 1603 and fixed size links 412, 1008, and 1503 adapted to associate the containers shown in FIGS. 12, 14, and 16 with one another. The variable size links and the fixed size links are taken into consideration at the layout calculation. However, the overlap preventing variable link is not taken into consideration at the layout calculation. The size of the overlap preventing variable link is changed according to a result of the layout calculation so as not to become less than the minimum value set with respect to the overlap preventing link. Thus, to clearly distinguish the links that are taken into consideration at the layout calculation from the links that are not taken into consideration at the layout calculation, in the present specification, the fixed size links and the variable size links, which are taken into consideration at the layout calculation and associate the containers with one another, are defined to be associating-links, while the links, which are not taken into consideration at the layout calculation and prevent the overlap between objects, are defined to be overlap-preventing-links.

Figure 28:
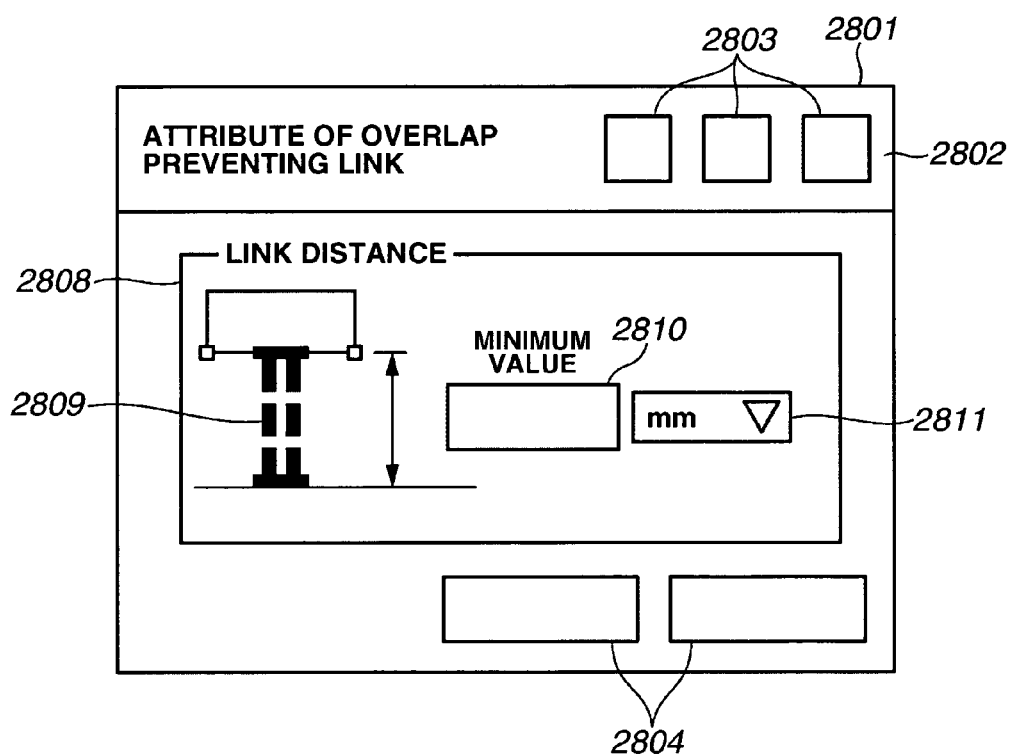
FIG. 28 illustrates an example of a dialog window used to set the attribute of an overlap preventing variable link.

FIG. 28 is a diagram illustrating an example of a dialog window 2801 for setting the attribute of an overlap preventing variable link 2809. This dialog window typically includes a title bar 2802, a toolbar buttons 2803, a buttons 2804 used to open/close the dialog window, and an area 2808 in which information on a link distance is set. The minimum value of length of the overlap preventing variable link can be set using a text box 2810 and a unit of length can be selected from a list box 2811. In this case, a "millimeter" (mm) is displayed as an example. Instead, other units, such as "inch" or "pixel" can be selected.

In a case where a user sets a negative value in the text box 2810, instead of a positive value, the overlap of containers is set to be allowed. Information on the set minimum value is held in the memory unit 136.

Setting of Dynamic Guide and Overlap Preventing Variable Link

Figure 32:
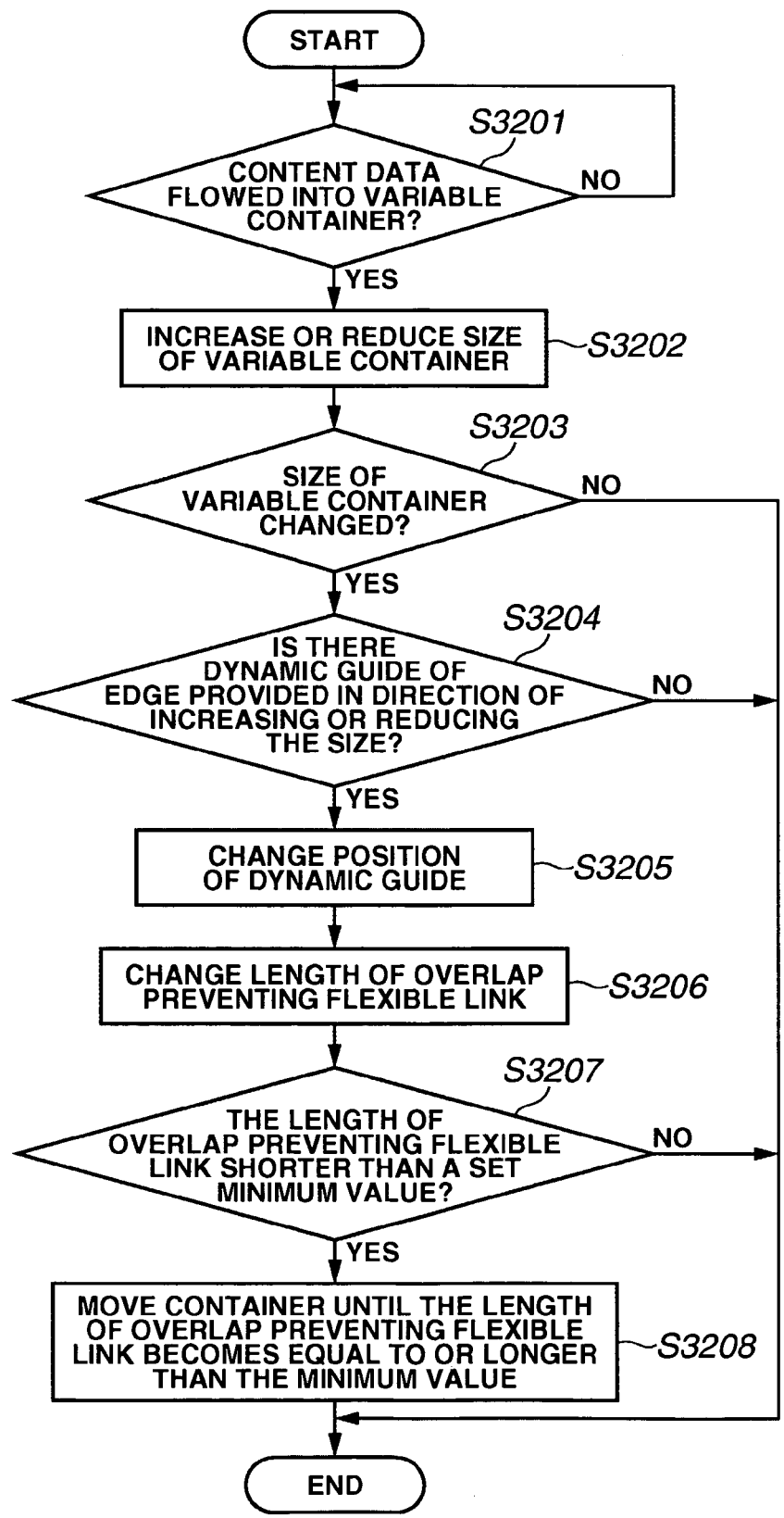
FIG. 32 is a flowchart illustrating the flow of a process that relates to the setting of dynamic guides and overlap preventing variable links and is performed by the layout editing application.

FIG. 32 is a flowchart illustrating the flow of a process of setting a dynamic guide and an overlap preventing variable link, which is performed by the layout editing application 121. Hereinafter, the process is described by referring to FIGS. 24, 29, and 30, by way of example. However, the process of setting a dynamic guide and an overlap preventing variable link according to the present invention is not limited thereto.

FIG. 29 illustrates a preview window displayed by the layout editing application 121, showing a state in which image data (variable data) to be fit to variable containers is flowed into variable containers (dynamic objects) 2421 and 2422 that are present on the document template 2409 shown in FIG. 24.

A preview display 2921 indicating a state in which image data is flowed into the variable container (image container) 2421 shown in FIG. 24 and another preview display 2922 indicating a state in which image data is flowed into the variable container (image container) 2422 shown in FIG. 24 are displayed in a document template 2909.

A preview assist display 2941 indicating a state in which a non-printing dynamic guide is set and preview assist display 2942 indicating a state in which a non-printing overlap preventing variable link is set are also displayed in the document template 2909.

Figure 30:
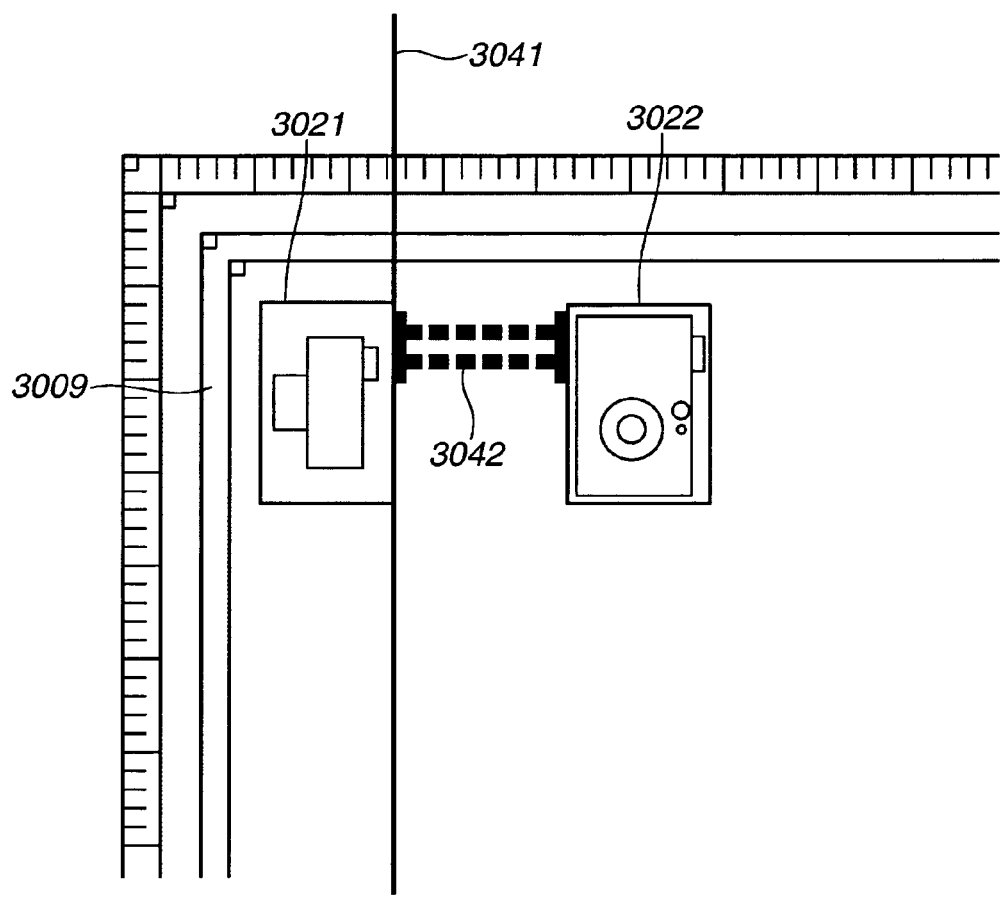
FIG. 30 illustrates a preview window indicating a state in which image data differing from image data used in the case illustrated in FIG. 29 is flowed into each of the variable containers shown in FIG. 24.

FIG. 30 illustrates a preview window displayed by the layout editing application 121, showing a state in which image data differing from the image data used in the case illustrated in FIG. 29 is flowed into variable containers (dynamic objects) 2421 and 2422 that are present on the document template 2409 shown in FIG. 24.

FIG. 30 includes a document template 3009 which includes a preview display 3021 indicating a state in which image data is flowed into the variable container (image container) 2421 shown in FIG. 24 and a preview display 3022 indicating a state in which image data differing from the image data used in the case illustrated in FIG. 29 is flowed into the variable container (image container) 2422 shown in FIG. 24. A preview assist display 3041 indicates a state in which a non-printing dynamic guide is set. A preview assist display 3042 indicates a state in which a non-printing overlap preventing variable link is set.

FIG. 32 is a flowchart illustrating a process performed by the layout editing application that relates to the setting of dynamic guides and overlap preventing variable links. A user operates the mouse 133 to click on the menu items 304 (see FIG. 3) to instruct the system to flow image data into variable containers that are present on the document template 2409 shown in FIG. 24. When variable data (content) is flowed into the variable containers 2421 and 2422 functioning as image containers in step S3201, the layout editing application 121 checks the attribute set in each of the sides of the image containers 2421 and 2422. In a case where the side of the image container is set to be variable, the size of the container is expanded or is reduced according to the size of the content in step S3202. Information representing the attribute set on each container is held in the memory unit 136. Thus, the layout editing application 121 can recognize the attribute by referring to this information.

As shown in FIG. 24, the properties of each side of the variable container 2421 functioning as an image container are set so that, regarding the width (corresponding to X-direction shown in FIG. 24), the right side is variable, and that, regarding the height (corresponding to Y-direction shown in FIG. 24), the lower side is variable. Thus, this container 2421 can be expanded or reduced.

Also, the properties of each side of the variable container 2422 functioning as an image container are set so that, regarding the width, the left side and the right side are variable, and that, regarding the height, the lower side is variable. Thus, this container 2422 can be expanded or reduced.

In step S3203, the layout editing application 121 compares the data size of the image data with the size of each of the variable containers 2421 and 2422 serving as image containers. Then, the layout editing application 121 expands the right side and the lower side of the variable container 2421 in the rightward direction (corresponding to X+-direction) and the downward direction (corresponding to Y−-direction), respectively. Similarly, the layout editing application 121 expands the left side, the right side, and the lower side of the variable container 2422 in X−-direction, X+-direction, and Y−-direction, respectively. The change in the size of each container is performed in step S3203 by the layout calculation.

In a case where the size of the variable container is not changed in step S3203 (no in step S3203), processing ends. In a case where the size of the variable container is changed in step S3203 (yes in step S3203), the layout editing application 121 proceeds to step S3204, where the layout editing application 121 determines whether the dynamic guide 2441 is provided on an edge in an expansion or reduction direction of the container, as on the right side (the right edge) of the variable container 2421. Because information, which indicates whether a dynamic guide is provided, is held by the memory unit 136, the layout editing application 121 can make determination by referring to the held information.

In a case where the dynamic guide 2441 is not provided along the edge in the expansion/reduction direction of the container (no in step S3204), processing ends. In a case where the dynamic guide 2441 is provided along the edge in the expansion/reduction direction of the container (yes in step S3204), the layout editing application 121 changes the position of the dynamic guide 2441 in step S3205 by moving the dynamic guide 2441 on the document template 2409 while maintaining a state in which the dynamic guide 2441 is put into contact with the right side (the right edge) of the variable container 2421. That is, in the case illustrated in FIG. 24, the dynamic guide 2441 is moved in the rightward direction (X+-direction in FIG. 24) in a state in which the dynamic guide 2441 is brought into contact with the right side (the right edge) of the variable container 2421.

In step S3206, the layout editing application 121 changes the length of the overlap preventing variable link 2442 according to the expansion/reduction of the size of the variable container in step S3202, and to the change in the position of the dynamic guide in step S3205.

In a case where the length of the overlap preventing variable link 2442 is not smaller than the minimum value of the overlap preventing variable link (no in step S3207), processing ends. In a case where, as a result of changing the link length of the overlap preventing variable link 2442, the length of the overlap preventing variable link 2442 is smaller than the minimum value of the overlap preventing variable link set in the dialog window 2801 shown in FIG. 28 (yes in step S3207), the layout editing application 121 moves the position of the variable container 2422 linked with the dynamic guide 2441 by the overlap preventing variable link 2442 so that the length of the overlap preventing variable link 2442 meets the set condition for the minimum value. Thus, the layout editing application 121 determines the layout of the variable container 2422 in step S3208, and then the process ends.

An example shown in FIG. 30 differs from the case shown in FIG. 29 in that the size of image data is smaller than the original size of the variable containers 2421 and 2422. The dynamic guide 3041 (corresponding to the dynamic guide 2441 shown in FIG. 24) provided in contact with the right side (the right edge) of the variable container 3021 (corresponding to the variable container 2421 shown in FIG. 24) moves in the leftward direction (X−-direction shown in FIG. 30) with the reduction in the right side (the right edge) of the image container 3021. The sizes of the width and the height of the variable container 3022 (corresponding to the variable container 2422 shown in FIG. 24), which is linked with the dynamic guide 3041 (corresponding to the dynamic guide 2441 shown in FIG. 24) through the overlap preventing variable link 3042, are reduced. Thus, the length of the overlap preventing variable link 3042 is extended, as compared with the initial length of the overlap preventing variable link 2442.

When variable data is flowed into the variable container in step S3201 shown in FIG. 32, the layout editing application 121 checks the presence/absence of the setting of the variable link and the fixed link other than the overlap preventing variable link and also checks the set properties of the containers. Thus, the layout editing application 121 determines the presence/absence of set conditions of constraint relating to the change in the size of the container. Then, the layout editing application 121 changes the position of the dynamic guide and the length of the overlap preventing variable link while satisfying the set condition of constraint. Consequently, the layout editing application 121 determines the layout of the variable containers.

Figure 31:
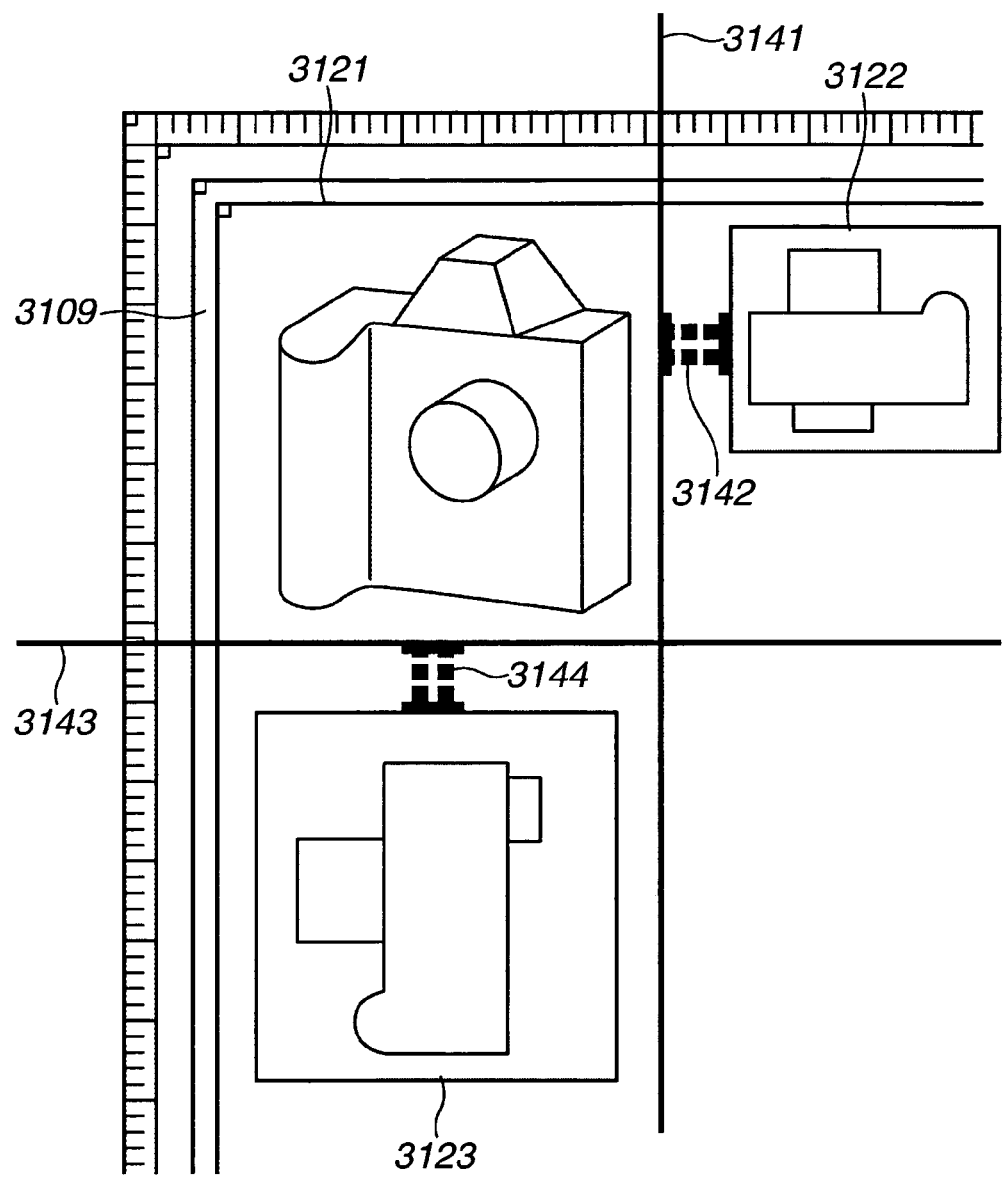
FIG. 31 illustrates a preview window indicating a state in which image data is flowed into each of the variable containers shown in FIG. 27.

FIG. 31 illustrates a preview window displayed by the layout editing application 121, showing a state in which image data is flowed into variable containers (dynamic objects) 2721, 2722 and 2723 that are present on the document template 2709 shown in FIG. 27.

A preview display 3121 indicating a state in which image data is flowed into the variable container 2721 shown in FIG. 27 and a preview display 3122 indicating a state in which image data is flowed into the variable container 2722 shown in FIG. 27 are displayed on a document template 3109. A preview assist display 3141 indicates a state in which a non-printing dynamic guide is set. A preview assist display 3142 indicates a state in which a non-printing overlap preventing variable link is set. A preview assist display 3143 indicates a state in which a non-printing dynamic guide is set. A preview assist display 3144 indicates a state in which a non-printing overlap preventing variable link is set. A preview display 3123 indicates a state in which image data is flowed into the variable container 2723 shown in FIG. 27.

In a case where dynamic guides 3141 and 3143 and overlap preventing variable links 3142 and 3144 are set in the horizontal direction (X-direction in FIG. 31) and in the ordinate direction (Y-direction in FIG. 31) as illustrated in FIG. 31, the layout editing application 121 performs processing similar to that illustrated in FIGS. 29, 30, and 32. The dynamic guide according to the present embodiment has a dynamic (variable) property of being movable in synchronization with the movement of a side of the container. However, in a case where the dynamic guide is provided in contact with a fixed side (a fixed edge) of a fixed container (a static object) and a variable container (a dynamic object), the dynamic guide is immovable. The attribute of such a dynamic guide cannot be edited by a user. Although it is described in the present specification that the dynamic guide is put into contact with a side of the container, the dynamic guide according to the present invention is not limited thereto. A dynamic guide according to the present invention may be displayed at a predetermined distance from the side of the container.

Corresponding Angle Link

In the process of setting the overlap preventing variable link, which has been described by referring to FIGS. 25A to 25C, the overlap preventing variable links 2442 and 2742 corresponding to a horizontal direction (X-direction in the figures) are created corresponding to the dynamic guides 2441 and 2741 extending in an ordinate direction (Y-direction in the figures), the overlap preventing variable link 2744 in an ordinate direction (Y-direction in the figures) is created corresponding to the dynamic guide 2743 extending in a horizontal direction (X-direction in the figures).

However, there is a case where one side, into which one expanded overlapping object intrudes, cannot be specified to one side in the movable area, into which the overlapping object expands and intrudes, of the overlapped object when the attribute of not allowing the overlap (the attribute to "reject overlap between objects") is selected. For example, there is possibility that the variable container 2323 may expand and intrude into the right side of the overlapped object 2321 shown in FIG. 23. Also, according to the layout of the variable containers on the document template, an edge status set as a characteristic of each container, the set maximum size of the container, there is a case where a side, into which an object intrudes, is not specified to one side.

Figure 33:
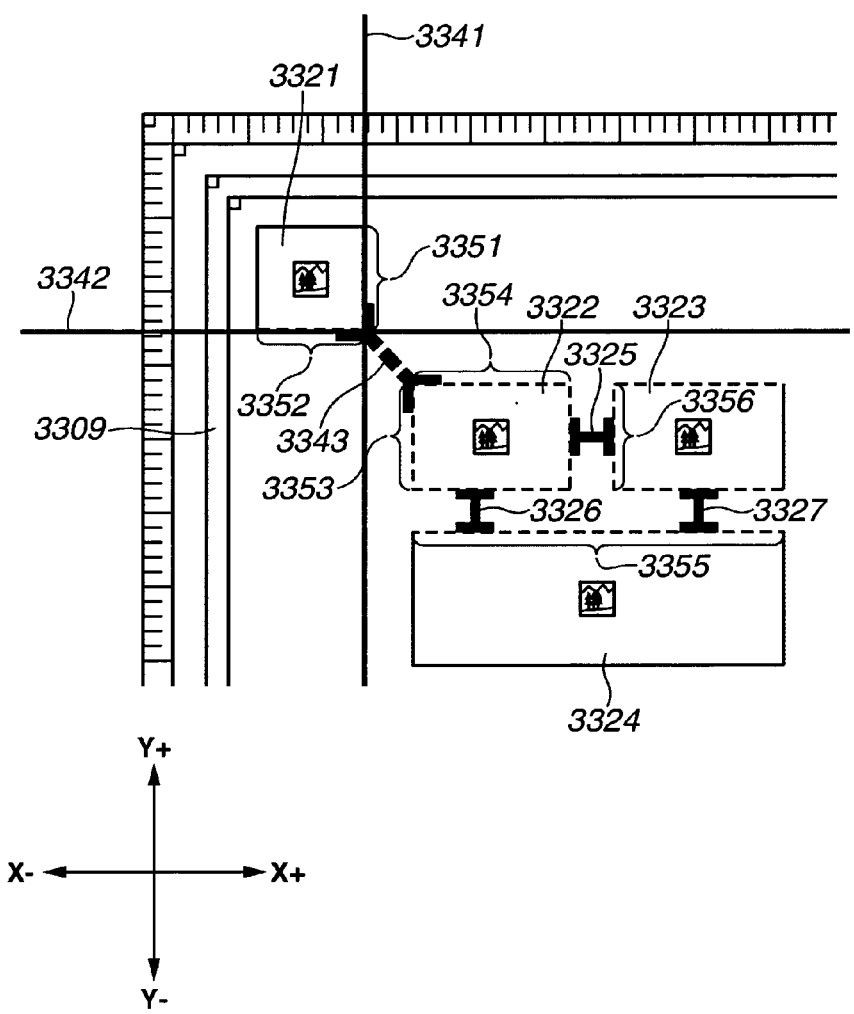
FIG. 33 illustrates an edit window indicating dynamic guides respectively extending in a vertical direction (corresponding to a Y-direction) and a horizontal direction (corresponding to an X-direction) and an overlap preventing variable link.

An example of the case where the side, into which a side intrudes, cannot be specified to one side, is described below by referring to FIGS. 33, 35, and 37. FIG. 33 illustrates an edit window displayed by the layout editing application 121, which shows dynamic guides 3341 and 3342, which respectively correspond to an ordinate direction (Y-direction in FIG. 33) and to a horizontal direction (X-direction in FIG. 33), and an overlap preventing corresponding-angle variable link 3343.

As shown in FIG. 33, variable containers 3321, 3322, 3323, and 3324 serving as image containers are disposed on a document template 3309. The variable containers 3322 and 3323 are associated with each other by a fixed link 3325. The variable containers 3322 and 3324 are associated with each other by a fixed link 3326. The variable containers 3323 and 3324 are associated with each other by the fixed link 3327.

The variable containers 3321 and 3322 are prevented from overlapping with each other by an overlap preventing corresponding-angle variable link 3343. The overlap preventing corresponding-angle variable link 3343 prevents two sides 3353 and 3354 of the variable container 3322, which serves as the overlapping object, from intruding into the movable range (defined by movement of two sides 3351 and 3352 of the variable container 3321) of the variable container 3321 serving as the overlapped object.

FIGS. 35 and 37 illustrate preview displays displayed by the layout editing application 121, which show how the layout of a variable container changes in a case where image data is flowed into a variable container to which the overlap preventing corresponding-angle variable link 3343 shown in FIG. 33 is not applied.

When image data the size of which is larger than the size of the variable container 3322 is flowed into the variable container 3322 in the window shown in FIG. 33, the size of the variable container 3322 is expanded. At that time, in a case where the upper side 3354 of the variable container 3322 moves in Y+-direction, this side 3354 may intrude into (or overlap with) the lower side 3352 of the variable container 3321. Similarly, in a case where the left side 3353 of the variable container 3322 moves in X--direction, this side 3353 may intrude into (or overlap with) the right side 3351 of the variable container 3321.

First Example of Intrusion

In a case where the overlap preventing corresponding-angle variable link is not set, the upper side of the variable container 3322 (see FIG. 33) first intrudes into the lower side of the variable container 3321 (see FIG. 33) in the example shown in FIG. 35. This is caused by the following layout flow.

(1) The size of the container 3321 is expanded by flowing image data into the variable container 3321 (see FIG. 33). Thus, the right side 3351 of the variable container 3321 (see FIG. 33) moves in the right direction (X+-direction) (this state is displayed as a variable container 3521 by a preview display in FIG. 35).

(2) Image data is flowed into the variable containers 3322, 3323, and 3324 (see FIG. 33). Then, the variable edge (side) 3355 of the variable container 3324 moves in Y+-direction (the left side, the right side, and the lower side are set to be fixed edges). At that time, the variable containers 3322 and 3323 associated with each other by the fixed links 3326 and 3327 are pushed upwardly by the movement of a movable side 3355, and are moved in Y+-direction (this state is displayed as a preview display by showing the variable containers 3522 and 3523 in FIG. 35).

(3) In the above steps (1) and (2), image data is flowed into the variable containers. Thus, an upper side of the variable container 3522 intrudes into the lower side of the variable container 3521 in an overlapped part 3530.

Second Example of Intrusion

In a case where the overlap preventing corresponding-angle variable link is not set, the left side of the variable container 3322 first intrudes into the right side of the variable container 3521 in the example shown in FIG. 37. This is caused by the following layout flow.

(1) Image data is flowed into the variable container 3321 (see FIG. 33). Thus, the size of the container 3321 is expanded, so that the lower side 3352 (see FIG. 33) moves in the downward direction (Y--direction) (this state is displayed as a preview display by showing a variable container 3721 in FIG. 37).

(2) Image data is flowed into the variable containers 3322, 3323, and 3324 (see FIG. 33). Then, the variable edge (side) 3356 of the variable container 3324 moves in X--direction (the right side is set to be a fixed edge (the dashed line part 3729 indicates the fixed edge of the variable container 3323)). At that time, the variable container 3322 linked by the fixed link 3325 is pushed by the movement of the movable side 3356, and is moved in X--direction (this state is displayed as a preview display by showing the variable container 3722 in FIG. 37).

(3) In the above steps (1) and (2), image data is flowed into the variable container. Thus, the left side of the variable container 3722 intrudes into the right side of the variable container 3721 in an overlapped part 3730.

In the first and second examples of intrusion, when the dynamic guide and the overlap preventing variable link are created corresponding to two sides in the horizontal direction and the ordinate direction of the overlapped object 3321 (the variable container), which the overlapping object 3322 (the variable container) may first intrude into (it is impossible to intrude into three sides or more), a problem, in which the range of the layout of the overlapping object is always limited even when no overlaps occur, is caused.

This problem is further described below by referring to FIG. 27. For instance, the overlap preventing variable link 2742 is set corresponding to the dynamic guide 2741 extending in the ordinate direction in the variable container 2722. If an overlap preventing variable link is also set corresponding to the dynamic guide 2743 extending in the horizontal direction, when image data or the like is flowed into the variable container 2722, the movable range of the variable container 2722 is limited by the dynamic guide 2741 extending in the ordinate direction and the dynamic guide 2743 extending in the horizontal direction. That is, the movable range of the variable container 2722 is limited to an area located on the right side of the dynamic guide 2741 and on the upper side of the dynamic guide 2743, which area is present on the document template 2709.

To prevent occurrence of the above-described problem that the movable range of the variable container is limited by setting the dynamic guide and the overlap preventing variable link, the present embodiment creates a corresponding angle link as designated by reference numeral 3343 in FIG. 33, corresponding to the two sides which extend in the horizontal direction and the ordinate direction, respectively, and into which another overlapping object (a variable container) may first intrude. In the following description, a link serving as an overlap preventing variable link like the corresponding angle link 3343 is referred to as an "overlap preventing corresponding-angle variable link". The overlap preventing corresponding-angle variable link is created in consideration of two dynamic objects abutting against the overlapped object and of two sides of the overlapping object (the variable container) and prevents the overlapping object (the variable container) from overlapping with the overlapped object (the variable container).

Setting of Overlap Preventing Corresponding-Angle Variable Link

Figure 39:
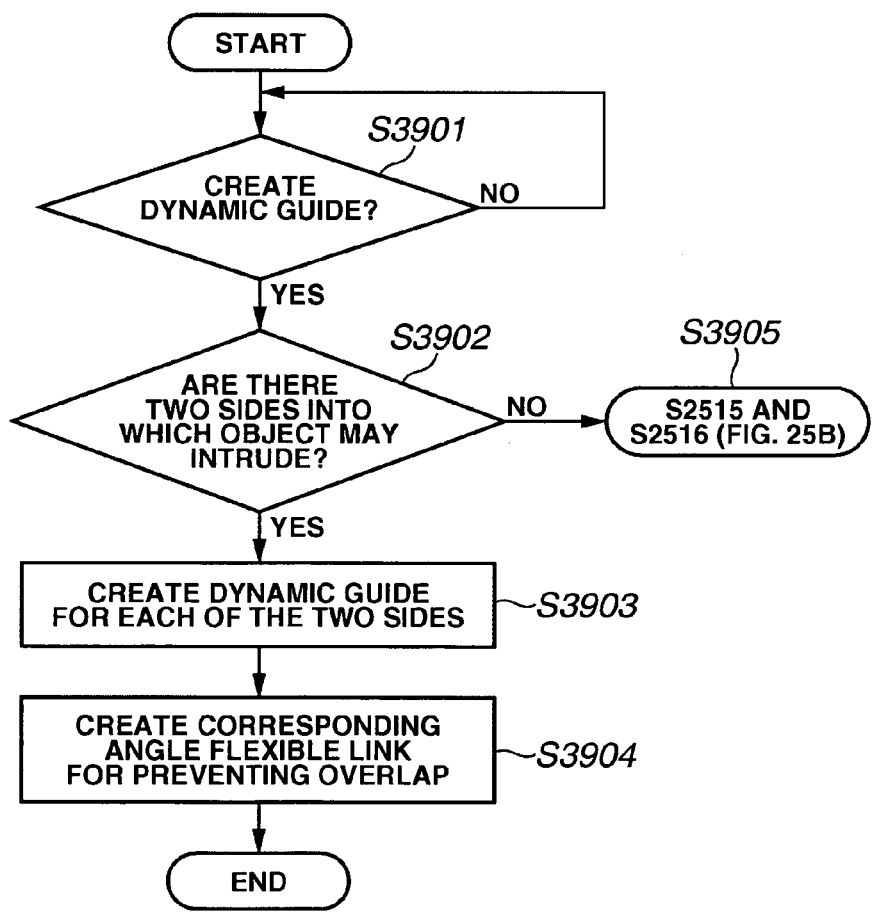
FIG. 39 is a flowchart illustrating the flow of a process of setting the overlap preventing corresponding-angle variable link that can be applied to the embodiment of the present invention.

FIG. 39 is a flowchart illustrating a process of setting the overlap preventing corresponding-angle variable link, which can be applied to the embodiment of the present invention. This flowchart describes in detail the process performed in steps S2515 and S2516 serving as the overlap preventing variable link setting steps, which have been described in detail by referring to FIG. 25B.

First, in step S3901, the layout editing application 121 determines whether to create a dynamic guide corresponding to the overlapped object (for example, the dynamic object 3321 shown in FIG. 33), similarly to step S2515 in FIG. 25B. If it is determined to create the dynamic guide (yes in step S3901), the process advances to step S3902, where the layout editing application 121 determines whether there are two sides into which an overlapping object may intrude (hereunder sometimes referred to as intruded sides), in the overlapped object (a variable container) 3321 in which the property of not allowing overlap is set. As described above, information representing the variable range and the movable range of each object, which is present on the document template, is held in the memory unit 136. Thus, the layout editing application 121 can make the determination by referring to this information in the memory unit 136.

For example, in a case where two sides 3352 and 3351 respectively extending in the horizontal direction and the ordinate direction of the variable container 3321 are the intruded sides (yes in step S3902), the process performed by the layout editing application 121 advances to step S3903. Conversely, if the layout editing application 121 determines in step S3902 that there are not two intruded sides (no in step S3902), the process proceeds to step S3905 to perform the setting of the dynamic guides, which has been described by referring to step S2515 shown in FIG. 25B, and the setting of the overlap preventing link, which has been described by referring to step S2516 shown in FIG. 25B.

If there are two intruded sides (yes in step S3902), the layout editing application 121 sets dynamic guides (for example, dynamic guides 3341 and 3342 in FIG. 33), which respectively abut against the intruded sides, in step S3903.

Subsequently, the layout editing application 121 sets an overlap preventing corresponding-angle variable link in step S3904. To describe processing performed in step S3904 in detail, this processing is described by referring to FIG. 33. The layout editing application 121 sets an overlap preventing corresponding-angle variable link 3343 as a link connecting an intersection of the two dynamic guides 3341 and 3342 created in step S3903 (a corner portion defined by the sides 3351 and 3352 of the variable container 3322) and a corner portion defined by the two intruding sides 3353 and 3354 of the variable container 3322. This processing corresponds to the processing performed in the overlap preventing variable link setting step S2516, which has been described by referring to FIG. 25B.

As described by referring to FIG. 39, the overlap preventing corresponding-angle variable link is set in a case where two intruded sides are present (that is, an overlapping direction is not specified). As will be described later, the overlap preventing corresponding-angle variable link is changed to an overlap preventing link, the setting direction of which is determined according to a result of the layout calculation.

Figure 34:
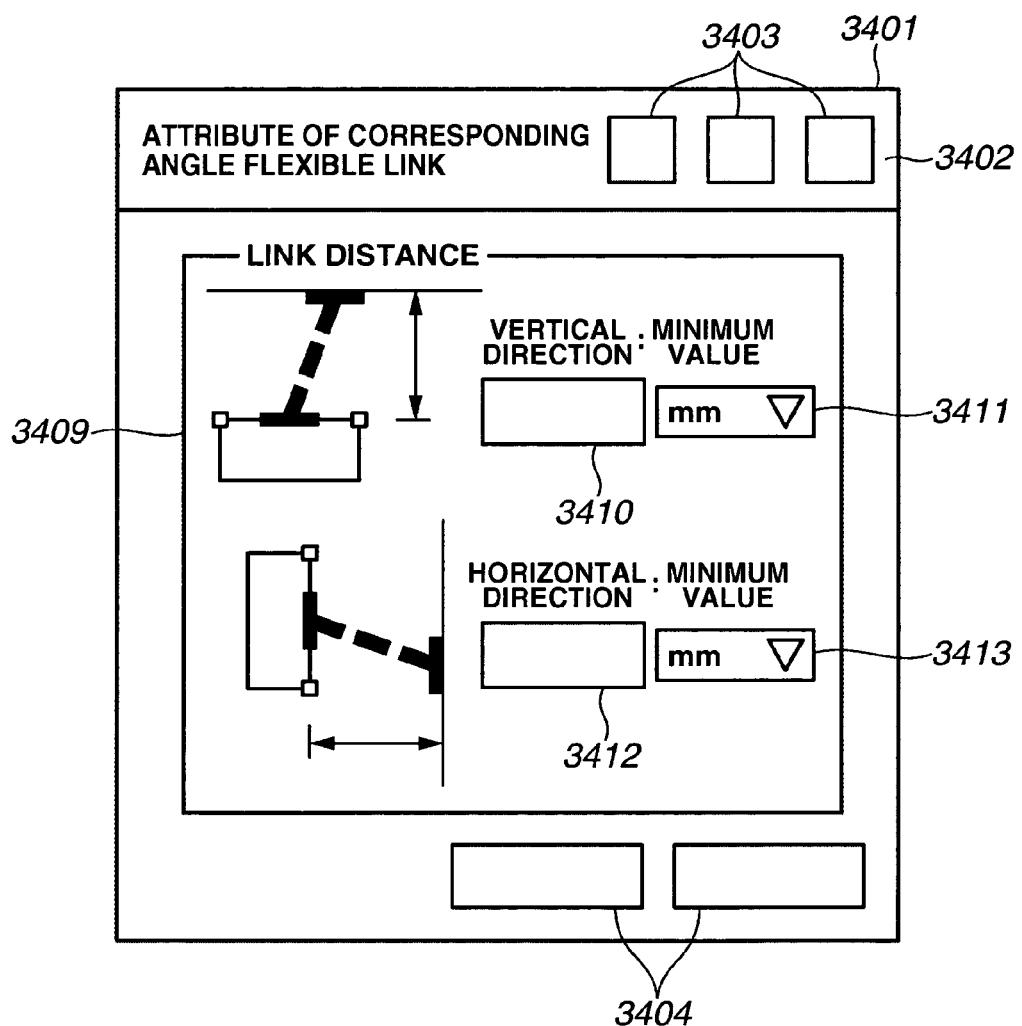
FIG. 34 illustrates an example of a dialog window used to set the attribute of the overlap preventing corresponding-angle variable link.

FIG. 34 illustrates an example of the dialog window 3401 for setting the attribute of the overlap preventing corresponding-angle variable link. This dialog window typically includes a title bar 3402, toolbar button 3403, buttons 3404 used to open/close the dialog window, and an area 3409 used to set various kinds of information relating to link distance.

The minimum value of the length in the ordinate direction of the corresponding-angle variable link (that is, a distance in the ordinate direction between a dynamic guide extending in a horizontal direction and an upper side or a lower side of a container) can be set in a text box 3410. Also, the minimum value of the length in the horizontal direction of the corresponding-angle variable link (that is, a distance in the horizontal direction between a dynamic guide extending in an ordinate direction and a left side or a right side of a container) can be set in a text box 3412.

The unit of length can be set in list boxes 3411 and 3413. In this case, millimeter (mm) is displayed by way of example. When a user sets a negative value in the text box, instead of a positive value, the overlap of a dynamic guide and a container is set to be allowed, regardless of the setting of the attribute to "reject overlap between dynamic objects".

Figure 40:
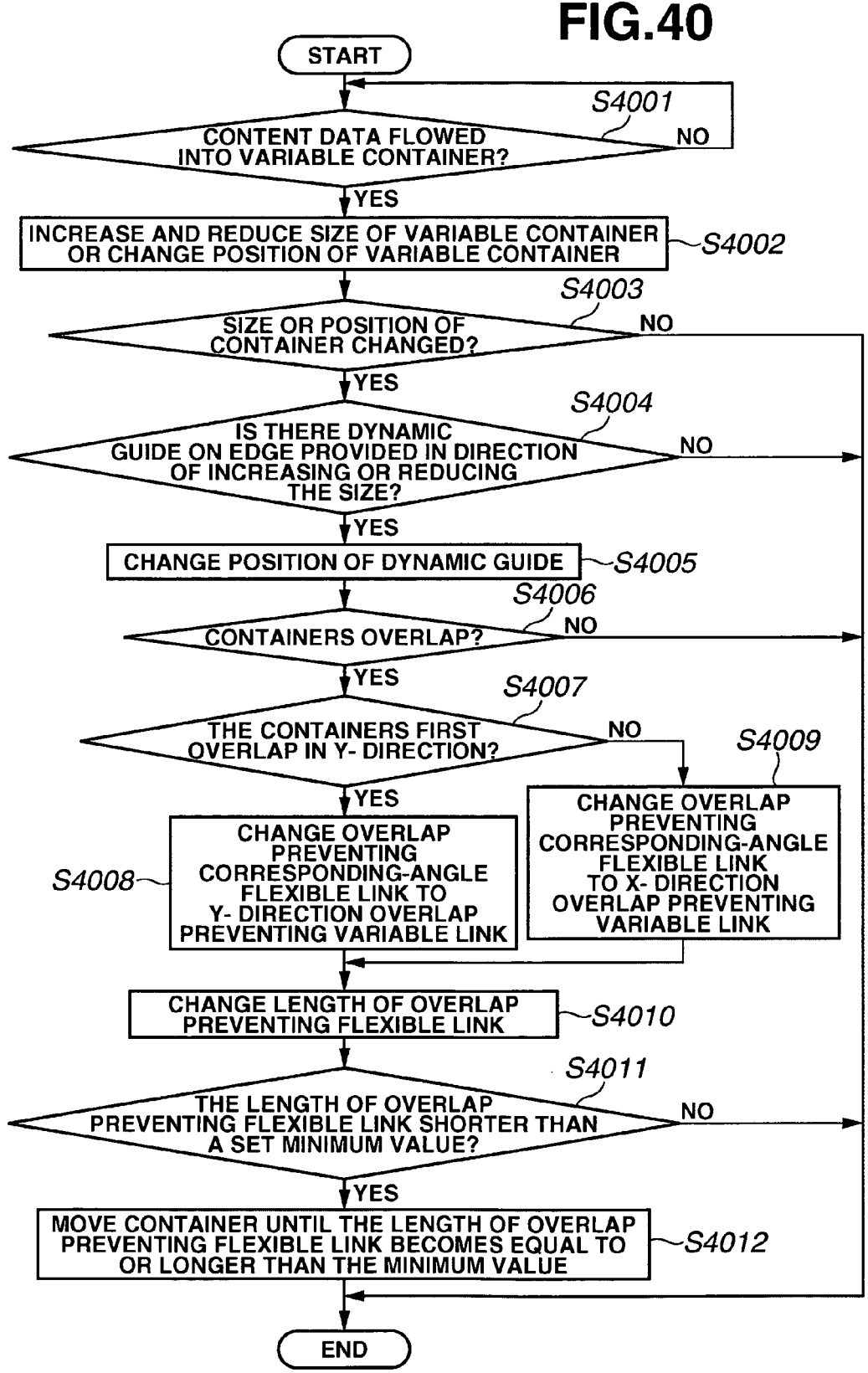
FIG. 40 is a flowchart illustrating the flow of a layout editing process of setting the overlap preventing corresponding-angle variable link that can be applied to the embodiment of the present invention.

FIG. 40 is a flowchart illustrating a layout editing process by the layout editing application 121 in a case where the overlap preventing corresponding-angle variable link is set. The layout editing process is described in detail below by referring to FIG. 33.

A user operates the mouse 133 to click on the menu items 304 (see FIG. 3) to instruct the system to flow image data into variable containers that are present on the document template 3309 shown in FIG. 33. When it is determined that image data (content) is flowed into the variable containers 3321, and 3322 to 3324 (yes in step S4001), the layout editing application 121 expands or reduces the size of the container according to the setting of the edges (sides) of the variable containers 3321, and 3322 to 3324 so that the content size of the image data is fit thereinto. In step S4002, the layout editing application 121 moves the layout position of the variable container according to the dynamic layout calculation, which has been described by referring to FIG. 9, in a case where a fixed link or a variable link, which affects the layout calculation, are present between this container and another variable container.

If the layout editing application 121 determines in step S4003 that the size or the position of the variable container is changed by the expansion/reduction and the displacement of the variable container, which is performed in step S4002, the layout editing application 121 determines in step S4004 whether the dynamic guides 3341 and 3342 have already been set, as on the right side 3351 and the lower side 3352 of the variable container 3321. If the dynamic guides 3341 and 3342 have already been set, the process proceeds to step S4005. Then, the layout editing application 121 moves the dynamic guides 3341 and 3342 in step S4005 in response to the expansion/reduction or the displacement of the variable container while maintaining a state in which the dynamic guides 3341 and 3342 are in contact with the sides of the container.

If it is determined that the size of the container is not changed (no in step S4003), this process is finished.

If it is determined that the dynamic guides are not set (no in step S4004), the process ends. Alternatively, a dynamic guide for setting an overlap preventing corresponding-angle link may be newly set, prior to ending the process.

If the layout editing application 121 determines that overlap between the containers does not occur (no in step S4006), processing ends. On the other hand, if the layout editing application 121 determines as a result of reflecting a result of changing the size or position of the variable container in step S4002 and changing the position of the dynamic guides in step S4005 that the overlap between the containers 3521 and 3522, or 3721 and 3722, occurs (yes in step S4006), as described by referring to FIGS. 35 and 37, the layout editing application 121 determines the overlapping direction between the containers in step S4007. If the direction of the overlap between the containers is an ordinate direction (yes in step S4007), as illustrated in FIG. 35, the layout editing application 121 changes the overlap preventing corresponding-angle variable link 3343 to an overlap preventing variable link corresponding to an ordinate direction in step S4008.

Conversely, if it is determined in step S4007 that the direction of the overlap between the containers is a horizontal direction (no in step S4007), as illustrated in FIG. 37, the layout editing application 121 changes the overlap preventing corresponding-angle variable link 3343 to an overlap preventing variable link corresponding to a horizontal direction in step S4009.

Then, the process proceeds to step S4010, where the length of the overlap preventing variable link is changed in response to the change of the layout according to the dynamic layout calculation. In a case where the length of the overlap preventing variable link is less than the minimum value of the overlap preventing variable link (yes in step S4011), which is set by a user in the text box 3410 of the dialog window for setting the attribute of the overlap preventing corresponding-angle variable link (in the case of the overlap preventing corresponding-angle variable link corresponding to the ordinate direction in step S4008) or in the text box 3412 (in the case of the overlap preventing corresponding-angle variable link corresponding to the horizontal direction in step S4009) as a result of changing the link length of the overlap preventing variable link, the layout editing application 121 determines the layout of the variable container in step S4012 by moving the position of a side, with which the link is set to increase the link length so that the link length of the overlap preventing variable link meets the conditions for the minimum value, of the container linked with the dynamic guide through the overlap preventing variable link. Then, the layout editing application 121 finishes the process.

If it is determined in step S4011 that the length of the link is not less than the minimum value (no in step S4011), the layout editing application 121 determines the layout of the variable container at a position determined by the link length and finishes the process.

As described above, even in the case of a layout, in which the overlapping direction cannot be specified, similarly to the above-described "first example of intrusion" and "second example of intrusion", the overlap preventing corresponding-angle variable link is set by the layout processing illustrated in FIG. 40. Thus, the overlap preventing corresponding-angle variable link can be changed to the overlap preventing link corresponding to the ordinate direction or to the overlap preventing link corresponding to the horizontal direction according to the variable data actually flowed thereinto.

Consequently, the problem of the limitation imposed on the range of the layout of overlapping objects can be solved by creating a dynamic guide and an overlap preventing variable link corresponding to each of two sides extending in the horizontal direction and the ordinate direction of an overlapped object, into which an overlapping object may first intrude.

First Example of Layout

Figure 36:
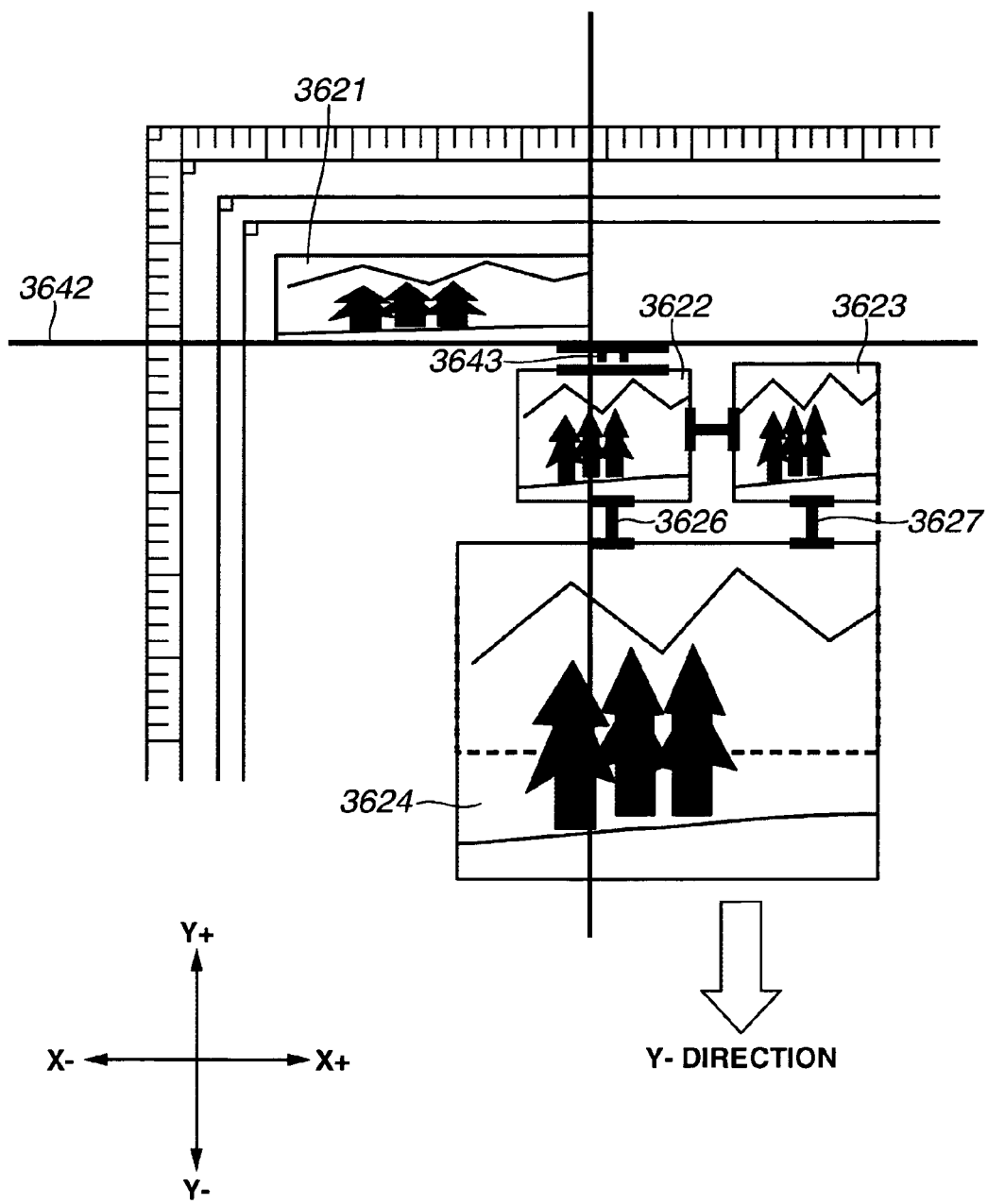
FIG. 36 illustrates an example of the layout of containers, which is set by a process illustrated in FIG. 40.

FIG. 36 illustrates an example of a layout, to which the layout shown in FIG. 33 is changed by performing the process illustrated in FIG. 40. The layout editing application 121 determines that an overlap like the overlap in the case of the first example of intrusion is caused by flowing variable data into each container. Consequently, the overlap preventing corresponding-angle flexible variable link 3343 is changed to an overlap preventing variable link 3643 corresponding to an ordinate direction. The variable containers are laid out so that the containers do not overlap, similarly to the variable containers 3521 and 3522 shown in FIG. 35.

The movement in Y+-direction of the variable container 3622 is restricted by the dynamic guide 3642 and the overlap preventing variable link 3643, which are set in the variable container 3621. In a case where it is necessary to expand the size of the variable container 3622 into which image data is fit, the layout editing application 121 moves a side of the variable container in Y--direction to expand the size of the variable container and to determine the position of the layout.

In a case where it is necessary to expand the size of the variable containers 3623 and 3624 associated with the variable container 3622 by the fixed links 3626 and 3627, similarly to the case of the variable container 3622, or where the position of the layout is changed by the expansion of the variable container 3622, the layout editing application 121 moves a side of the variable container in Y--direction to expand the size of the variable container and to determine the position of the layout.

Second Example of Layout

Figure 38:
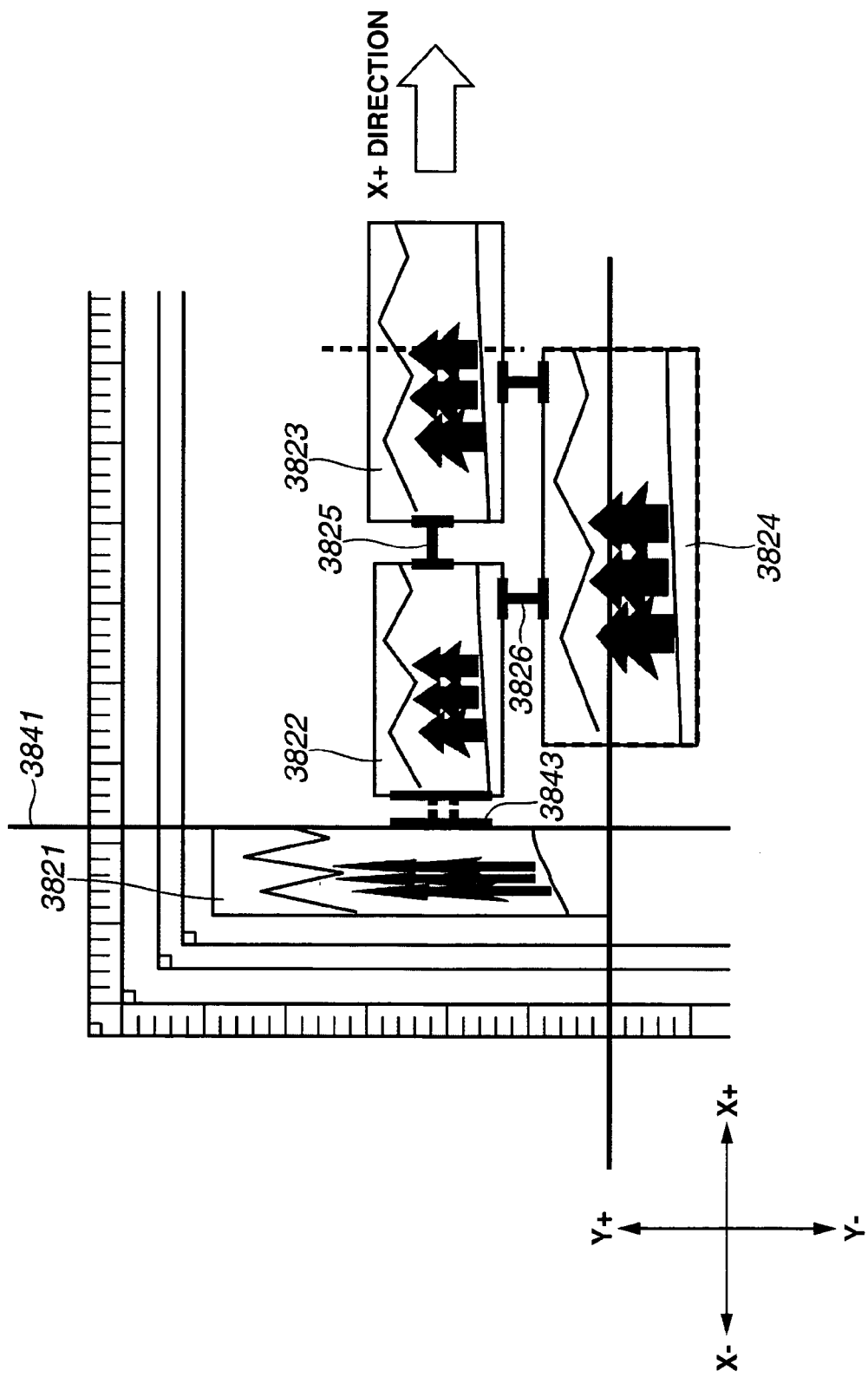
FIG. 38 illustrates an example of the layout of containers, which is set by the process illustrated in FIG. 40.

FIG. 38 illustrates an example of a layout, to which the layout shown in FIG. 33 is changed by performing the process illustrated in FIG. 40. The layout editing application 121 determines that an overlap like the overlap in the case of the second example of intrusion is caused by flowing variable data into each container. Consequently, the overlap preventing corresponding-angle variable link 3343 is changed to an overlap preventing variable link 3843 corresponding to a horizontal direction. The variable containers are laid out so that the containers do not overlap, similarly to the variable containers 3721 and 3722 shown in FIG. 37.

The movement in X--direction of the variable container 3822 is restricted by the dynamic guide 3841 and the overlap preventing variable link 3843, which are set in the variable container 3821. In a case where it is necessary to expand the size of the variable container 3822 into which image data is fit, the layout editing application 121 moves a side of the variable container in X+-direction to expand the size of the variable container and to determine the position of the layout.

In a case where it is necessary to expand the size of the variable containers 3823 and 3824 associated with the variable container 3822 by the fixed links 3825 and 3826, similarly to the case of the variable container 3822, or where the position of the layout is changed by the expansion of the variable container 3822, the layout editing application 121 moves a side of the variable container in X+-direction to expand the size of the variable container and to determine the position of the layout.

As described above, according to the first embodiment, the overlap of containers (partial display areas), into which data is fit, is determined at the time of editing of layout. Then, a partial display area which inhibits overlap and a partial display area which permits overlap are set at the time of editing of layout. Thus, the first embodiment can provide layout control techniques of efficiently realizing a layout display desired by a user.

Second Embodiment

A second embodiment of the present invention is described below. The second embodiment is adapted to determine the overlap among a plurality of containers disposed on a document template, and to control the display of each container according to an instruction from a user.

A layout control apparatus according to the second embodiment is implemented by a combination of the hardware configuration elements and the software configuration elements.

The layout control apparatus configured to control layout of a plurality of partial display areas, in each of which data assigned thereto is fit, and to lay out the data on a page, includes a prediction unit configured to calculate a movable area of each of the partial display areas, in each of which the data assigned thereto is fit, and to predict from the movable area whether each of the partial display areas overlaps with another object arranged on the page, a display order setting unit configured to set, in a case where it is predicted by the prediction unit that an overlap among the plurality of partial display areas occurs, a display order of displaying the partial display areas, and a display control unit configured to display the partial display areas according to the display order set by the display order setting unit.

Figure 41:
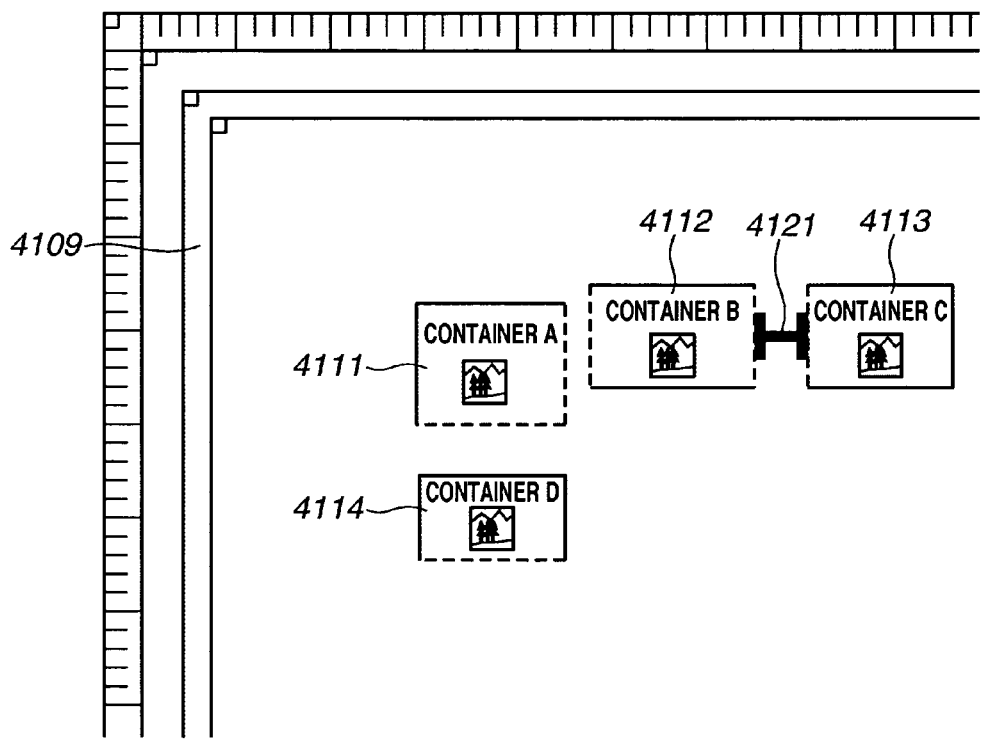
FIG. 41 illustrates an edit window used by the layout editing application in a second embodiment of the present invention.

FIG. 41 illustrates an edit window displayed by the layout editing application 121 according to the second embodiment. Hereinafter, an overlap between variable containers caused by flowing image data into four variable containers 4111 to 4114 is described by way of example. Although the overlap between the variable containers functioning as image containers, to which image data is assumed to be flowed thereinto, is described in the following description by way of example, the variable containers may be those functioning as text containers, to which text data is assumed to be flowed thereinto. Even in a case where text containers and image containers coexist on the document template 4109, the layout editing application 121 (including the user interface module 103 and the layout engine module 105) can determine the overlap of a plurality of containers and can control the display of each container according to an instruction from a user. Processing performed by the second embodiment corresponds to that performed according to the layout method illustrated in FIG. 17 in a case where the box 1743 is checked.

Variable containers 4111 to 4114 are disposed on the document template 4109. The variable containers 4112 and 4113 are associated with each other by a link 4121. The layout editing application 121 assigns identifiers "Container A", "Container B", "Container C", and "Container D" to the variable containers 4111, 4112, 4113, and 4114, respectively, automatically or according to designations by a user, and displays the identifiers in the window.

Figure 42:
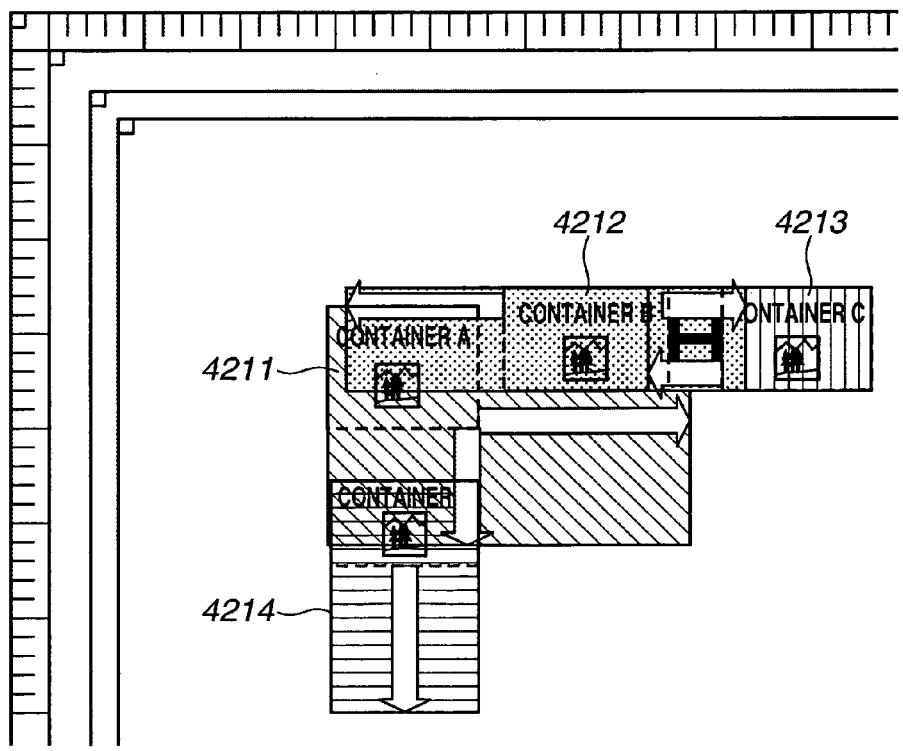
FIG. 42 illustrates the predicted maximum movable ranges of variable containers in the second embodiment.

FIG. 42 illustrates the predicted maximum movable range of the variable containers 4111 to 4114 located as shown in FIG. 41. The layout engine 105 calculates the predicted maximum movable range according to the statuses of edges and the sizes of the containers, which are set by using the property dialog window illustrated in FIG. 17 and used to set the attributes of the containers. As illustrated in FIG. 42, the container A 4211 may overlap with the containers B 4212 and C 4213 in a horizontal direction and may overlap with the container D 4214 in an ordinate direction.

Overlap Setting Process Flow

Figure 43:
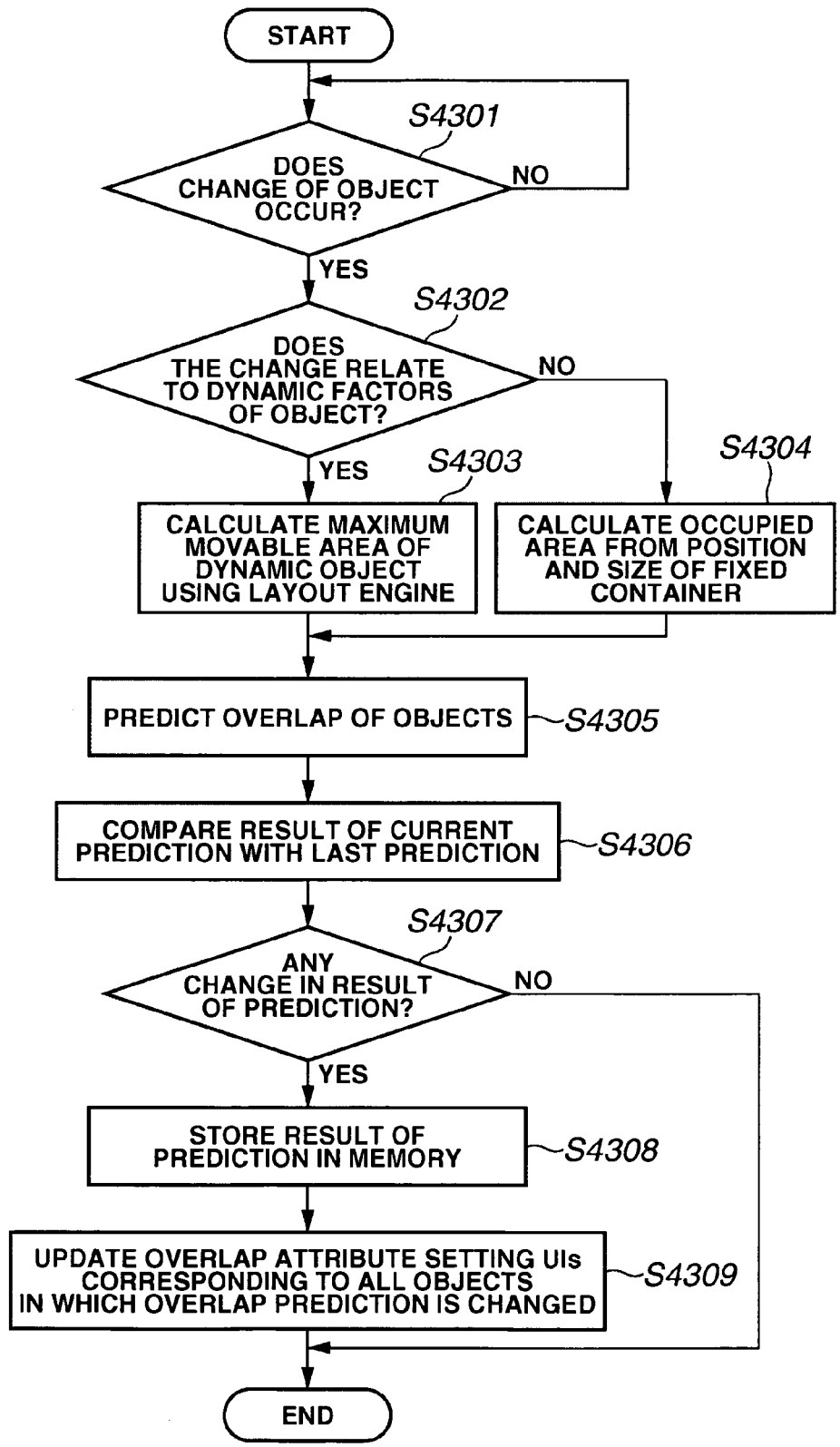
FIG. 43 is a flowchart illustrating the flow of an overlap setting process performed by the layout editing application in the second embodiment.

FIG. 43 is a flowchart illustrating the flow of an overlap setting process performed by the layout editing application 121.

The layout editing application 121 determines in step S4301 whether, when at least two containers are present on the document template, the set conditions for the containers are changed by a user. If it is determined in step S4301 that the set conditions for the container are changed by a user (yes in step S4301), the layout editing application 121 determines in step S4302 whether this change relates to dynamic factors of the objects. The change relating to dynamic factors of the objects is, for instance, a change from a static object to a dynamic object, and a change in the position, the size, and the variable edges of the dynamic object. Information representing the set conditions for each object is held by the memory unit 136. Thus, the layout editing application 121 can perform a determination process in step S4302 by referring to the memory unit 136.

If it is determined in step S4302 that the change relates to the dynamic factors (yes in step S4302), the layout editing application 121 calculates the maximum movable areas of all dynamic objects (for example, variable containers) relating to the change in the dynamic factors in step S4303 by using the layout engine 105.

This calculation is similar to the processing performed in step S2508 shown in FIG. 25B. The layout engine 105 calculates the maximum movable ranges of the variable containers serving as dynamic objects (that is, calculates the maximum movable areas) from the factor of the "setting of the maximum size of the container" and that of the "movement thereof due to another container linked therewith".

In a case where it is determined in step S4302 that the change made by a user does not relate to the dynamic factors of the objects, which are present on the document template (no in step S4302), for example, the change from the dynamic object (the variable container) to the static object (the fixed container), a change in the layout position and the size of a static object (a fixed container), the layout editing application 121 calculates the areas occupied by the static objects (fixed containers) on the document template from the layout position and the size of the fixed containers, which are the static objects, (that is, performs the calculation of the occupied areas) in step S4304. Because information on the area occupied by the static object is held by the memory unit 136, the layout editing application 121 can calculate the occupied area by referring to the memory unit 136.

The layout engine module 105 of the layout editing application 121 predicts occurrence of overlap of containers shown in FIG. 42 in step S4305 according to a result of calculation of prediction (performed in step S4303) of the overlap of the objects disposed on the document template 4109 or according to a result of calculation (performed in step S4304) of the occupied areas on the document template 4109.

In step S4306, the layout editing application 121 compares the result of the last prediction of the overlap of the objects with that of the last prediction of the overlap. If there are not any change in the result of the calculation of the prediction of the overlap (no in step S4307), processing ends.

If there is any change in the result of the calculation of the prediction of the overlap (yes in step S4307), information representing the result of the prediction of the overlap, which is to be changed, is held in the memory unit 136 in step S4308. Thus, the layout editing application 121 updates the last result of the prediction of the overlap, which is to be changed. Subsequently, in step S4309, the layout editing application 121 updates the user interface for setting the overlap attribute corresponding to the object, the prediction of the overlap with which is changed. Processing then ends.

The updating of the user interface for setting the overlap attribute may automatically be performed under the control of the layout editing application 121. Also, the display of each container can be controlled according to a designation performed by a user.

Object Overlap Attribute Setting UI

Figure 44:
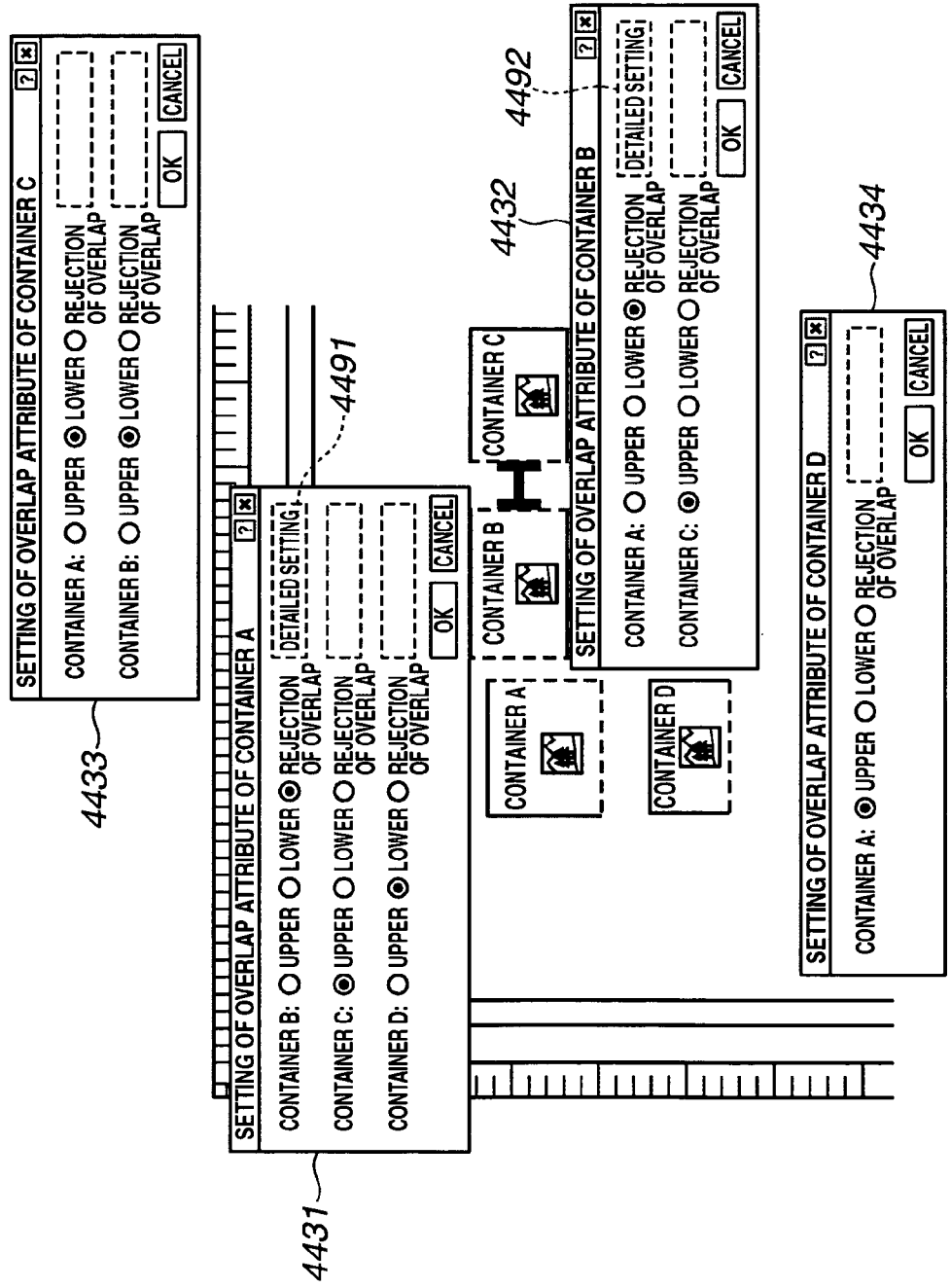
FIG. 44 illustrates a user interface (UI), which is used to set an overlap attribute of each object in the second embodiment.

FIG. 44 illustrates a UI for setting the object overlap attribute (hereunder referred to as an object overlap attribute setting UI). An object overlap attribute setting UI corresponding to the container A 4431, an object overlap attribute setting UI corresponding to the container B 4432, an object overlap attribute setting UI corresponding to the container C 4433 and an object overlap attribute setting UI corresponding to the container D 4434 are shown in FIG. 44. The layout editing application 121 can set the rejection of overlap of each object with another object (container) disposed on the document template or the allowance of overlap of the former object with the latter object by placing the latter object at an "upper" position on the former object (hereunder sometimes referred to an "upper-position overlap") or overlap of the former object with the latter object by placing the latter object at a "lower" position (hereunder sometimes referred to a "lower-position overlap") under the former object (according to Z-order) by performing a layout editing process.

When information representing the setting of allowance of overlap is input, two variable containers are placed so that one of the variable containers is placed at an "upper" position on the other container placed at a "lower" position thereunder in the overlapped part between the two variable containers.

When information representing the setting of rejection of overlap is input, the system enables the inputting of detailed setting information designating that both of the variable containers are placed with the same priority, or detailed setting information indicating that one of the variable containers is preferentially placed. The layout engine module 105 adapted to perform a dynamic layout places two variable containers at positions, at which no overlap therebetween occurs according to the detailed setting.

The containers B, C, and D are listed as objects, which are predicted to overlap with the container A, in the overlap attribute setting UI 4431 shown in FIG. 44 corresponding to the container A by the processing performed by the layout editing application 121, which has been described by referring to FIG. 43. The overlap attribute setting UI 4431 has option buttons selectively enabling the setting of the attribute of allowance of "upper-position overlap" or "lower-position overlap" and the setting of the attribute of "rejection of overlap". In the overlap attribute setting UI 4431, the attribute of "rejection of overlap" is selected for the container B. The attribute of allowance of "upper-position overlap" is selected for the container C. The attribute of allowance of "lower-position overlap" is selected for the container D.

The containers A and C are listed as objects, which are predicted to overlap with the container B, in the overlap attribute setting UI 4432 shown in FIG. 44 corresponding to the container B. The overlap attribute setting UI 4432 shown in FIG. 44 has option buttons selectively enabling the setting of the attribute of allowance of "upper-position overlap" or "lower-position overlap" and the setting of the attribute of "rejection of overlap". The attribute of "rejection of overlap" is set as the overlap attribute for the container A in synchronization with the overlap attribute setting UI 4431 for setting the overlap attribute of the container A, which may overlap with the container B (that is, both of the UIs 4431 and 4432 set the "rejection of overlap"). The attribute of allowance of "upper-position overlap" is set for the container C in the overlap attribute setting UI 4432.

The containers A and B are listed as objects, which are predicted to overlap with the container C, in the overlap attribute setting UI 4433 corresponding to the container C. Similarly to the cases of the containers A and B, the overlap attribute setting UI 4433 has option buttons selectively enabling the setting of the attribute of allowance of "upper-position overlap" or "lower-position overlap" and the setting of the attribute of "rejection of overlap". The attribute of "lower-position overlap" is set in the overlap attribute setting UI 4433 as the overlap attribute for the container A in synchronization with the overlap attribute setting UI 4431 for setting the overlap attribute of the container A, which may overlap with the container B (that is, an overlap adapted to place the container A at an "upper" position on the container C is allowed). The attribute of allowance of "lower-position overlap" is set in the overlap attribute setting UI 4433 for the container B in synchronization with the overlap attribute setting UI 4432 (an overlap adapted to place the container B at an "upper" position on the container C is allowed) for the container B, which may overlap with the container C.

The container A is listed as an object, which is predicted to overlap with the container D, in the overlap attribute setting UI 4434 corresponding to the container D. Similarly to the cases of the containers A, B and C, the overlap attribute setting UI 4434 has option buttons selectively enabling the setting of the attribute of allowance of "upper-position overlap" or "lower-position overlap" and the setting of the attribute of "rejection of overlap". The attribute of "upper-position overlap" is set in the overlap attribute setting UI 4434 as the overlap attribute for the container D in synchronization with the overlap attribute setting UI 4431 for setting the overlap attribute of the container D, which may overlap with the container A (that is, an overlap adapted to place the container D at an "upper" position and the container A at a "lower" position is allowed). In the case of the present embodiment, the container A is employed as a reference for setting the overlap attribute. As described above, the setting of the overlap attribute of each of the containers B to D is synchronized with the setting of the overlap attribute of the container A. For example, in a case where the overlap attribute of the container D is changed to the attribute "lower-position overlap" in the attribute setting UI 4434, the overlap attribute set in the attribute setting UI 4431 for the container A is changed to the attribute "upper-position overlap" in synchronization therewith. Information indicating the set overlap order of the containers and information indicating the attribute of the "rejection of overlap" are held in a state in which the containers determined to overlap with each other are associated with each other. Thus, for example, in a case where the attribute "upper-position overlap" is set as the overlap attribute of one of the containers, the attribute "lower-position overlap" can be set as the overlap attribute of the other container associated therewith Thus, the layout editing application 121 can perform the setting of the overlap attribute of one of two containers in an overlap attribute setting UI in synchronization with the setting of the overlap attribute of the other container in another overlap attribute setting UI.

The synchronization of the setting the attribute is achieved according to the following relation by the layout editing application 121. In a case where the overlap attribute of one of the objects (the containers) is set by the overlap attribute setting UI to be the attribute "upper-position overlap", the overlap attribute of another object (container), which overlaps with the one of the objects, is set by the overlap attribute setting UI to be the attribute "lower-position overlap". In a case where the overlap attribute of one of the objects (the containers) is set by the overlap attribute setting UI to be the attribute "lower-position overlap", the overlap attribute of another object (container), which overlaps with the one of the objects, is set by the overlap attribute setting UI to be the attribute "upper-position overlap". In a case where the overlap attribute of one of the objects (the containers) is set by the overlap attribute setting UI to be the attribute "rejection of overlap", the overlap attribute of another object (container), which overlaps with the one of the objects, is set by the overlap attribute setting UI to be also the attribute "rejection of overlap".

In a case where an overlap between objects (containers) is caused in response to change of a result of prediction of the overlap, which occurs when the processing in step S4309 is performed by the layout editing application 121, an object is added to those undergoing the list display in the overlap attribute setting UI. In a case where the overlap is eliminated, the corresponding object is deleted. According to the result of prediction of the overlap, the attribute of allowance of overlap or the attribute of inhibition of overlap can be additionally set corresponding to the newly added object (container).

Overlap Rejecting Dynamic Layout Setting UI

Figure 45:
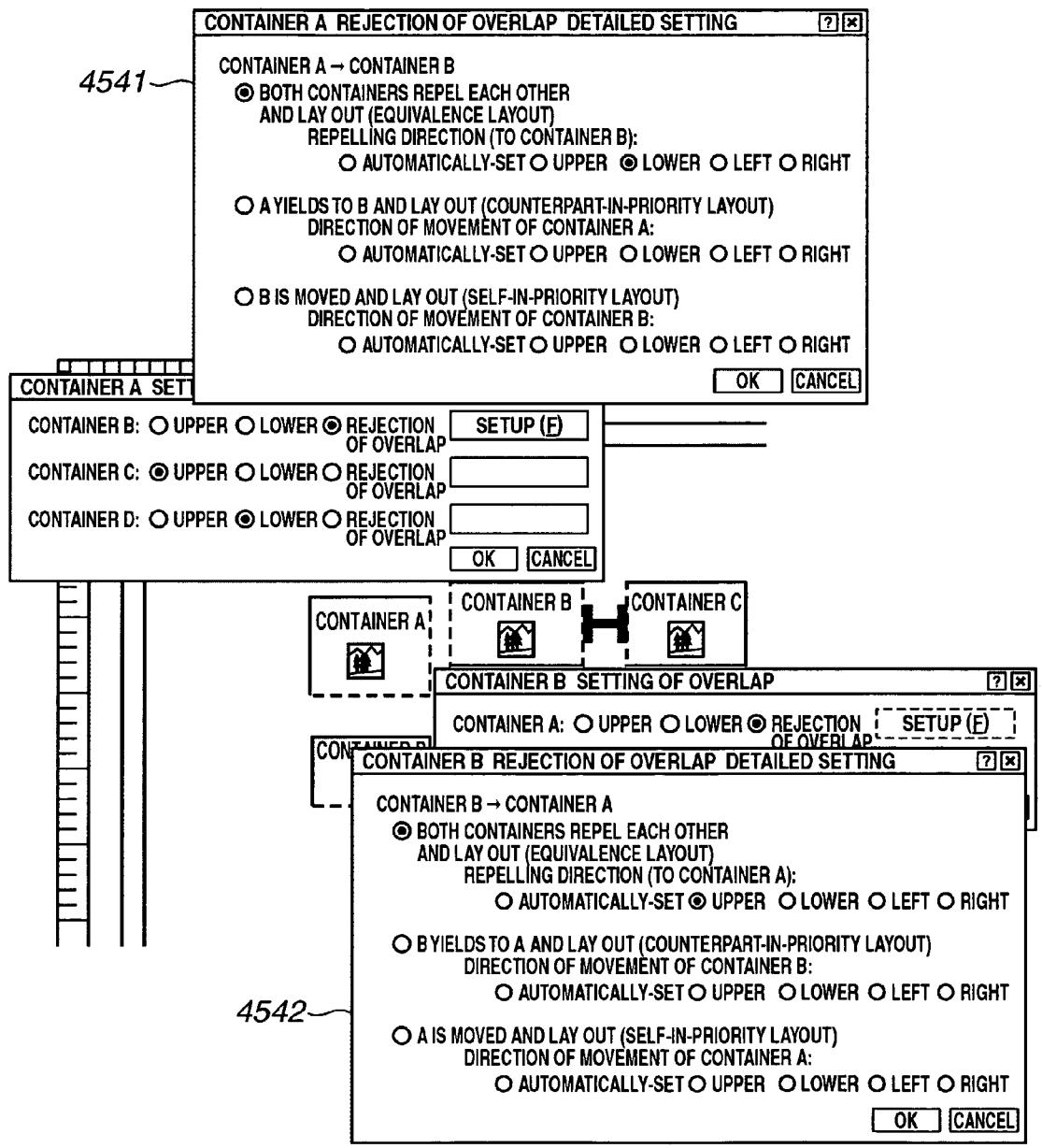
FIG. 45 illustrates a dynamic layout setting UI in a case where the rejection of overlap of objects is designated in the second embodiment.

FIG. 45 illustrates a dynamic layout setting UI in a case where the rejection of overlap of objects is designated (hereunder sometimes referred to as an overlap rejecting dynamic layout setting UI) in the second embodiment. An overlap rejecting dynamic layout setting UI for setting the attribute of rejecting the overlap of the container A with the container B 4541 and an overlap rejecting dynamic layout setting UI for setting the attribute of rejecting the overlap of the container B with the container A 4542 are shown in FIG. 45.

The overlap rejecting dynamic layout setting UI 4541 is displayed by the layout editing application 121 when the attribute setting UI 4431 designates the "rejection of overlap" of the container A with the container B and when a "detailed setting" button 4491 is depressed. Similarly, the overlap rejecting dynamic layout setting UI 4542 is displayed by the layout editing application 121 when the attribute setting UI 4432 designates the "rejection of overlap" of the container B with the container A and when a "detailed setting" button 4492 is depressed.

As shown in FIG. 45, a user can designate one of three option buttons respectively corresponding to methods "both containers repel each other and lay out (equivalence)", "yield priority to counterpart and lay out (counterpart-in-priority layout)" and "move counterpart and lay out (self-in-priority layout)".

A user can designate an overlap rejecting dynamic layout method by selecting one of the option buttons.

When a user selects the option button corresponding to the "both containers repel each other and lay out (equivalence)"

from among the option buttons, the user can select one of option buttons respectively corresponding to repelling-directions, that is, an "automatically set direction", "an upper direction", "a lower direction", "a left direction", and "a right direction" (directions in which a user moves his own container to prevent his own container from overlapping with another container), in which an own container repels with respect to a counterpart container, the overlap with which is rejected. These layout editing operations are based on the processing performed by the layout editing application 121.

When a user selects the option button corresponding to the "yield priority to a counterpart (counterpart-in-priority layout)" from among the option buttons, the user can select one of option buttons respectively corresponding to movement directions of the own container, that is, an "automatically set direction", "an upper direction", "a lower direction", "a left direction", and "a right direction" (directions in which a user moves his own container with respect to a counterpart). These layout editing operations are based on the processing performed by the layout editing application 121.

When a user selects the option button corresponding to the method "move a counterpart and lay out (self-in-priority layout)" from among the option buttons, the user can select one of option buttons respectively corresponding to movement directions in which a counterpart container is displaced, that is, an "automatically set direction", "an upper direction", "a lower direction", "a left direction", and "a right direction" (directions in which a counterpart moves his own container with respect to a counterpart).

These layout editing operations are based on the processing performed by the layout editing application 121.

For example, in the overlap rejecting dynamic layout setting UI 4541 for setting the rejection of the overlap of the container A with the container B, which is shown in FIG. 45, the method "both containers repel each other and lay out (equivalence)" is designated by the corresponding option button. The "lower" direction is designated as the direction, in which the container A repels with respect to the container B, by depressing the corresponding option button. In the overlap rejecting dynamic layout setting UI 4542 for setting the rejection of the overlap of the container B with the container A, the method "both containers repel each other and lay out (equivalence)" is designated by the corresponding option button in synchronization with the overlap rejecting dynamic layout setting UI 4541, in which the method "both containers repel each other and lay out (equivalence)" is designated, for setting the rejection of the overlap of the container A with the container B. The "upper" direction is designated as the direction, in which the container B repels with respect to the container A, by depressing the corresponding option button, which is used to designate the repelling direction of the container B with respect to the container A, in synchronization with the overlap rejecting dynamic layout setting UI 4541 to permit repulsion adapted so that the repelling direction of the container A is the "lower" direction, and that the repelling direction of the container B is the "upper" direction.

Thus, the layout editing application 121 can synchronize the setting of the method and the direction, which are set by a user's operation, in one of the overlap rejecting dynamic layout setting UI with that of the method and the direction in the other overlap rejecting dynamic layout setting UI.

It is assumed that the synchronization of setting the method and the direction is performed according to the following relations by the layout editing application 121.

Synchronization of Setting of Overlap Rejecting Dynamic Layout (1) In a case where the method "both of the containers repel each other and lay out (equivalence)" is set by the overlap rejecting dynamic layout setting UI, the same method "both of the containers repel each other and lay out (equivalence)" is set in the other overlap rejecting dynamic layout setting UI corresponding to the other object, which is rejected to overlap therewith.

(2) In a case where the method "yield priority to a counterpart (counterpart-in-priority layout)" is set by the overlap rejecting dynamic layout setting UI, the method "move a counterpart and lay out (self-in-priority layout)" is set in the other overlap rejecting dynamic layout setting UI corresponding to the other object, which is rejected to overlap therewith.

(3) In a case where the method "move a counterpart and lay out (self-in-priority layout)" is set by the overlap rejecting dynamic layout setting UI, the method "yield priority to a counterpart (counterpart-in-priority layout)" is set in the other overlap rejecting dynamic layout setting UI corresponding to the other object, which is rejected to overlap therewith.

Synchronization of Setting of Repelling Direction, Setting of Direction of Movement of Own Container, and Setting of Direction of Movement of Counterpart's Container (1) In a case where the "automatically-set" direction is set by the overlap rejecting dynamic layout setting UI, the "automatically-set" direction is also set in the other overlap rejecting dynamic layout setting UI corresponding to the other object, which is rejected to overlap therewith.

(2) In a case where the "upper" direction is set by the overlap rejecting dynamic layout setting UI, the "lower" direction is set in the other overlap rejecting dynamic layout setting UI corresponding to the other object, which is rejected to overlap therewith.

(3) In a case where the "lower" direction is set by the overlap rejecting dynamic layout setting UI, the "upper" direction is set in the other overlap rejecting dynamic layout setting UI corresponding to the other object, which is rejected to overlap therewith.

(4) In a case where the "left" direction is set by the overlap rejecting dynamic layout setting UI, the "right" direction is set in the other overlap rejecting dynamic layout setting UI corresponding to the other object, which is rejected to overlap therewith.

(5) In a case where the "right" direction is set by the overlap rejecting dynamic layout setting UI, the "left" direction is set in the other overlap rejecting dynamic layout setting UI corresponding to the other object, which is rejected to overlap therewith.

Information representing the method and the set direction, which are set by using the UIs shown in FIGS. 44 and 45, respectively, is held in the memory unit 136.

Overlap Rejecting Dynamic Layout

Figure 46:
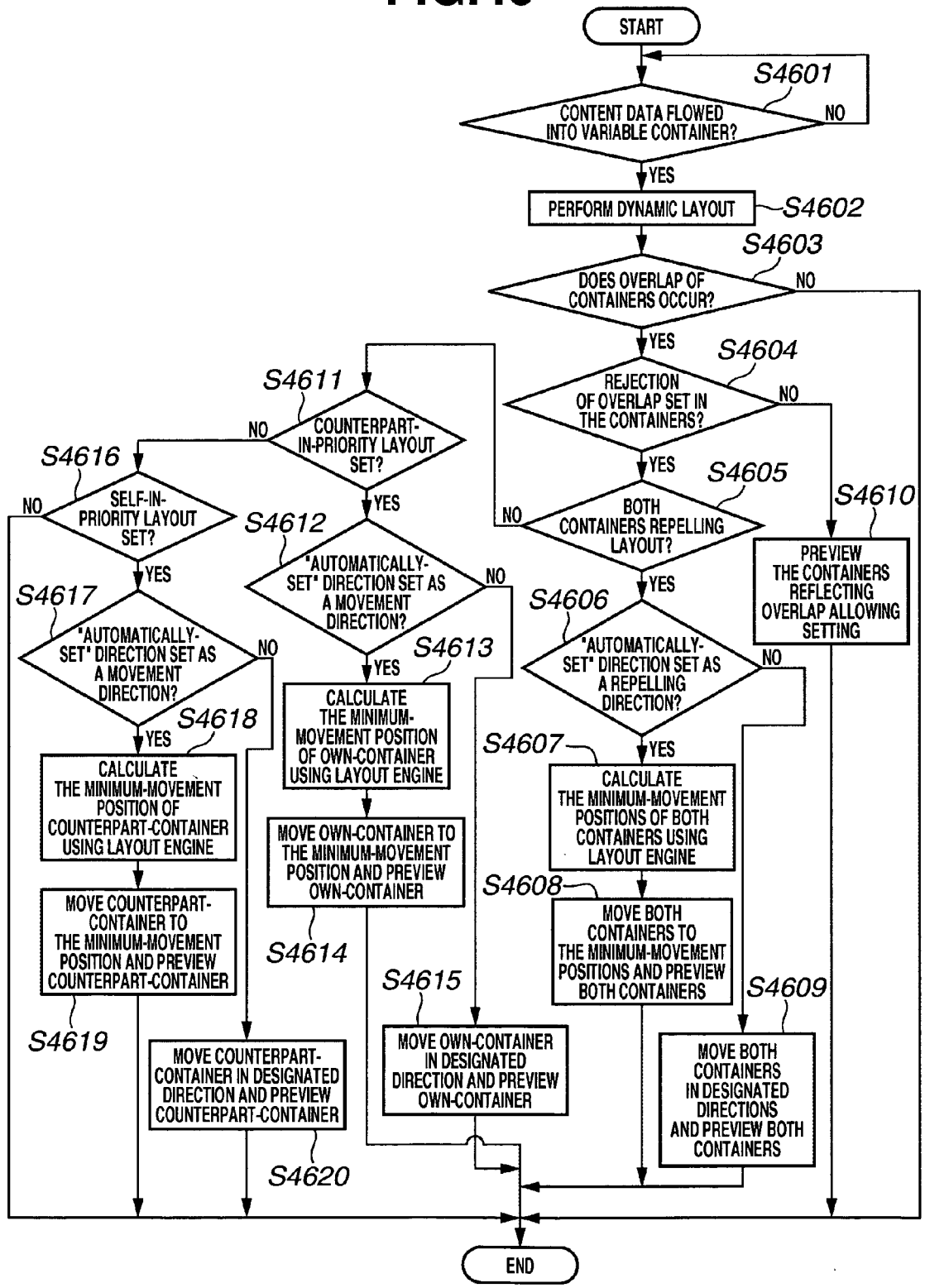
FIG. 46 is a flowchart illustrating the flow of a process of overlap rejecting dynamic layout in the second embodiment.

FIG. 46 is a flowchart illustrating the flow of a process of the overlap rejecting dynamic layout, which is performed by the layout editing application 121. It is assumed that in the overlap rejecting dynamic layout performed in the present embodiment, the layout editing application 121 can control the placement of the variable containers by using the dynamic guide, the overlap preventing variable link, or the overlap preventing corresponding-angle variable link, which have been described in the description of the first embodiment, so that variable containers do not overlap with each other.

A user operates the mouse 133 to click on the menu items 304 to instruct the system to flow image data into variable containers that are present on the document template. The layout editing application 121 determines in step S4601 whether image data (content) is flowed into the variable containers. If it is determined that the variable data is flowed thereinto (yes in step S4601), the layout engine 105 of the layout editing application 121 obtains the placement of the variable containers 4111 to 4114 on the document template 4109 according to the edge status, the set sizes of the containers, and the changes in the dynamic factors. Then, the layout engine 105 calculates the predicted maximum movable ranges of the variable containers 4111 to 4114 (that is, performs the dynamic layout) in step S4602. This processing is similar to that in step S4302. Thus, the detail description of this processing is not repeated here.

Then, the layout editing application 121 determines in step S4603 whether an overlap between the objects (the variable containers) occurs as a result of performing the dynamic layout. If the overlap does not occur (no in step S4603), processing ends. If the overlap occurs (yes in step S4603), the layout editing application 121 determines in step S4604 whether the attribute of "rejection of overlap" is set by a user corresponding to the objects (variable containers), which overlap with each other, in the overlap attribute setting UI described by referring to FIG. 44. Information representing the set attributes is held in the memory unit 136. Thus, the layout editing application 121 can make this determination by referring to the memory unit 136.

If it is determined in step S4604 that the attribute of "rejection of overlap" is not set corresponding to the variable container (no in step S4604), the layout editing application 121 causes the objects (the variable containers), which overlap with each other, to reflect the designation of allowance of the overlap, which is an "upper-position overlap" or a "lower-position overlap" and is set according to Z-order by a user through the overlap attribute setting UI described by referring to FIG. 44. Also, the layout editing application 121 changes the display order of the objects (one of the objects is displayed as placed at an upper position, and the other object is displayed as placed at a lower position according to the designation of the "upper-position overlap" or the "lower-position overlap") and previews the objects in an edit window in step S4610. Processing then ends.

If it is determined in step S4604 that the attribute of "rejection of overlap" is set corresponding to the variable container (yes in step S4604), the process proceeds to step S4605, where the layout editing application 121 determines whether the method "both containers repel each other and layout (equivalence)" is set by the overlap rejecting dynamic layout setting UI described by referring to FIG. 45. As described above, information representing the set conditions is held by the memory unit 136. Thus, the layout editing application 121 can make this determination by referring to the memory unit 136.

If it is determined in step S4605 that the method "both containers repel each other and layout" is set, the process advances to step S4606, where the layout editing application 121 determines whether the repelling direction set by the overlap rejecting dynamic layout setting UI is the "automatically-set" direction.

If it is determined in step S4606 that the "automatically-set" direction is set as the repelling direction (yes in step S4606), the layout editing application 121 calculates a movement position, at which both objects (containers), whose movement directions are opposite to each other and whose movement amounts are substantially equal to each other, do not overlap with each other, by using the layout engine 105. The processing performed by the layout editing application 121 in step S4607 is to calculate the position of each object to recognize an overlapping area, and to obtain the movement position, at which the objects do not overlap with each other, by moving the object in an opposite direction by the size of the overlapping area. The layout editing application 121 moves both of the objects (variable containers) according to the movement position calculated in step S4607, and lays out the objects and performs a preview display of a result of the layout in step S4608. Then, this process is finished.

That is, the layout editing application 121 determines whether to perform an overlap rejection (preventing) process based on a predetermined overlap rejection setting (overlap preventing link) and whether the containers overlap when the data assigned thereto is fit in each of the containers. The layout engine 105 for performing the dynamic layout is adapted to perform recalculation of the layout positions of one of the variable containers and another of the containers according to the set attributes, such as the overlap setting, the overlap rejection, and the detailed conditions for the rejection of the overlap. The user interface module 103 having a display control function performs the preview display of a result of the recalculation on the screen of the display unit 144.

If it is determined in step S4606 the "automatically-set" direction is not set as the repelling direction in the overlap rejecting dynamic layout setting UI (no in step S4606), the layout editing application 121 moves both of the objects (the variable containers) in the repelling directions of both of the objects (the containers), which are set in synchronization with each other to be opposite to each other, so that the amounts of movement of the containers are nearly equal to each other, and lays out the objects. Subsequently, the layout editing application 121 performs the preview display of a result of the layout in step S4609. Then, this process is finished.

If it is determined in step S4605 that the method "both of containers repel each other and layout" is not set by the overlap rejecting dynamic layout setting UI (no in step S4605), the process advances to step S4611, where the layout editing application 121 determines whether the method "yield priority to counterpart and lay out (counterpart-in-priority layout)" is set by the overlap rejecting dynamic layout setting UI.

If it is determined in step S4611 that the method "yield priority to counterpart and layout (counterpart-in-priority layout)" is set by the overlap rejecting dynamic layout setting UI (yes in step S4611), the process proceeds to step S4612, where the layout editing application 121 determines whether the "automatically-set" direction is set as the direction of movement of an own container with respect to a counterpart container by the overlap rejecting dynamic layout setting UI.

If it is determined in step S4612 that the "automatically-set" direction is set as the direction of movement of the own container (yes in step S4612), the process proceeds to step S4613, where the layout editing application 121 calculates the minimum movement position, at which the own object (the own variable container) does not overlap with the counterpart object (the counterpart container), whose layout position is preferentially determined, by using the layout engine 105. Then, the layout editing application 121 moves the own object (the own container) to the movement position and lays out the containers. Subsequently, the layout editing application 121 performs the preview display of a result of the layout in step S4614. Then, this process is finished.

If it is determined in step S4612 that the "automatically-set" direction is not set as the direction of movement of the own container with respect to the counterpart container by the overlap rejecting dynamic layout setting UI (no in step S4612), the layout editing application 121 moves the own object (the own container) to the position, at which the own object does not overlap with the counterpart object (the counterpart container), whose layout position is preferentially determined, according to one of the "upper" direction, the "lower" direction, the "left" direction, and the "right" direction set as the direction of movement of the own container, and lays out the containers. Subsequently, the layout editing application 121 performs the preview display of a result of the layout in step S4615. Then, this process is finished.

If it is determined in step S4611 that the method "yield priority to counterpart and lay out (counterpart-in-priority layout)" is not set by the overlap rejecting dynamic layout setting UI (no in step S4611), the process proceeds to step S4616, where the layout editing application 121 determines whether self-in-priority layout is set. If self-in-priority layout is not set (no in step S4616), processing ends. If self-in-priority layout is set (yes in step S4616), the process proceeds to step S4617 where the layout editing application 121 determines whether the "automatically-set" direction is set as the direction of movement of the counterpart container with respect to the own container by the overlap rejecting dynamic layout setting UI.

If it is determined in step S4617 that the "automatically-set" direction is set as the direction of movement of the counterpart container with respect to the own container (yes in step S4617), the process proceeds to step S4618, where the layout editing application 121 calculates the minimum movement position, at which the own object (the own variable container), whose layout position is preferentially determined, does not overlap with the counterpart object (the counterpart container) by using the layout engine 105. Then, the layout editing application 121 moves the counterpart object (the counterpart container) to the movement position and lays out the containers. Subsequently, the layout editing application 121 performs the preview display of a result of the layout in step S4619. Then, this process is finished.

If it is determined in step S4617 that the "automatically-set" direction is not set as the direction of movement of the counterpart container with respect to the own container by the overlap rejecting dynamic layout setting UI (no in step S4617), the layout editing application 121 moves the counterpart object (the counterpart container) to the position, at which the counterpart object does not overlap with the own object (the own container), whose layout position is preferentially determined, according to one of the "upper" direction, the "lower" direction, the "left" direction, and the "right" direction set as the direction of movement of the counterpart container, and lays out the containers. Subsequently, the layout editing application 121 performs the preview display of a result of the layout in step S4620. Then, this process is finished.

Even in a case where the layout is changed by flowing variable data into the container and where the objects overlap with each other, the overlapping order of the objects can be set by using the second embodiment. Thus, a layout reflecting a user's intention can be created. Even in a case where the attribute of the "rejection of overlap" is set, a plurality of methods of avoiding the overlap (the "equivalence" method, the "counterpart-in-priority layout" method and the "self-in-priority layout" method) can be selected. Also, the avoiding directions can be set. Thus, not only the avoidance of the overlap but the creation of a layout reflecting a user's intention even after the avoidance of the overlap can be achieved.

Figure 47:
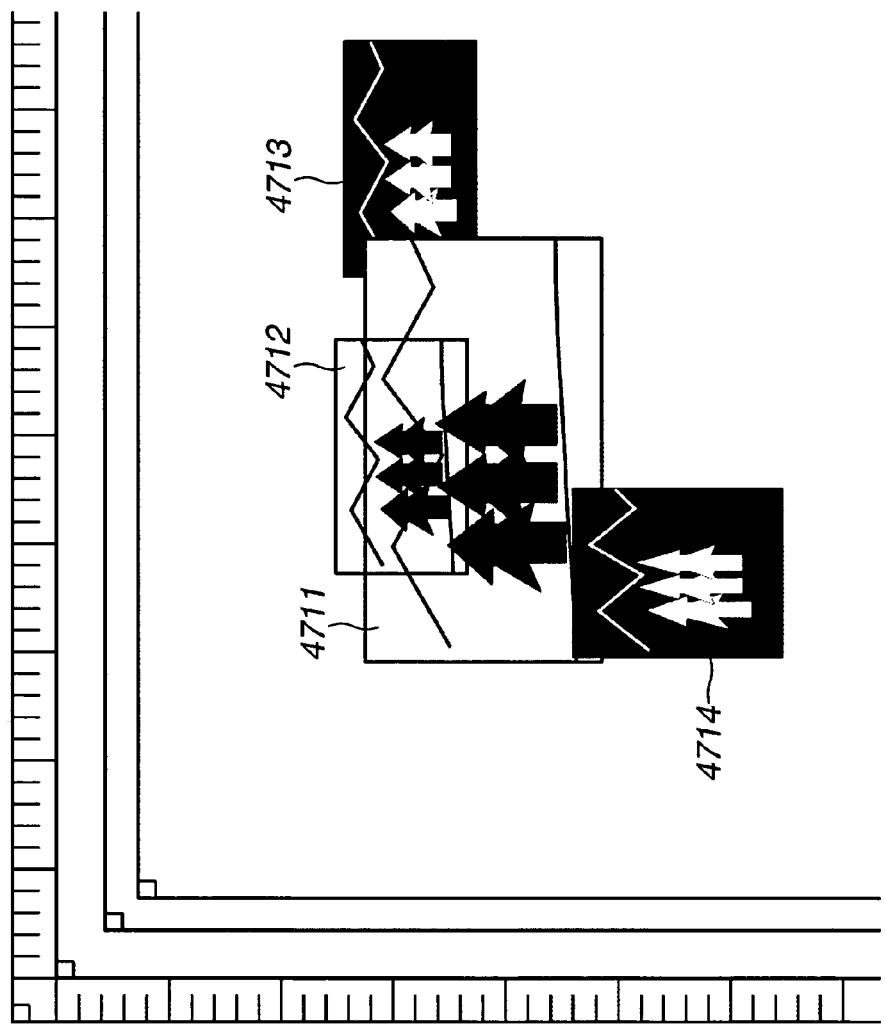
FIG. 47 illustrates a result of layout in a case where an overlap setting process described in FIG. 46 is not applied and where image data is flowed into variable containers shown in FIG. 41.

FIG. 47 illustrates a result of layout in a case where image data is flowed into the variable container shown in FIG. 41, and where the processing described by referring to FIG. 46 is not applied. In this case, a preview display is performed so that the preview displays 4712 to 4714 of the variable containers 4112 to 4114 overlap with the preview display 4711 of the variable container 4111.

Figure 48:
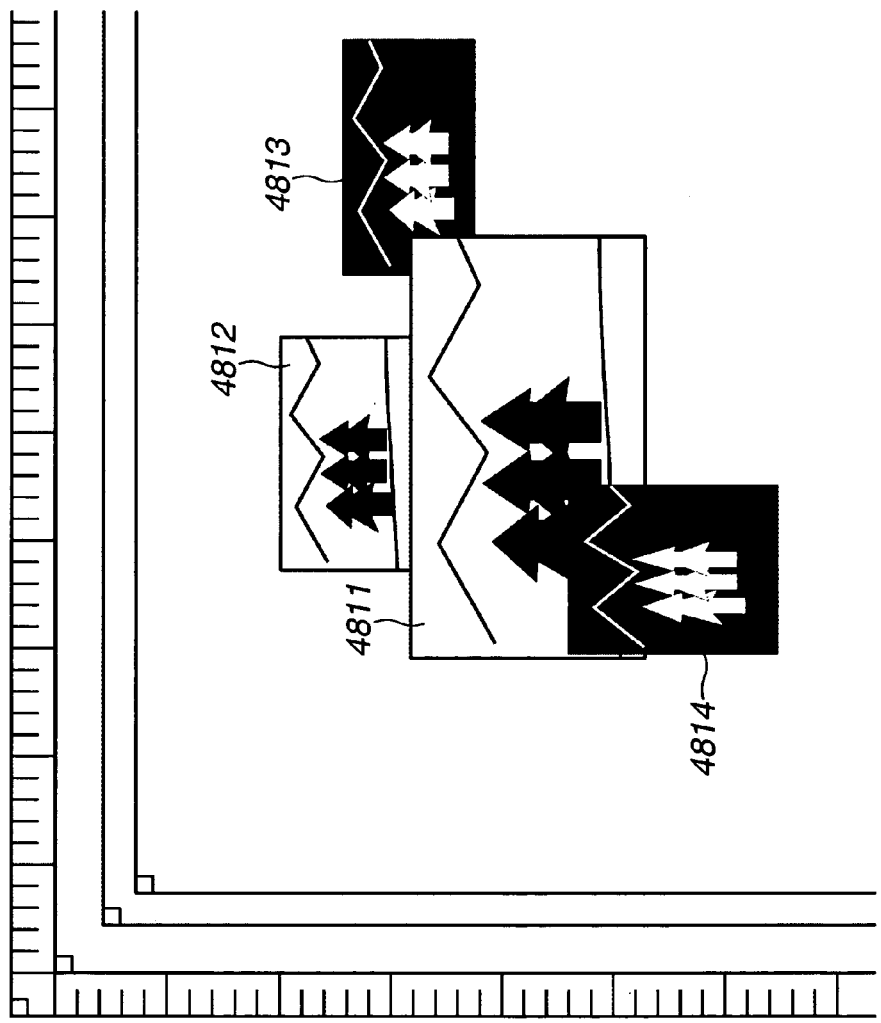
FIG. 48 illustrates a result of layout in a case where an overlap setting process described in FIG. 46 is applied in the second embodiment and where image data is flowed into the variable containers shown in FIG. 41.

FIG. 48 illustrates a result of layout performed by the layout editing application 121 in a case where image data is flowed into the variable container shown in FIG. 41, and where the processing described by referring to FIG. 46 is applied.

Even in a case where image data, which is the same as the image data shown in FIG. 47, is flowed into the variable containers 4111 to 4114, the result of the layout shown in FIG. 48, which is obtained by applying the processing described by referring to FIG. 46, differs from the result of the layout shown in FIG. 47 in that the preview display 4811 of the variable container 4111 does not overlap with the preview display 4812 of the variable container 4112.

These preview displays shown in FIG. 48 are obtained according to the following setting. That is, the attribute of "rejection of overlap" is set in both of the overlap attribute setting UI 4431 for setting the overlap attribute of the container A, and the overlap attribute setting UI 4432 for setting the overlap attribute of the container B, as illustrated in FIG. 44. The method "both containers repel each other and lay out (equivalence)" is designated by both of the overlap rejecting dynamic layout setting UI 4541 corresponding to the container A, and the overlap rejecting dynamic layout setting UI 4542 corresponding to the container B. Also, the repelling direction of the container A is set to be the "lower" direction. The repelling direction of the container B is set to be the "upper" direction. That is, as described by referring to the process flow of the overlap rejecting dynamic layout shown in FIG. 46, the layout editing application 121 lays out the containers so that the position of the preview display 4811 is moved to a lower position, that the position of the preview display 4812 is moved to an upper position, and that both of the preview displays 4811 and 4812 do not overlap with each other.

In the case of the overlap among the preview displays 4811, 4813, and 4814, the layout editing application 121 displays the preview displays 4811, 4813, and 4814 by locating the preview display 4814 of the container D at an upper position than the preview display 4811 of the container A and also locating the preview display 4813 of the container C at a lower position than the preview display 4811 of the container A according to the set attribute of allowance of the overlap in the object overlap attribute setting UI shown in FIG. 44.

According to the present embodiment, the overlap of containers (partial display areas), in which data is fit, is determined at the time of editing of layout. Partial display areas, the overlap of which is inhibited, and partial display areas, the overlap of which is allowed, are set at the time of editing of layout. The layout control technique of realizing the layout display desired by a user can efficiently be provided. Even in a case where the overlap is allowed, the overlapping order (in other words, an upper position or a lower position) of each object can be set. Thus, an object desired by a user can be displayed on the foreground.

Figure 54:
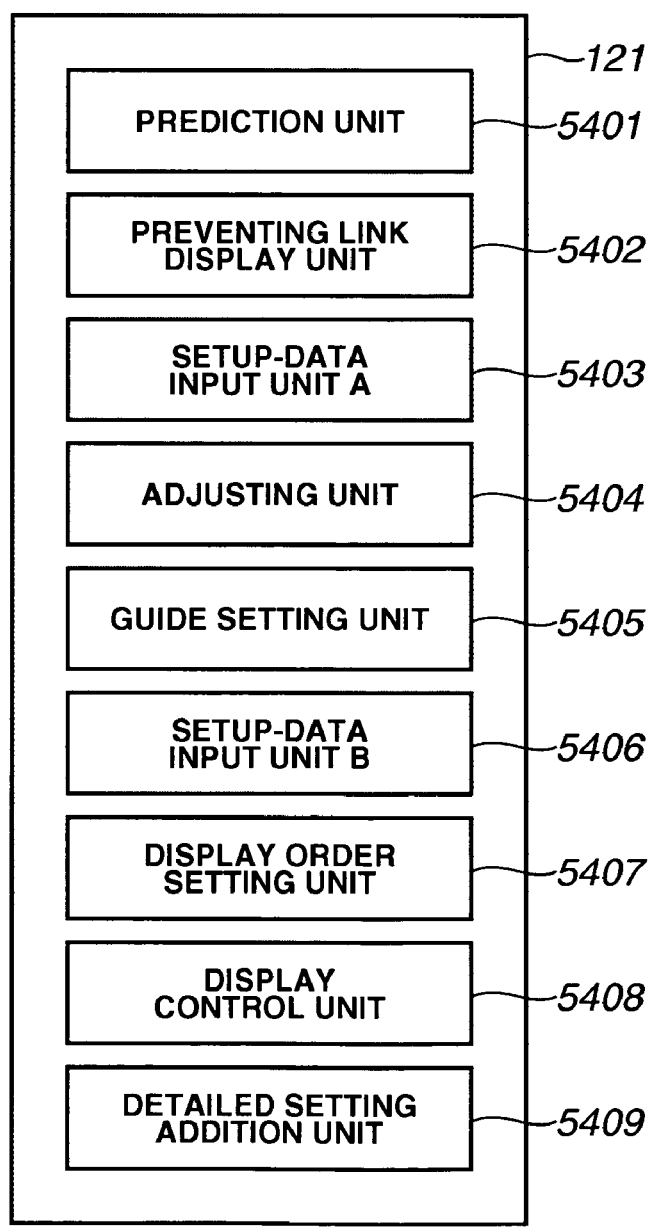
FIG. 54 is a block diagram illustrating an example of the functional configuration of the automatic layout system adapted to perform the layout editing application.

The functional configuration of the above-described automatic layout system (the layout editing application 121) is illustrated in, for example, FIG. 54.

Referring to FIG. 54, the layout editing application 121 controls the placement of a plurality of partial display areas that contain assigned data and lay out the data on a page. A prediction unit 5401 calculates the movable region of each of the partial display areas that contain the assigned data. The prediction unit 5401 also predicts from the movable region whether the partial display area overlaps with another object disposed on the page. A preventing link display unit 5402 sets an overlap preventing link between the partial display area and another object, which are predicted by the prediction unit 5401 to overlap with each other, and displays the set overlap preventing link.

A setup-data input unit A 5403 is adapted to set and input, in a case where the partial display area is predicted by the prediction unit 5401 to overlap, data indicating rejection of overlap in the partial display area. An adjusting unit 5404 adjusts the layout position of a plurality of partial display areas according to the size of assigned data. A guide setting unit 5405 sets a guide in a case where the attribute of rejection of overlap is set by the setup-data input unit A 5403 in the partial display area. A setup-data input unit B 5406 is adapted to set and input, in a case where the partial display area is predicted by the prediction unit 5401 to overlap with another object, data, which indicates whether the overlap of the partial display area with another object is allowed, in the partial display area. A display order setting unit 5407 is adapted to set a display order in the partial display areas in a case where the data for allowing the overlap is inputted by the setup-data input unit B 5406. A display control unit 5408 is adapted to display the partial display areas according to the display order in a case where overlap between the partial display area and another object is caused in response to the fitting of assigned data into the partial display area. A detailed setting addition unit 5409 is adapted to add, in a case where setup-data representing the rejection of the overlap is input by the setup-data input unit B 5406, detailed setup-data indicating that at least one of the partial display areas and another object is preferentially disposed. Principal units of the layout editing application 121 include the prediction unit 5401 and the preventing link display unit 5402, or include the prediction unit 5401, the setup-data input unit B 5406, and the display control unit 5408. A disposing unit disposes the partial display area and the another object at positions, at which no overlapped parts there between are generated, according to the detailed setting-information.

Other Embodiments

The features of the present invention can be achieved by providing a recording medium, on which software program code enabled to implement the functions of the above-described embodiments is recorded, to a system or the apparatus, whose computer (or a central processing unit (CPU) or a micro-processing unit (MPU)) reads and executes the program code stored in the recording medium.

In this case, the program code itself read from the recording medium implements the functions of the above-described embodiments.

For example, a floppy disk, a hard disk, an optical disk, a magneto-optical disk, a compact disk-read-only memory (CD-ROM), a CD-recordable (CD-R), magnetic tape, a non-volatile memory card, a ROM and the like may be employed as the recording medium for supplying the program code.

The functions of the above-described embodiments are implemented not only by executing the read program code in the computer but by performing part or all of actual processing according to instructions, which are issued by the program code, by an OS (Operating System) running on the computer.

The functions of the above-described embodiments are also implemented by performing part or all of the actual processing by a CPU or the like, which is provided in a function expansion board inserted into the computer or in a function expansion unit connected to the computer, according to instructions issued by the program code that is read from the storage medium after written to a memory provided on the function expansion board or on the function expansion unit.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-061064 filed Mar. 4, 2005, which is hereby incorporated by reference herein in its entirety.

What is claimed is:

1. A layout control apparatus configured to control layout of a plurality of partial display areas, in each of which data assigned thereto is fit, and to lay out the data on a page, the layout control apparatus comprising:

a prediction unit configured to calculate a movable area of each of the partial display areas, in each of which the data assigned thereto is fit, and to predict from the movable area whether each of the partial display areas overlaps with another object arranged on the page;

an overlap preventing link display unit configured to set an overlap preventing link between the partial display area and the object which are predicted to overlap with each other, and to display the overlap preventing link; and a setup-data input unit configured to input, in a case where the partial display area is predicted by the prediction unit to overlap, an attribute of rejection of overlap to the partial display area, wherein in a case where the attribute of resection of overlap is set by the setup-data input unit, the overlap preventing link display unit is configured to set and display an overlap preventing link between the partial display area, in which the attribute of rejection of overlap is set, and an another object to be predicted to overlap therewith.

2. The layout control apparatus according to claim 1, wherein the another object is a partial display area into which the assigned data is fit, and wherein the prediction unit is configured to calculate a movable area of each partial display area disposed on the page and predict from the movable area whether the plurality of partial display areas overlap with each other.

3. The layout control apparatus according to claim 1, further comprising:

a guide setting unit configured to set, in a case where the attribute of rejection of overlap is set by the setup-data input unit for the partial display area, a guide for the partial display area, wherein the overlap preventing link display unit is configured to set and display the overlap preventing link between the guide set for the partial display area and the another object predicted to overlap with the partial display area.

4. The layout control apparatus according to claim 3, wherein the guide set by the guide setting unit is capable of moving in response to change, which is caused by the adjusting unit, in a position of a side of the partial display area, for which the guide is set.

5. The layout control apparatus according to claim 1, further comprising:

an adjusting unit configured to adjust layout positions of the plurality of partial display area according to a data size of the assigned data, wherein in a case where the adjusting unit adjusts at least one of the layout positions of the partial display area and another object, between which the overlap preventing link is set, the adjusting unit is configured to change a length of the overlap preventing link in response to adjustment of at least one of the layout positions of the partial display area and another object so that the length of the overlap preventing link is not less than a minimum value set for the overlap preventing link.

6. The layout control apparatus according to claim 5, wherein in a case where the prediction unit cannot specify a direction of overlap of the partial display area and the another object, which is predicted to overlap with the partial display area, according to a result of calculation of the movable area of the partial display area, the preventing link display unit is configured to set a corresponding angle link capable of changing a direction, in which the overlap preventing link is set, in response to specifying of a direction, in which the partial display area and the another object overlaps with each other, by the adjusting unit.

7. The layout control apparatus according to claim 6, further comprising:
   an overlapping direction determination unit configured to determine, in a case where the corresponding angle link is set, whether an overlapping direction of the another object, which is predicted to overlap with the partial display area, is a horizontal direction or an ordinate direction,
   wherein the preventing link display unit is configured to change the corresponding angle link to a horizontal overlap preventing link or an ordinate-direction overlap preventing link according to a result of determination by the overlapping direction determination unit to prevent overlap of the partial display area with the another object.

8. A layout control method of controlling layout of a plurality of partial display area, in each of which data assigned thereto is fit, and laying out the data on a page, the layout control method comprising:
   a movable area calculation step of calculating a movable area of each of the partial display areas, in each of which the data assigned thereto is fit;
   a predicting step of predicting from the movable area whether each of the partial display areas overlaps with another object arranged on the page;
   a preventing link setting step of setting an overlap preventing link between the partial display area and the another object which are predicted to overlap with each other, if it is predicted in the predicting step that at least one of the partial display area overlaps with another object arranged on the page; and
   a preventing link display step of displaying the overlap preventing link if an overlap preventing link is set by the preventing link setting step; and
   a setup data input step of inputting, in a case where the partial display area overlap with one another, setup-data representing an attribute of rejection of overlap in the partial display area,
   wherein the preventing link setting step includes setting, in a case where the attribute of rejection of the overlap is set by the setup-data input step, an overlap preventing link between the partial display area, for which the attribute of rejection of the overlap is set, and the another object predicted to overlap with the partial display area.

9. The layout control method according to claim 8, wherein the another object is a partial display area into which the assigned data is fit, and
   wherein the movable area calculation step includes calculating the movable area of each partial display area disposed on a page, and
the predicting step includes predicting from the movable area whether a plurality of partial display area overlap with one another.

10. The layout control method according to claim 8, further comprising:
    a guide setting step of setting, in a case where the attribute of rejection of overlap is set by the setup-data input step, a guide for the partial display area,
    wherein the preventing link setting step includes setting the overlap preventing link between the guide set for the partial display area and the another object predicted to overlap with the partial display area.

11. The layout control method according to claim 10, wherein the guide set by the guide setting step is capable of moving in response to change, which is caused by the adjusting step, in a position of a side of the partial display area, for which the guide is set.

12. The layout control method according to claim 8, further comprising:
    an adjusting step of adjusting layout positions of the plurality of partial display areas according to a data size of the assigned data,
    wherein the adjusting step includes changing, in a case where at least one of the layout positions of the partial display area and another object, between which the overlap preventing link is set, is adjusted, a length of the overlap preventing link in response to adjustment of at least one of the layout positions of the partial display area and another object so that the length of the overlap preventing link is not less than a minimum value set for the overlap preventing link.

13. The layout control method according to claim 12, wherein in a case where the prediction step cannot specify a direction of overlap of the partial display area and the another object, which is predicted to overlap with the partial display area, according to a result of calculation of the movable area of the partial display area, the preventing link setting step includes setting a corresponding angle link capable of changing a direction, in which the overlap preventing link is set, in response to specifying of a direction, in which the partial display area and the another object overlaps with each other, by the adjusting step.

14. The layout control method according to claim 13, further comprising:
    an overlapping direction determination step of determining, in a case where the corresponding angle link is set, whether an overlapping direction of the another object, which is predicted to overlap with the partial display area, is a horizontal direction or an ordinate direction,
    wherein the preventing link display step includes a step of changing the corresponding angle link to a horizontal overlap preventing link or an ordinate-direction overlap preventing link according to a result of determination made by the overlapping direction determination step to prevent overlap of the partial display area with the another object.

15. A computer-readable medium having stored thereon computer-executable instructions which cause a computer to execute a layout control method of controlling layout of a plurality of partial display area, in each of which data assigned thereto is fit, and laying out the data on a page, the computer-executable instructions comprising:
    a prediction module adapted to calculate a movable area of each of the partial display areas, in each of which the data assigned thereto is fit, and to predict from the movable area whether each of the partial display areas overlaps with another object arranged on the page;

a preventing link display module adapted to set an overlap preventing link between the partial display area and the another object, which are predicted to overlap with each other, and to display the set overlap preventing link; and a setup-data input module adapted to input, in a case where the partial display area overlap with one another, setup-data representing an attribute of rejection of overlap in the partial display area, wherein the preventing link display module is adapted to set and display, in a case where the attribute of rejection of the overlap is set by the setup-data input module, an overlap preventing link between the partial display area, for which the attribute of rejection of the overlap is set, and the another object predicted to overlap with the partial display area.

16. The computer-readable medium according to claim 15, wherein the another object is a partial display area into which the assigned data is fit, and wherein the prediction module is adapted to calculate the movable area of each partial display area disposed on a page and predict from the movable area whether a plurality of partial display area overlap with one another.

17. The computer-readable medium according to claim 15, further comprising:

a guide setting module adapted to set, in a case where the attribute of rejection of overlap is set by the setup-data input module, a guide for the partial display area, wherein the overlap preventing link display module is adapted to set and display the overlap preventing link between the guide set for the partial display area and the another object predicted to overlap with the partial display area.

18. The computer-readable medium according to claim 17, wherein the guide set by the guide setting module is capable of moving in response to change, which is caused by the adjusting module, in a position of a side of the partial display area, for which the guide is set.

19. The computer-readable medium according to claim 15, further comprising:

an adjusting module adapted to adjust layout positions of the plurality of partial display area according to a data size of the assigned data, wherein the adjusting module changes, in a case where at least one of the layout positions of the partial display area and another object, between which the overlap preventing link is set, is adjusted, a length of the overlap preventing link in response to adjustment of at least one of the layout positions of the partial display area and another object so that the length of the overlap preventing link is not less than a minimum value set for the overlap preventing link.

20. The computer-readable medium according to claim 19, wherein in a case where the prediction module cannot specify a direction of overlap of the partial display area and the another object, which is predicted to overlap with the partial display area, according to a result of calculation of the movable area of the partial display area, the preventing link display module sets a corresponding angle link capable of changing a direction, in which the overlap preventing link is set, in response to specifying of a direction, in which the partial display area and the another object overlaps with each other, by the adjusting module.

21. The computer-readable medium according to claim 20, further comprising:

an overlapping direction determination module adapted to determine, in a case where the corresponding angle link is set, whether an overlapping direction of the another object, which is predicted to overlap with the partial display area, is a horizontal direction or an ordinate direction, wherein the preventing link display module changes the corresponding angle link to a horizontal overlap preventing link or an ordinate-direction overlap preventing link according to a result of determination made by the overlapping direction determination module to prevent overlap of the partial display area with the another object.

* * * * *